United States Patent
Case et al.

(10) Patent No.: US 7,296,139 B1
(45) Date of Patent: Nov. 13, 2007

(54) IN-MEMORY TABLE STRUCTURE FOR VIRTUAL ADDRESS TRANSLATION SYSTEM WITH TRANSLATION UNITS OF VARIABLE RANGE SIZE

(75) Inventors: Colyn S. Case, Grass Valley, CA (US); Dmitry Vyshetsky, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 186 days.

(21) Appl. No.: 10/769,326

(22) Filed: Jan. 30, 2004

(51) Int. Cl.
*G06F 12/10* (2006.01)

(52) U.S. Cl. .......................... 711/209; 711/206; 710/26

(58) Field of Classification Search ........ 711/202–209; 710/26
See application file for complete search history.

(56) References Cited

U.S. PATENT DOCUMENTS

| | | | |
|---|---|---|---|
| 4,677,546 A | 6/1987 | Freeman et al. | |
| 4,835,734 A * | 5/1989 | Kodaira et al. | 711/209 |
| 4,992,936 A | 2/1991 | Katada et al. | |
| 5,058,003 A | 10/1991 | White | |
| 5,375,214 A | 12/1994 | Mirza et al. | |
| 5,394,537 A * | 2/1995 | Courts et al. | 711/202 |
| 5,446,854 A | 8/1995 | Khalidi et al. | |
| 5,465,337 A | 11/1995 | Kong | |
| 5,479,627 A | 12/1995 | Khalidi et al. | |
| 5,555,387 A * | 9/1996 | Branstad et al. | 711/209 |
| 5,784,707 A * | 7/1998 | Khalidi et al. | 711/206 |
| 5,796,978 A | 8/1998 | Yoshioka et al. | |
| 5,802,605 A * | 9/1998 | Alpert et al. | 711/208 |
| 5,822,749 A * | 10/1998 | Agarwal | 707/2 |
| 5,860,146 A | 1/1999 | Vishin | |
| 5,928,352 A | 7/1999 | Gochman et al. | |
| 5,930,832 A | 7/1999 | Heaslip | |
| 5,956,756 A | 9/1999 | Khalidi et al. | |
| 5,963,984 A | 10/1999 | Garibay, Jr. et al. | |
| 6,003,123 A | 12/1999 | Carter | |
| 6,075,938 A | 6/2000 | Bugnion | |
| 6,104,417 A | 8/2000 | Nielsen | |
| 6,112,285 A * | 8/2000 | Ganapathy et al. | 711/207 |
| 6,205,530 B1 | 3/2001 | Kang | |
| 6,205,531 B1 | 3/2001 | Hussain | |
| 6,260,131 B1 | 7/2001 | Kikuta | |
| 6,272,597 B1 | 8/2001 | Fu et al. | |
| 6,349,355 B1 * | 2/2002 | Draves et al. | 711/6 |
| 6,356,991 B1 | 3/2002 | Bauman et al. | |
| 6,374,341 B1 * | 4/2002 | Nijhawan et al. | 711/207 |
| 6,418,522 B1 | 7/2002 | Gaertner et al. | |

(Continued)

*Primary Examiner*—Brian R. Peugh
*Assistant Examiner*—Jared I Rutz
(74) *Attorney, Agent, or Firm*—Townsend and Townsend and Crew LLP

(57) ABSTRACT

A virtual address translation table and an on-chip address cache are usable for translating virtual addresses to physical addresses. Address translation information is provided using a cluster that is associated with some range of virtual addresses and that can be used to translate any virtual address in its range to a physical address, where the sizes of the ranges mapped by different clusters may be different. Clusters are stored in an address translation table that is indexed by virtual address so that, starting from any valid virtual address, the appropriate cluster for translating that address can be retrieved from the translation table. Recently retrieved clusters are stored in an on-chip cache, and a cached cluster can be used to translate any virtual address in its range without accessing the address translation table again.

25 Claims, 23 Drawing Sheets

U.S. PATENT DOCUMENTS

| | | |
|---|---|---|
| 6,418,523 B2 | 7/2002 | Porterfield |
| 6,457,068 B1 | 9/2002 | Nayyar et al. |
| 6,477,612 B1 * | 11/2002 | Wang .......................... 711/2 |
| 6,560,688 B1 * | 5/2003 | Strongin et al. ............ 711/203 |
| 6,618,770 B2 | 9/2003 | Nayyar et al. |
| 6,628,294 B1 | 9/2003 | Sadowsky et al. |
| 6,728,858 B2 | 4/2004 | Willis |
| 6,766,434 B2 | 7/2004 | Gaertner |
| 6,857,058 B1 * | 2/2005 | Gurumoorthy et al. ..... 711/209 |
| 2002/0133685 A1 | 9/2002 | Kalyanasundharam |
| 2004/0117594 A1 * | 6/2004 | VanderSpek ................ 711/209 |
| 2005/0044340 A1 | 2/2005 | Sheets |
| 2005/0055510 A1 | 3/2005 | Hass |

* cited by examiner

| | COLUMNS (c) | | | | | | | | |
|---|---|---|---|---|---|---|---|---|---|
| | | 7 | 6 | 5 | 4 | 3 | 2 | 1 | 0 |
| 0 | LRU | TAG 7 | TAG 6 | TAG 5 | TAG 4 | TAG 3 | TAG 2 | TAG 1 | TAG 0 |
| 1 | 1220 | 1210(7) | 1210(6) | 1210(5) | 1210(4) | 1210(3) | 1210(2) | 1210(1) | 1210(0) |
| 2 | | | | | | | | | |
| ROWS (r) ⋮ | | | | | | | | | |
| | | | | | | | | | |

1200

IN-MEMORY TABLE STRUCTURE FOR VIRTUAL ADDRESS TRANSLATION SYSTEM WITH TRANSLATION UNITS OF VARIABLE RANGE SIZE

CROSS-REFERENCES TO RELATED APPLICATIONS

The present disclosure is related to the following commonly-assigned co-pending U.S. patent applications: Ser. No. 10/769,357, filed on the same date as the present application, entitled "VIRTUAL ADDRESS TRANSLATION SYSTEM WITH CACHING OF VARIABLE-RANGE TRANSLATION CLUSTERS"; and Ser. No. 10/769,388, filed on the same date as the present application, entitled "MULTI-CLIENT VIRTUAL ADDRESS TRANSLATION SYSTEM WITH TRANSLATION UNITS OF VARIABLE RANGE SIZE." The respective disclosures of these applications are incorporated herein by reference for all purposes.

BACKGROUND OF THE INVENTION

The present invention relates in general to memory management systems and in particular to an address translation system with caching of variable-range translation clusters.

Most modern computer systems generally implement some form of virtual memory, in which processes reference system memory locations using a "virtual" address rather than an address of a specific location in the memory. When a process makes a memory request using a virtual address, the system uses a page table to translate the virtual address to a specific location and accesses that location. The page table is typically implemented in a block of memory that includes an entry for each page (e.g., 4 kilobytes) of the virtual address space; the entry stores a physical address of a corresponding page of a physical address space. Page tables can also be structured hierarchically, so that only a portion of the page table needs to be resident in system memory at all times; the portion held in system memory can be used to locate other portions that may have been swapped out.

Virtual memory has a number of common uses. For example, general-purpose computer systems generally cannot guarantee that a process will receive memory resources in any particular arrangement or at any particular location. Virtual addressing enables processes to treat the memory as if it were arranged in a convenient manner, regardless of how it is actually arranged. As another example, systems that support parallel execution of multiple processes can provide a different virtual memory space for each process. This helps to avoid address conflicts between processes. Virtual addressing can also be used to map storage other than system memory, thereby enabling the system to swap data in and out of the system memory, address data in storage devices other than memory storage (e.g., image files resident on a system disk), and so on.

Within graphics processing subsystems, use of virtual memory has been relatively uncommon. Typically, a graphics processing subsystem is implemented on a plug-in printed circuit card that connects to a system bus, such as a PCI (Peripheral Component Interconnect) or AGP (Accelerated Graphics Port) bus. The card usually includes a graphics processing unit (GPU) that implements graphics functionality (e.g., rasterization, texture blending, etc.) and dedicated graphics memory. This memory is generally managed by the GPU or by a graphics driver program executing on the system central processing unit. The GPU can address graphics memory using either physical addresses or offset values that can be converted to physical addresses by the addition of a constant base address. The GPU (or graphics driver program) can also control the arrangement of physical memory allocations. For instance, a pixel buffer that is to be scanned out to a display device can be arranged to occupy a contiguous block of the graphics memory address space. Elements of graphics processing subsystems, including scanout control logic (or display drivers), graphics driver programs, GPUs, and the like are generally designed to use physical addressing and to rely on particular arrangements and allocations of memory.

As the amount of data (e.g., texture data) needed for graphics processing increases, graphics processing subsystems are beginning to rely on system memory for at least some storage of data (and in some instances command lists, etc.). Such subsystems generally use virtual addressing for system memory, with the required address translation being performed by a component external to the graphics processing subsystem. For instance, the AGP bus includes a Graphics Address Relocation Table (GART) implemented in the host-side chipset. Emerging high-speed bus technologies, such as PCI Express (PCI-E), do not provide GART or any other address translation functionality. As a result, graphics cards configured for such protocols will need to implement their own address translation systems if they are to access system memory.

An alternative to the graphics card is an integrated graphics processor (IGP). An IGP is a graphics processor that is integrated with one or more other system bus components, such as a conventional "north bridge" chip that manages the bus connecting the CPU and the system memory. IGPs are appealing as an inexpensive alternative to graphics cards. Unlike conventional graphics cards, an IGP system usually does not include much (or in some cases any) dedicated graphics memory; instead the IGP relies on system memory, which the IGP can generally access at high speed. The IGP, however, generally does not control the physical arrangement or address mapping of the system memory allocated to it. For example, it is not guaranteed that the pixel buffer will occupy a single contiguous block in the physical address space. Thus, designers of IGPs are faced with the choice of redesigning the co-processor and the associated driver programs to use physical addresses provided by the system or relying on virtual addressing.

Given the level of complexity and sophistication of modern graphics processing, redesigning around (unpredictable) physical addresses is a daunting task, which makes a virtual addressing solution desirable. Unfortunately, in many computer systems, virtual addressing can introduce a significant degree of memory overhead, making this option too slow or resource intensive for graphics processing components such as display systems. For example, a typical display system provides a screen's worth of pixel data (e.g., 1280×1024 pixels at four bytes per pixel, for a total of over 5 MB per screen) from the pixel buffer to a display device at a constant screen refresh rate of about 70 Hz. Virtual address translation for this much data would introduce an additional latency that is potentially long and may be highly variable. Such long or variable delays in receiving pixel data from memory could result in incorrect (or black) pixels, or other undesirable artifacts. In addition, if address translation for scanout or other purposes requires a large number of page table accesses, performance of other system components may be adversely affected (e.g., due to congestion on the bus or in the system memory). Conventional address caching and translation lookaside buffer techniques do not alleviate the problem because it is difficult and expensive to provide an on-chip cache large enough to hold all the page addresses needed for scanout.

Another solution is to maintain a complete page table on the graphics chip, thereby allowing faster access times and/or less variability in latency. This solution, however, becomes impractical for large page table sizes. Still another solution divides the virtual address space into "large" and "small" sections, depending on whether the section is mapped to blocks of contiguous physical addresses that exceed a "large size" threshold of e.g., 32 or 64 KB. Pointers to the physical address blocks for "large" sections are stored on chip, while for "small" sections, a lookup in the complete page table is required to complete the translation. In some cases, the result of the most recent page table lookup for each of some number of translation clients can be stored and re-used until the client requests a virtual address on a different page. Such systems can reduce the number of page table accesses in some situations, but the ability to store only one result per client and the inability to share results can still lead to a large number of page table accesses.

Thus, an improved virtual memory system that reduces the number of page table accesses required to translate a group of virtual addresses would be desirable.

BRIEF SUMMARY OF THE INVENTION

Embodiments of the present invention provide systems and methods for implementing a virtual address translation table and an on-chip address cache that can substantially reduce the number of page table accesses needed to translate a given range of virtual addresses to physical addresses. Address translation information is provided using a translation data structure, referred to herein as a "cluster," that is associated with some range of virtual addresses; the cluster can be used to translate any virtual address in its range to a physical address. The sizes of the ranges mapped by different clusters may be different, and the size of the cluster data structure may be independent of its range size. Clusters may be stored in an address translation table that is indexed by virtual address so that, starting from any valid virtual address, the appropriate cluster for translating that address can be retrieved from the translation table. Recently retrieved clusters can be stored in an on-chip cache in such a manner that a cached cluster can be used to translate any virtual address in its range without accessing the in-memory translation table again.

According to one aspect of the invention, a system for mapping virtual addresses to physical addresses includes a cluster creator, and a table builder. The cluster creator is configured to create a number of clusters, where each cluster maps a range of a virtual address space to a plurality of physical addresses, and where the ranges mapped by different clusters have different sizes. The table builder is configured to store the clusters in a number of entries in a cluster table, wherein each entry in the cluster table corresponds to a virtual block in a virtual address space, and wherein each cluster is stored in a number of entries corresponding to the size of the range mapped by that cluster. In some embodiments, one of the clusters provides a reference to a physical block of contiguous physical addresses. In other embodiments, one of the clusters provides a reference to each of a number of physical blocks of contiguous physical addresses; this number of physical blocks may include one physical block that is not contiguous with any other one of the physical blocks. In still other embodiments, each cluster includes a size field configured to store a value indicating the size of the range mapped by that cluster.

According to another aspect of the present invention, a method for mapping virtual addresses to physical addresses is provided. A number of clusters is created, where each cluster maps a range of a virtual address space to a plurality of physical addresses, and where the ranges mapped by different clusters have different sizes. The clusters are stored in a number of entries in a cluster table, wherein each entry in the cluster table corresponds to a virtual block in the virtual address space, with each cluster being stored in a number of entries corresponding to the size of the range mapped by that cluster. In some embodiments, once clusters are stored in the cluster table, a target virtual address to be translated can be identified. One of the clusters is retrieved from the cluster table by reference to a target virtual page that includes the target virtual address. The target virtual address is translated to a physical address based on the mapping provided by the retrieved cluster. The cluster may be retrieved without accessing range size data for the clusters.

According to yet another aspect of the present invention, a system for mapping virtual addresses to physical addresses includes a cluster creator, a cluster table builder and a high-level table builder. The cluster creator is configured to create a number of clusters, where each cluster maps a range of a virtual address space to a plurality of physical addresses and where the ranges mapped by different clusters have different sizes. The cluster table builder is configured to store the clusters in a number of entries in a cluster table, where each entry in the cluster table corresponds to a virtual block in the virtual address space and where each cluster is stored in a number of entries corresponding to the size of the range mapped by that cluster. In this aspect, the cluster table includes a number of segments, each segment corresponding to a group of the virtual blocks. The high-level table builder is configured to store a reference to a segment of the cluster table in a first entry of a high-level table having a number of entries, each entry corresponding to a group of the virtual blocks. The high-level table builder is further configured to define a mapping between one of the groups of virtual blocks and a physical block of contiguous physical addresses and to store a reference to the physical block in a second entry of the high-level table. In some embodiments, the system further includes an address translation module configured to access a target entry of the high-level table corresponding to a target virtual address to be translated and to provide a target cluster usable for translating the target virtual address. For example, in the event that the target entry of the high-level table stores a reference to a segment of the cluster table, the address translation module may obtain the target cluster by using the reference to the segment, and in the event that the target entry of the high-level table stores a reference to a physical block, the address translation module may construct a cluster based on the reference to the physical block. In some embodiments, the address translation module includes a first circuit disposed on a chip, and the high-level table includes a second circuit disposed on the same chip.

The following detailed description together with the accompanying drawings will provide a better understanding of the nature and advantages of the present invention.

DETAILED DESCRIPTION OF THE INVENTION

Embodiments of the present invention provide systems and methods for implementing a virtual address translation table and an on-chip address cache that can substantially reduce the number of page table accesses needed to translate a given range of virtual addresses to physical addresses. Address translation information is provided using a translation data structure, referred to herein as a "cluster," that is associated with some range of virtual addresses; the cluster can be used to translate any virtual address in its range to a physical address. The sizes of the ranges covered by (or mapped by) different clusters may be different, and in some embodiments, the size of the cluster data structure is independent of its range size. For example, in one embodiment, each cluster is 16 bytes and can map anywhere from 4 to 512 pages of the virtual address space. Clusters may be stored in an address translation table (e.g., in system memory) that is indexed by virtual address so that, starting from any valid virtual address, the appropriate cluster for translating that address can be retrieved from the translation table. Recently retrieved clusters can be stored in an on-chip cache in such a manner that a cached cluster can be used to translate any virtual address in its range without accessing the address translation table again. One embodiment of the invention provides an address translation lookaside buffer (TLB) system that can handle requests from multiple clients in a pipelined fashion and can make the translation process transparent or not to individual clients as desired. Thus, the TLB system can be integrated with existing graphics processor designs.

The present description is organized as follows: Section I describes examples of computer systems according to embodiments of the present invention; Section II describes a cluster table implementation of an address translation table according to one embodiment of the present invention; Section III describes a TLB system according to an embodiment of the present invention; and Section IV describes further embodiments of the invention, including a "cluster pair" embodiment and additional features related to managing requests from multiple clients. It is to be understood that all embodiments described herein are illustrative and not limiting of the scope of the invention.

I. Computer System Overview

Figure 1:
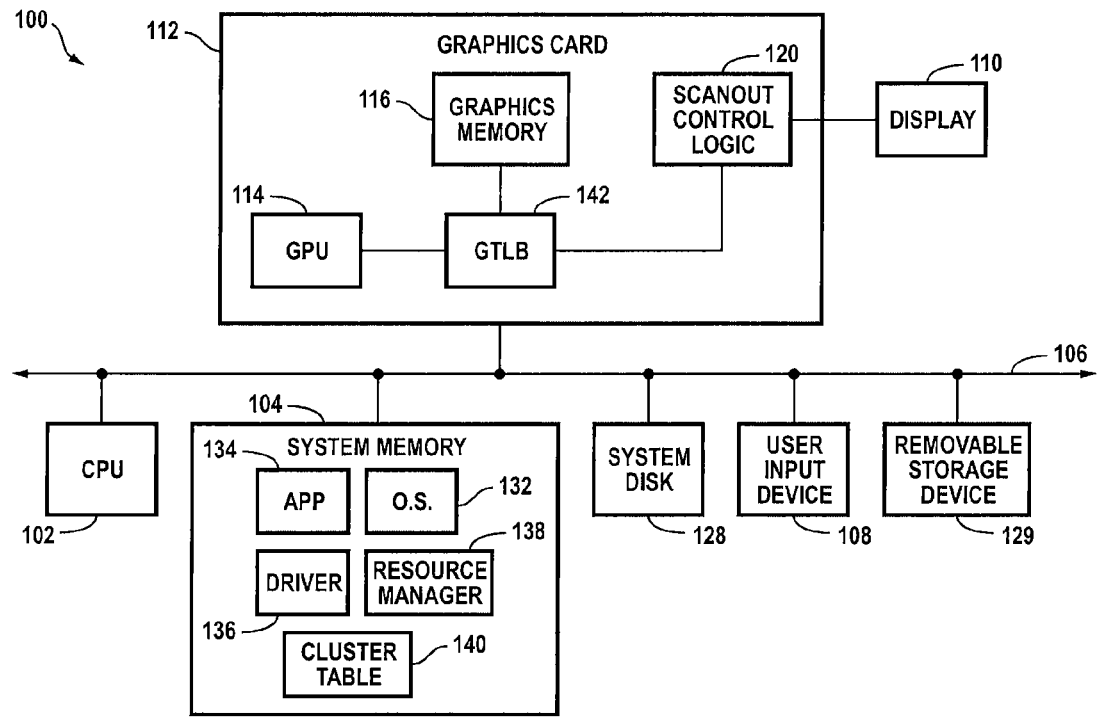
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics card 112 coupled to system bus 106. A system disk 128 and other components, such as one or more removable storage devices 129 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Accelerated Graphics Port) and/or PCI Express (PCI-E); appropriate "bridge" chips such as a north bridge and south bridge (not shown) may be provided to interconnect various components and/or buses.

Graphics card 112 includes a graphics processing unit (GPU) 114, a graphics memory 116, a graphics translation lookaside buffer (GTLB) 142, and scanout control logic 120, which may be implemented, e.g., using one or more integrated circuit devices (including programmable processors and/or application specific integrated circuits (ASICs)). GPU 114 may be configured with one or more processing cores to perform various tasks, including generating pixel data from graphics data supplied via system bus 106, interacting with graphics memory 116 to store and update pixel data, and the like. Such elements of GPU 114 may be of generally conventional design, and a detailed description is omitted. Communication with graphics memory 116 is managed by GTLB 142 as described below.

Scanout control logic 120 reads pixel data from graphics memory 116 (or, in some embodiments, system memory 104) via GTLB 142 and transfers the data to display device 110 to be displayed. In one embodiment, scanout occurs at a constant refresh rate (e.g., 80 Hz); the refresh rate can be a user selectable parameter. Scanout control logic 120 may also perform other operations such as adjusting color values for particular display hardware; generating composite screen images by combining the pixel data with data for a video or cursor overlay image or the like obtained, e.g., from graphics memory 116, system memory 104, or another data source (not shown); converting digital pixel data to analog signals for the display device; and so on. It will be appreciated that the particular configuration of graphics card 112 or its components is not critical to the present invention.

During operation of system 100, CPU 102 executes various programs that are (temporarily) resident in system memory 104. In one embodiment, these programs include one or more operating system (OS) programs 132, one or more application programs 134, one or more driver programs 136 for graphics card 112, and a resource manager program 138 that provides various support services to driver program 136. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 128, and/or in other storage space.

Operating system programs 132 and/or application programs 134 may be of conventional design. An application program 134 may be, for instance, a video game program that generates graphics data and invokes appropriate rendering functions of GPU 114 to transform the graphics data to pixel data. Another application program 134 may generate pixel data and provide the pixel data to graphics card 112 for display. It is to be understood that any number of application programs that generate pixel and/or graphics data may be executing concurrently on CPU 102. Operating system programs 132 (e.g., the Graphical Device Interface (GDI) component of the Microsoft Windows operating system) may also generate pixel and/or graphics data to be processed by graphics card 112.

Driver program 136 enables communication with graphics card 112. Driver program 136 advantageously implements one or more standard application program interfaces (APIs), such as Open GL, Microsoft DirectX, or D3D for communication with graphics card 112; any number or combination of APIs may be supported, and in some embodiments separate driver programs 136 are provided to implement different APIs. By invoking appropriate API function calls, operating system programs 132 and/or application programs 134 are able to instruct driver program 136 to transfer graphics data or pixel data to graphics card 112 via system bus 106, to invoke various rendering functions of GPU 114, and so on. The specific commands and/or data transmitted to graphics card 112 by driver program 136 in response to an API function call may vary depending on the implementation of GPU 114, and driver program 136 may also transmit commands and/or data implementing additional functionality (e.g., special visual effects) not controlled by operating system programs 132 or application programs 134.

Resource manager 138 is advantageously provided to support interactions of driver program 136 with system hardware components such as system memory 104. Resource manager 138 implements low-level hardware- and operating-system-specific functionality that is used by driver program 136 in processing requests from operating system programs 132 and/or application programs 134. For example, resource manager 138 may handle tasks such as allocation and deallocation of system memory for driver program 136 and/or GPU 114. Providing resource manager 138 enables program code for driver program 136 to be written at a level of abstraction that hides details of the hardware and/or operating system on which driver program 136 is executed; thus, the same driver code can be adapted to different hardware configurations by providing a different implementation of resource manager 138. It will be appreciated that the functionality of resource manager 138 might also be implemented in driver program 136.

In system 100, GPU 114 can access system memory 104 by reference to virtual addresses, which are translated to physical addresses in order to fulfill the memory access request. An address translation table 140, shown as being resident in system memory 102, stores translation information that can be used to convert a given virtual address to the corresponding physical address. In accordance with an embodiment of the present invention, the translation information is advantageously stored in one or more clusters, where a cluster is a data structure that provides the translation information for a variable-size range of the virtual address space. Embodiments of cluster data structures and cluster tables that implement address translation table 140 are described in Section II below. Although address translation table 140 is shown as being resident in system memory 104, it may also be stored elsewhere, e.g., in graphics memory 116 or in GPU 114.

GTLB 142 receives memory requests from various "clients" executing in a processing core (not shown) of GPU 114 and/or from scanout control logic 120 and performs address translations in the course of responding to these requests. In response to a memory request that includes a virtual address (or in response to an address translation request that does not include a memory access request), GTLB 142 retrieves a cluster from address translation table 140 or from its own cache of recently used clusters and converts the virtual address to a physical address based on data contained in the cluster. GTLB 142 is advantageously implemented such that address translation can be made invisible to some or all clients; that is, a client can simply issue a memory access command referencing a virtual address and receive a response (including the data, in the case of a read command) from the appropriate physical memory system, without the client needing to be aware that any translation has occurred. Thus, existing driver programs and/or GPU-implemented algorithms can be used regardless of whether the memory being used is dedicated graphics memory 116 or system memory 104. In this embodiment, GTLB 142 also manages access by components of graphics processing subsystem 112 to system memory 104, graphics memory 116, and any other physical memory resource of system 100 that is accessible to graphics processing components. For each such resource, GTLB 142 performs the appropriate address translation; in some instances (e.g., for graphics memory 116), no translation may be required. In other embodiments, GTLB 142 manages only accesses to system memory 104; access to graphics memory 116 may be provided via an alternative path.

In the course of its operations, GTLB 142 may store copies of some or all of the clusters retrieved from address translation table 140 in its own cache (not shown), thereby facilitating the handling of subsequent requests for similar addresses. Cluster caching and other features of GTLB 142 may be implemented in various ways, examples of which are described in Section III below. GTLB 142 can be implemented in hardware resident on graphics card 112 (optionally integrated with GPU 114), in software executing on GPU 114 and/or CPU 102, or any combination thereof.

Figure 2:
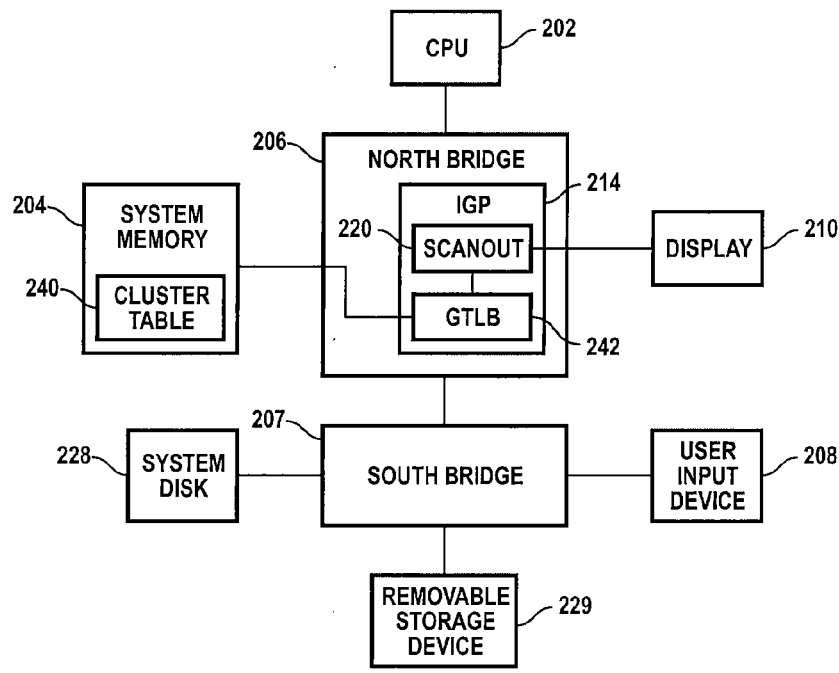
FIG. 2 is a block diagram of a computer system according to another embodiment of the present invention.

FIG. 2 is a block diagram of another computer system 200 according to another embodiment of the present invention. Computer system 200 includes a CPU 202 and system memory 204 communicating via a "north bridge" chip 206. North bridge chip 206 advantageously implements one or more high-speed bus protocols (these may be conventional protocols) that facilitate rapid communication between CPU 202 and system memory 204. North bridge chip 206 also communicates with a "south bridge" chip 207 that implements one or more bus protocols (which may be the same as or different from protocols used by north bridge chip 206) for connecting various peripheral devices, such as a user input device 208, a system disk 228, and a removable storage device 229. South bridge chip 207 and any peripheral devices may be of generally conventional design.

North bridge chip 206 includes an integrated graphics processor (IGP) 214 that implements graphics functionality similar to that of GPU 114 of system 100 (FIG. 1). For example, IGP 214 includes scanout control logic 220 that provides pixel data to a display device 210. (Scanout control logic 220 may be generally similar to scanout control logic 120 of FIG. 1.) IGP 214 also includes a GTLB 242 that manages access to system memory 204 for IGP 214 and its components, including scanout control logic 220.

Operation of system 200 is generally similar to operation of system 100 described above. For example, a graphics driver program, a resource manager program, application programs, and operating system programs (not shown) may be executed by CPU 202. In system 200, IGP 214 might not have access to a dedicated graphics memory area at all, although some embodiments may include at least a small amount of dedicated graphics memory. If IGP 214 does not have dedicated graphics memory, or if additional memory beyond the dedicated graphics memory is required, IGP 214 accesses system memory 204 by reference to virtual addresses that are translated to corresponding physical addresses. An address translation table 240 is provided for storing address translation data (e.g., clusters), and GTLB 242 performs the address translations. Address translation table 240 and GTLB 242 may be generally similar in design and operation to address translation table 140 and GTLB 142 of FIG. 1.

It will be appreciated that systems 100 and 200 are illustrative and that variations and modifications are possible. Arrangement of system components may be varied; for instance, in some embodiments, communication with system memory may be routed through the CPU. Some components may be duplicated or absent as desired. A graphics card may be implemented with any amount of on-card memory or with no dedicated graphics memory at all, and a GPU can use a combination of on-card memory and system memory in any manner desired. Where a graphics card has no on-card memory, the GPU may use system memory exclusively. An IGP can be provided with dedicated memory if desired and can use a combination of dedicated memory and system memory in any manner desired. A single computer system may include multiple graphics processors implemented using any combination of IGPs and/or GPUs. For example, a graphics card based on the AGP or PCI-E bus standard can be connected to north bridge chip 206 or south bridge chip 207 of FIG. 2, as is known in the art, and various control technologies can be provided for controlling operations of the multiple graphics processors. One or more graphics processors may also be implemented as a separate chip that mounts onto the motherboard of a computer system. In view of the present disclosure, persons of ordinary skill in the art will recognize that the present invention can be embodied in a wide variety of system configurations.

It will also be appreciated that, although the address translation techniques described herein are introduced in the context of graphics processing subsystems, these techniques may also be adapted for other computer system components that use virtual addressing. For example, an address translation table in accordance with an embodiment of the present invention may be implemented for other peripheral devices (e.g., disk drives), for virtual memory management by a CPU, and so on. Accordingly, where the following description refers to a "client," it is to be understood that the client may be any component of a computer system that accesses any memory resource by reference to a virtual address or that requests a translation of a virtual address.

In embodiments described herein, the physical memory resource is of generally conventional design. Physical memory is byte-addressable and is allocated by the operating system in fixed-size units (e.g., 4 KB) of physically adjacent memory locations; the fixed-size unit is a "page" in the physical address space. The physical address of a byte of memory is specified by a page address and a byte offset within the page. It is to be understood that a physical address may be expressed in various ways, including as a "linear address" that may be further converted to a hardware-dependent identifier of a particular storage location (e.g., row and column addresses for a memory cell array).

The number of bits in a physical address or page address is implementation dependent and may vary, e.g., according to the size of the physical address space for a particular system. By way of illustration, some examples herein refer to a 36-bit physical address space in which the 24 most significant bits (MSBs) of an address determine the page address and the 12 least significant bits (LSBs) correspond to the byte offset within a 4 KB page. Bit ranges within addresses are sometimes represented herein as a range of bits, e.g., [$Addr_{35}$:$Addr_{12}$] for the page address, and [$Addr_{11}$:$Addr_0$] for the byte offset. Those of ordinary skill in the art will recognize that other embodiments adapted to different implementations of physical memory (e.g., different page sizes, different sizes and organizations of physical address space, addressability in units other than bytes) and that the present invention is not limited to any particular memory system or physical address space.

II. Cluster Table

A cluster table that implements an address translation table according to an embodiment of the present invention will now be described. This cluster table, which can be resident in the main system memory (e.g., cluster table 140 of FIG. 1 or 240 of FIG. 2) or elsewhere in the system, provides data that can be used to translate virtual addresses to physical addresses. Like a conventional page table, an entry in the cluster table is accessed by reference to a virtual address. Unlike a conventional page table, the cluster table entry does not directly provide the address for the corresponding page of physical memory. Instead, each cluster table entry stores a data structure (called a cluster) that maps some range of the virtual address space to physical addresses. As will become apparent, the size of the range mapped by a cluster can vary, depending on how the physical memory is allocated; a single cluster can map an arbitrarily large range of virtual address space.

A. Cluster Table Structure

Figure 3:
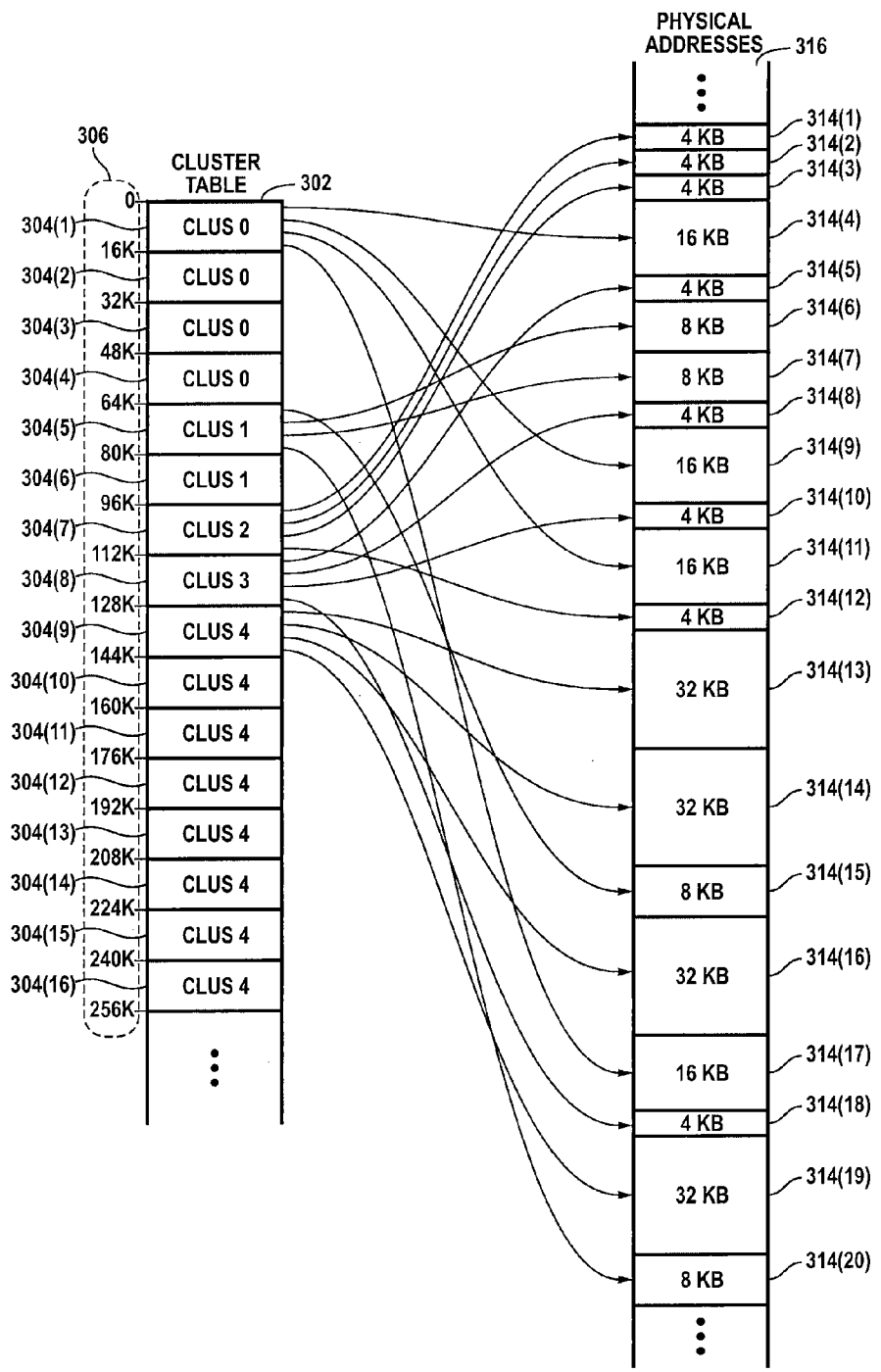
FIG. 3 illustrates a mapping from a cluster table to physical addresses according to an embodiment of the present invention.

FIG. 3 is a conceptual illustration of a mapping from a cluster table to physical addresses according to an embodiment of the present invention. At the left is a cluster table 302, which contains a number of entries 304. (Herein, multiple instances of like objects are denoted with reference numbers identifying the object and parenthetical numbers identifying the instance where needed.) An entry 304 in cluster table 302 is accessed by reference to the virtual address index 306 shown at left; index 306 may be obtained for any given virtual address, e.g., by aligning that virtual address at a 16K boundary. For example, a virtual address of 86K would align to an index 306 value of 80K, which corresponds to entry 304(6). In some embodiments, determining the virtual address index from a virtual address includes additional manipulations, such as dividing by 1024, so that the index can be used as an offset relative to a base address of the cluster table in system memory. Such manipulations are known in the art.

Each entry 304 stores a cluster (represented as CLUS n, where n=0, 1, 2, . . . ), and the same cluster can be stored in multiple entries (e.g., CLUS 0 is stored in each of entries 304(1)-304(4)). In this embodiment, each cluster is a fixed-size data structure (e.g., 16 bytes) that can map a variable range of the virtual address space to corresponding physical addresses; it is to be understood that in other embodiments, different clusters may have different sizes. The mapping is provided by address translation data in the cluster. The address translation data generally includes a starting address for a block of contiguous addresses (e.g., page addresses) in the physical address space, and sequential virtual addresses in the cluster's range are mapped to sequential physical addresses in the block. In some embodiments, clusters may include starting addresses for more than one block; sequential virtual addresses can be mapped to sequential physical addresses in the first block until the first block is exhausted, then to sequential physical addresses in the second block, and so on for any number of blocks.

FIG. 3 also illustrates how clusters CLUS 0-CLUS 4 of cluster table 302 might map to a physical address space 316. Physical address space 316 includes a number of blocks 314, where each block 314 is a contiguous range of physical addresses and is mapped to a contiguous range of virtual addresses. Each block is also labeled with its size (in KB). In this example, each cluster CLUS n provides mappings via pointers to four blocks 314. (Examples of encoding such pointers into a cluster data structure are described below.) The four blocks 314 pointed to by a particular cluster CLUS n are all the same size (e.g., CLUS 0 points to four blocks 314(4), 314(9), 314(11), 314(17) that are 16 KB each), but there is no necessary relationship between the locations of the four blocks. In addition, blocks pointed to by different clusters may be of different sizes (e.g., CLUS 0 points to 16-KB blocks 314(4), 314(9), 314(11), 314(17) while CLUS 1 points to 8-KB blocks 314(6), 314(7), 314(15), 314(20)). The block size for each cluster is determined when that cluster is created, as described in Section II.D below. In general, block size is affected by the degree of fragmentation present in the physical memory. In other embodiments, one cluster may point to blocks of different sizes; in still other embodiments, some relationship (e.g., locality) between the addresses of blocks pointed to by a cluster may be required.

Each entry 304 in cluster table 302 may be regarded as a "virtual block" in the virtual address space. All virtual addresses within the address range of a virtual block are guaranteed to be mapped to physical addresses by the cluster stored in that entry; e.g., all addresses in the 80-96 KB range corresponding to entry 304(6) are mapped by CLUS 1. It is to be understood that the virtual block size need not correspond to a physical page size of the physical address space; e.g., each virtual block (i.e., entry) in cluster table 302 covers four 4-KB physical pages. It should also be noted that some clusters might map virtual addresses for more than one virtual block; e.g., CLUS 1 is also stored in entry 304(5) and therefore also maps virtual addresses in the 64-80 KB virtual block. Thus, the "range" of a cluster (i.e., the set of all virtual addresses mapped by that cluster) may include any number of virtual blocks.

To the extent that an entry 304 may be regarded as a virtual block, the index 306 used to find the cluster for that entry may be regarded as a virtual block address. For instance, in cluster table 302, a virtual address (e.g., vAddr=86 KB) can be translated by first identifying the virtual block to which it belongs, i.e., the corresponding index 306 (e.g., 80 KB, or in some embodiments 80). Using the index 306, a cluster (e.g., CLUS 1) for the virtual block (e.g., entry 304(6)) is obtained from cluster table 302, and a translation operation is performed on the cluster to obtain the physical address, which in this example would be in one of physical blocks 314(6), 314(7), 314(15), 314(20). It should be noted that in this embodiment, prior knowledge of the size of the virtual address range mapped by a cluster is not required to obtain the correct cluster. Thus, no more than one access to cluster table 302 is required to translate any virtual address.

Given a cluster, the translation operation for a virtual address mapped by that cluster depends on the particular cluster structure used in a given embodiment. Examples of cluster structures and associated translation operations will now be described; it will be appreciated that these structures and operations are illustrative and not restrictive of the scope of the invention.

B. Cluster Structure Examples

Figure 4A:
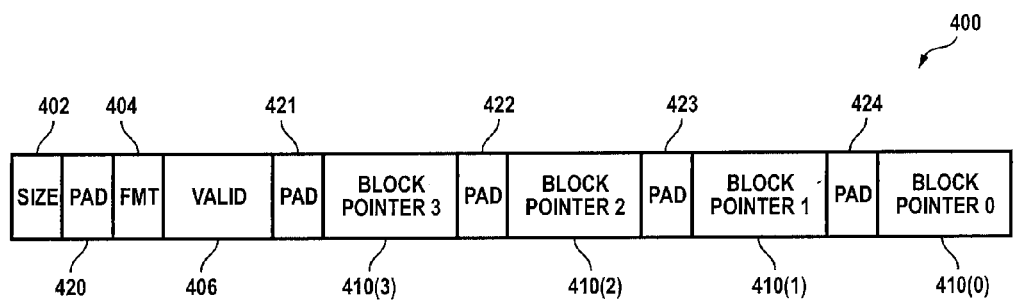
FIGS. 4A-B are bit-field representations of two cluster data structures according to embodiments of the present invention.
Figure 4B:
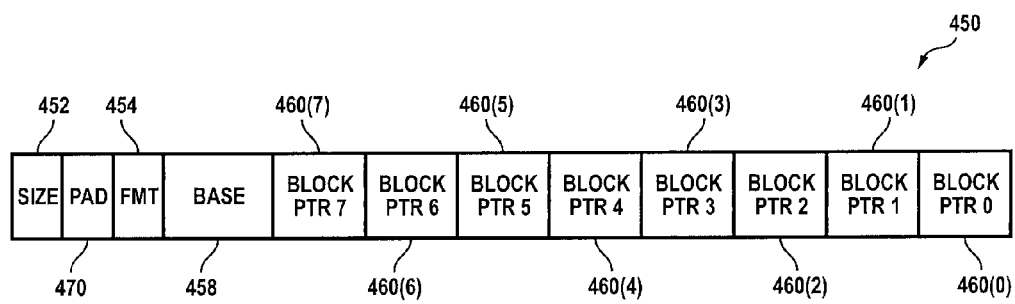

FIGS. 4A-B are bit-field representations of two cluster data structures according to embodiments of the present invention. FIG. 4A shows bit fields of a four-block cluster 400 (which may be stored as clusters CLUS n in cluster table 302 of FIG. 3), and FIG. 4B shows bit fields of an eight-block cluster 450 that may be stored in the same cluster table with four-block clusters 400 of FIG. 4A.

Turning first to FIG. 4A, four-block cluster 400 is a 16-byte (128-bit) data structure for mapping part of a 36-bit physical address space. Cluster 400 provides physical addresses for the respective starting locations of each of four blocks, which may be located anywhere in the physical address space. Blocks of varying sizes can be mapped by cluster 400, although each of the four mapped blocks has the same size.

In this embodiment, cluster 400 includes a 3-bit size index 402. Size index 402 encodes the size of each of the four blocks mapped by the cluster. Eight block sizes are supported, from a minimum size of 4 KB (one page) up to a maximum size of 512 KB (128 pages). Since the total amount of memory mapped by cluster 400 (referred to herein as the "range size") is four times the block size, size index 402 also encodes the range size, which varies from 16 KB (four one-page blocks) to 2048 KB (four 128-page blocks). Block sizes and range sizes corresponding to each value of size index 402 for cluster 400 are summarized in Table 1. It will be appreciated that other block or range sizes, including larger sizes, could be supported if desired, e.g., by expanding size index 402 to a larger number of bits.

TABLE 1

| Size index | Block Size (KB) | Range Size (KB) |
|---|---|---|
| 0 | 4 | 16 |
| 1 | 8 | 32 |
| 2 | 16 | 64 |
| 3 | 32 | 128 |
| 4 | 64 | 256 |
| 5 | 128 | 512 |
| 6 | 256 | 1024 |
| 7 | 512 | 2048 |

Format field 404 comprises one bit. In this embodiment, the bit is set to "0" for a four-block cluster. As will be seen below, format field 404 allows four-block clusters 400 and eight-block clusters 450 to co-exist in the same cluster table. In other embodiments, more than two formats can be supported, and format field 404 may contain additional bits so that each format has a unique identifier. In still other embodiments, only one cluster format is supported, and format field 404 may be omitted.

Valid field 406 also comprises one bit, which is set to "1" (or logical True) if the cluster contains valid block addresses and to "0" (or logical False) otherwise. For example, when the system is initialized, before any memory is mapped to virtual addresses, the cluster table would be filled with clusters with a valid bit of "0." As memory is mapped, the valid bit is changed for the appropriate clusters. When a cluster is accessed, its valid bit can be checked and any requests that return invalid clusters can be flagged.

Cluster 400 also includes four 24-bit "block pointer" fields 410. Each block pointer field 410 stores the page address (e.g., physical address or pointer) of the first page in one of the four blocks of physical address space mapped by cluster 400. Each page address is advantageously stored as a page index (e.g., without the 12 LSBs that correspond to byte offset within a page). The block pointers are advantageously arranged so that the lowest virtual addresses mapped by cluster 400 correspond to block pointer 410(0), the next virtual addresses correspond to block pointer 410(1), and so on. Accordingly, if a requested virtual address is in the first quarter of the range mapped by cluster 400, block pointer 410(0) is used to obtain the physical address; if the requested virtual address is in the second quarter, then block pointer 410(1) is used; and so on. It should be noted that the block pointers need not be arranged in order of physical address.

As an example, in cluster table 302 of FIG. 3, entry 304(1) stores a cluster CLUS 0, which may be an instance of cluster 400. In this example, block pointer 410(0) would store the starting address for block 314(4), block pointer 410(1) would store the starting address for block 314(9), block pointer 410(2) would store the starting address for block 314(11), and block pointer 410(3) would store the starting address for block 314(17).

For an invalid cluster, valid field 406 is set to logical false, and each block pointer field 410 is advantageously set to reference a "bit bucket" page in the system memory. As is known in the art, a bit bucket is an area of system memory that is guaranteed not to be used for storing meaningful data and therefore is a safe target for invalid (or null) pointers. When block pointer fields 410 of invalid clusters are set to reference a bit bucket page, any memory access operations that reference (by virtual address) an invalid cluster can be processed normally without affecting any data.

The remaining pad fields 420-424 include a total of 27 bits, bringing the size of cluster 400 to 16 bytes. Any number of pad fields can be arranged as desired within cluster 400. In this embodiment, pad fields 420-424 are not used to share cluster information, but other embodiments may use some or all of these bits (e.g., if more than 24 bits are needed for each block pointer 410).

Turning now to FIG. 4B, eight-block cluster 450 is also a 16-byte (128-bit) data structure for mapping part of a 36-bit physical address space. Cluster 450 provides physical addresses for the respective starting locations of each of eight blocks. The eight-block cluster allows a larger number of mappings (eight rather than four) to be stored in a single cluster although, as will be seen, the physical addresses of each of the eight blocks are required to have some number of MSBs in common. (Where this is not the case, two four-block clusters 400 can be used instead.)

In this embodiment, cluster 450 includes a three-bit size index 452. Like size index 402 of cluster 400, size index 452 encodes the size of each of the blocks mapped by the cluster 450, as well as the range size (which in the case of an eight-block cluster is eight times the block size). Block sizes and range sizes for size index 452 are summarized in Table 2. It will be appreciated that other block sizes or range sizes, including larger sizes, could also be supported, and that size index 452 may be modified to include the appropriate number of bits.

TABLE 2

| Size field | Block Size (KB) | Range Size (KB) |
|---|---|---|
| 1 | 4 | 32 |
| 2 | 8 | 64 |
| 3 | 16 | 128 |
| 4 | 32 | 256 |
| 5 | 64 | 512 |
| 6 | 128 | 1024 |
| 7 | 256 | 2048 |

Comparing Table 2 with Table 1, it will be apparent that size indices 402 and 452 are defined such that a given value of size index 402 or 452 corresponds to the same range size, regardless of whether the cluster is a four-block cluster 400 or an eight-block cluster 450. (Thus, for eight-block clusters, a size index value of zero is not used.) In embodiments where four-block clusters 400 and eight-block clusters 450 co-exist, this size-index definition allows the range size of a cluster to be readily determined without knowing whether the cluster is a four-block or eight-block cluster. Other definitions may also be used, and a particular size index value in eight-block cluster 450 need not correspond to any particular size index value in four-block cluster 400.

In eight-block cluster 450, format field 454 comprises one bit, which is set to "1" to distinguish eight-block cluster 450 from four-block cluster 400. Thus, a cluster table can store any combination of four-block and eight-block clusters, and the format field (advantageously placed at the same bit position for both cluster types) can be used to determine whether a particular cluster is a four-block or eight-block cluster.

Unlike four-block cluster 400, eight-block cluster 450 does not include a valid field, and eight-block clusters 450 are presumed valid. Eight-block cluster 450 may be invalidated by setting format field 454 to "0", making it a four-block cluster 400 whose valid bit 406 can then be set to "0". (Bit bucket references are advantageously entered in block pointers 410 as described above.)

Cluster 450 also includes a ten-bit base field 458 and eight fourteen-bit block pointer fields 460. These fields encode the respective physical addresses of the first page in each of eight blocks of memory. In one embodiment, base field 458 holds ten MSBs common to the physical addresses of all eight blocks, and each block pointer field 460 holds the next fourteen bits for one of the blocks, so that the starting physical address for a block can be formed by concatenating one of the block pointer fields 460 with base pointer field 458. In some embodiments, blocks may share fewer than ten MSBs; examples will be described below. Block pointers 460 are advantageously arranged so that the lowest virtual addresses mapped by cluster 450 correspond to block pointer 460(0), the next virtual addresses correspond to block pointer 460(1), and so on. Accordingly, if a requested virtual address is in the first eighth of the range mapped by cluster 450, block pointer 460(0) is used to obtain the physical address; if the requested virtual address is in the second eighth, then block pointer 460(1) is used; and so on. It should be noted that the block pointers are not necessarily arranged in order of physical address.

The remaining pad field 470 includes two bits, bringing the size of cluster 450 to 16 bytes. These pad bits may be disposed as desired within cluster 450. In this embodiment, pad field 470 is not used to store cluster content, although other embodiments might use these bits.

It will be appreciated that the cluster formats described herein are illustrative and that variations and modifications are possible. Cluster data structures may be adapted to provide translation data for various ranges of virtual address space, and clusters translating different-sized ranges in the virtual address space may co-exist in a cluster table. Cluster data may be structured in any manner desired, and the content or format of a cluster may vary from the embodiments described herein. Clusters are advantageously constructed such that the size of the cluster data structure is constant, regardless of the size of the address range mapped.

C. Address Translation Using Clusters

Embodiments of processes for using clusters to translate virtual addresses to physical addresses will now be described, with reference to the four-block clusters 400 and eight-block clusters 450 of FIGS. 4A-B. It is to be understood that similar processes may be implemented for other cluster formats.

Figure 5A:
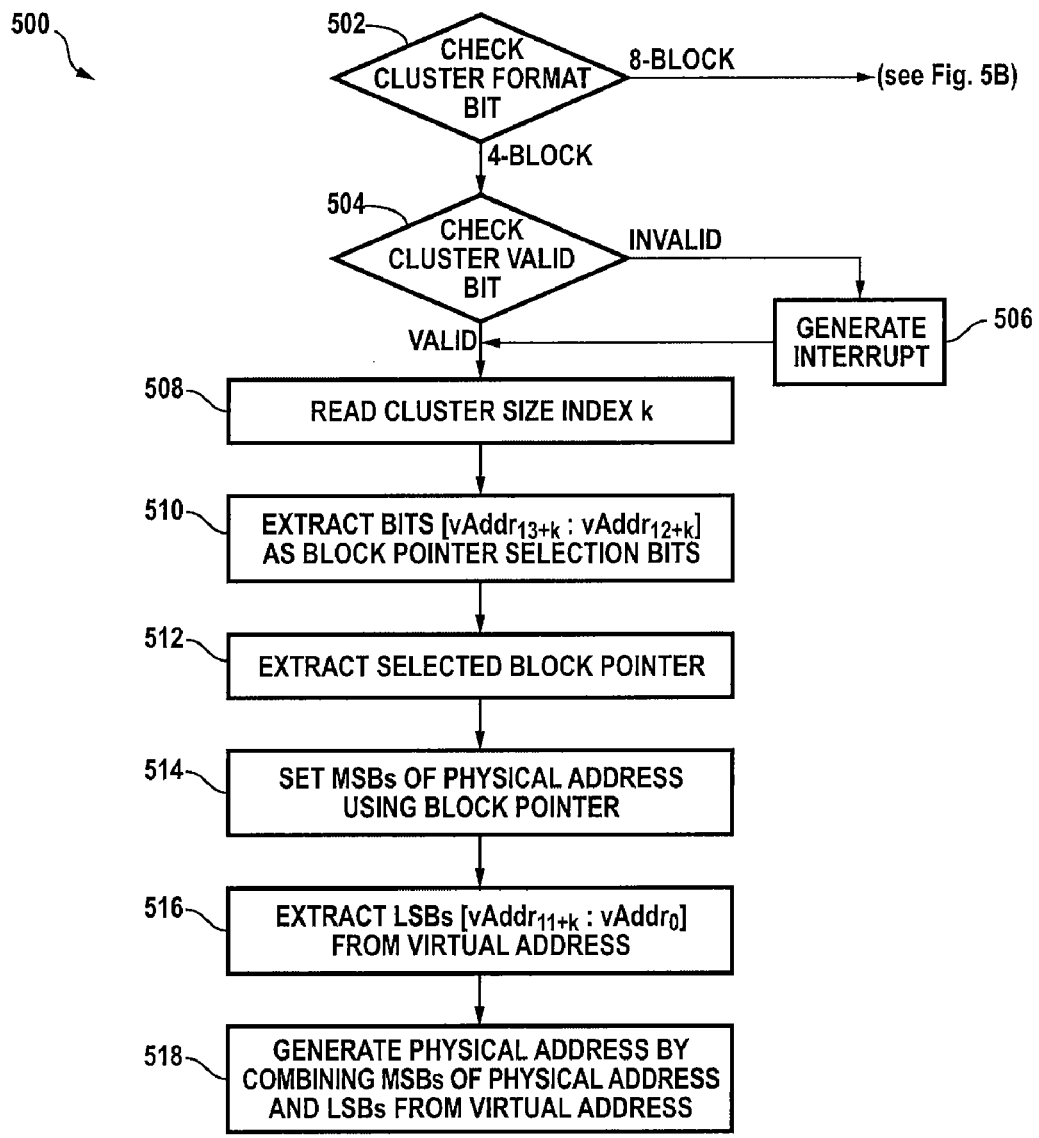
FIGS. 5A-B are flow diagrams of a process for translating a virtual address given a corresponding cluster according to an embodiment of the present invention.

FIG. 5A illustrates a process 500 for translating a virtual address (vAddr) given a corresponding cluster, where the cluster may have either of the formats shown in FIGS. 4A-B. The corresponding cluster may be obtained, e.g., from an in-memory cluster table by using an index derived from the virtual address vAddr, as described above with reference to FIG. 3.

At step 502, the cluster format field is checked to determine whether the cluster is a four-block cluster 400 or an eight-block cluster 450. Processing steps for an eight-block cluster 450 are described below with reference to FIG. 5B. For a four-block cluster 400, the valid bit is checked at step 504. An invalid cluster may cause an "invalid page request" or other appropriate interrupt to be generated at step 506 without otherwise affecting processing. At step 508, a size index k (in this embodiment $0 \leq k \leq 7$) is determined by reading size field 402 of cluster 400.

At step 510, two block pointer selection bits are extracted from the virtual address vAddr for use in selecting one of the four block pointers 410 in the cluster 400. Because block size is variable, which bits are used depends on the size index k. As described above, block pointer 410(0) should be used if the virtual address vAddr is in the first quarter of the range mapped by cluster 400 and so on. Accordingly, the two block pointer selection bits are those bits of vAddr that correspond to dividing the range of virtual addresses mapped by the cluster into quarters. For example, if the size index k is 0 (4 KB blocks), each block is one page (4 KB), and the block pointer is selected by bits in vAddr corresponding to page-size units (e.g., $[vAddr_{13}:vAddr_{12}]$). If the size index k is 1 (8 KB blocks), each block is two pages, and the block pointer is selected by bits in vAddr that correspond to two-page units (e.g., $[vAddr_{14}:vAddr_{13}]$). More generally, in this embodiment, the block pointer selection bits for a cluster 400 having size index k are given by $[vAddr_{13+k}:vAddr_{12+k}]$.

At step 512, the block pointer selection bits are interpreted as a number from 0 to 3 to select the corresponding 24-bit block pointer 410(0), 410(1), 410(2), or 410(3). At step 514, the selected block pointer is used to generate the 24 MSBs of a base physical address (pAddr). In one embodiment, the 24 bits $[pAddr_{35}:pAddr_{12}]$ are set equal to the corresponding bits of the selected block pointer 410, and the remaining bits of pAddr $[pAddr_{11}:pAddr_0]$ are initialized to zero. At step 516, the 12+k LSBs of the virtual address vAddr, corresponding to an offset within the block of size index k, are extracted.

At step 518, the physical address is generated by combining the MSBs of the physical address generated at step 514 with the LSBs $[vAddr_{11+k}:vAddr_0]$ of the virtual address. For example, in one embodiment, blocks are naturally aligned in the system physical address space (i.e., blocks of size 4 KB start at 4 KB boundaries of the address space, blocks of size 8 KB start at 8 KB boundaries, and so on). In this embodiment, for a cluster of size index k, only the 24−k MSBs of the block pointer are of interest, since the rest would be zero by the alignment rules. Accordingly, the physical address can be generated by setting bits $[pAddr_{35}:pAddr_{12+k}]$ to the corresponding number of MSBs of the block pointer and setting bits $[pAddr_{11+k}:pAddr_0]$ to the corresponding number of LSBs of the virtual address. In another embodiment, the LSBs $[vAddr_{11+k}:vAddr_0]$ of the virtual address are added to the physical address generated at step 514. Other techniques for generating the physical address may also be used.

Figure 5B:
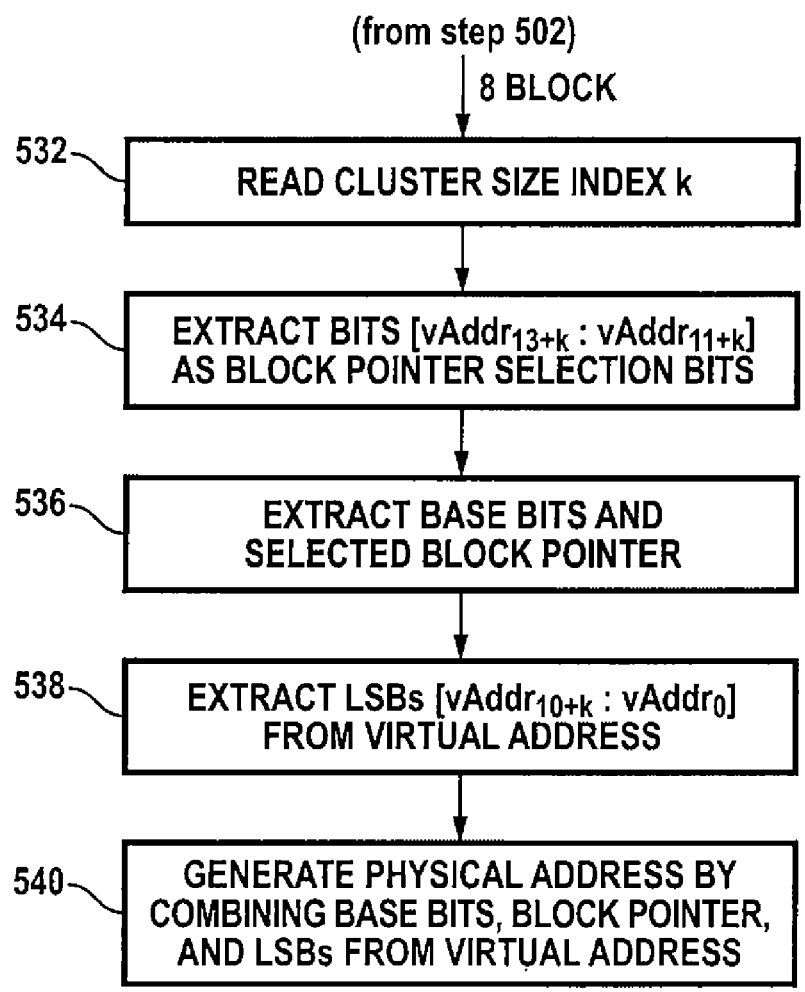

Returning to step 502, if the cluster is an eight-block cluster 450, the processing is shown in FIG. 5B. At step 532, a size index k (in this embodiment $1 \leq k \leq 7$) is determined by reading size field 452 of cluster 450. At step 534, three block pointer selection bits are extracted from the virtual address vAddr for use in selecting one of the eight block pointers 460. As with four-block clusters, because block size is variable, which bits are extracted depends on the size index k. As described above, block pointer 460(0) should be used if the virtual address vAddr is in the first eighth of the range mapped by cluster 450 and so on. Accordingly, the three block pointer selection bits are those bits of vAddr that correspond to dividing the region of virtual address space mapped by the cluster into eighths. For instance, if the size index 452 is 1 (4 KB blocks), each block is one page (4 KB), and the block pointer is selected by bits in vAddr that correspond to one-page units (e.g., [$vAddr_{14}$:$vAddr_{12}$]). If the size index 452 is 2 (8 KB blocks), each block is two pages, and the block pointer is selected by bits in vAddr that correspond to two-page units (e.g., [$vAddr_{15}$:$vAddr_{13}$]). More generally, in this embodiment, the block pointer selection bits for an eight-block cluster 450 having size index k are given by [$vAddr_{13+k}$:$vAddr_{11+k}$].

At step 536, the block pointer selection bits are used to select one of the eight fourteen-bit block pointers 460, and the ten-bit base pointer 458 is also extracted. At step 538, the 11+k least significant bits of virtual address vAddr, corresponding to an offset within the block of size index k, are extracted. At step 540, a physical address is generated by combining the base pointer (Base), the block pointer (Block), and the LSBs of the virtual address. This combination can be made in various ways.

For example, in one embodiment, the physical address is obtained by: (1) dropping the k−1 LSBs of the base address; (2) using the remaining bits of the base address [$Base_9$:$Base_{k-1}$] as the MSBs of the physical address [$pAddr_{35}$:$pAddr_{25+k}$]; (3) concatenating the fourteen block pointer bits [$Block_{13}$:$Block_0$] as bits [$pAddr_{24+k}$:$pAddr_{11+k}$]; and (4) concatenating the 11+k LSBs of the virtual address [$vAddr_{10+k}$:$vAddr_0$] as bits [$pAddr_{10+k}$:$pAddr_0$].

In another embodiment, the physical address is obtained by: (1) using the ten bits of the base address as the MSBs of a block starting address; (2) using the fourteen bits of the base pointer as the remaining bits of the block starting address; and (3) adding the 11+k LSBs of the virtual address as an offset to the block starting address.

In yet another embodiment, the physical address is obtained by a shifting procedure that includes: (1) aligning the ten bits of the base pointer [$Base_9$:$Base_0$] at the ten MSBs of a first 24-bit field (BF1) [$BF1_{28}$:$BF1_{14}$]; (2) shifting the block pointer left by k−1 bits in a second 24-bit field (BF2) so that the block pointer occupies [$BF2_{12+k}$:$BF2_{k-1}$] and the other bits of field BF2 are zero; (3) adding the bit fields BF1 and BF2 to obtain the 24 MSBs of the starting physical address; and (4) adding the 11+k LSBs of the virtual address as an offset. In a variation of this embodiment, a shift limit (M) is imposed. In this variation, the block pointer is shifted left by k−1 bits only if k−1≦M. If k−1 exceeds M, then the block pointer is shifted left by M bits.

More generally, any suitable combination of drop, shift, concatenation, and arithmetic operations may be performed on the base address, block pointer and virtual address bits to obtain the translation. In some embodiments, selection of a translation operation may depend on size index k.

It is to be understood that the address translation processes described herein are illustrative and that variations and modifications are possible. Steps described as sequential may be executed in parallel, order of steps may be varied, and steps may be modified or combined. While specific translation operations have been described in connection with particular cluster formats, those skilled in the art will recognize that a variety of other translation operations adapted to other cluster formats may also be implemented within the scope of the invention.

D. Creation of Clusters

Specific processes for creating clusters and updating cluster table 302 will now be described. As described above, a cluster stored in a cluster table entry provides data (e.g., address bits) for translating virtual addresses to physical addresses, and the range of virtual address space mapped by a particular cluster (referred to herein as "range size") is variable. FIG. 3 illustrates that the same cluster (e.g., CLUS 0) may be stored in multiple cluster table entries (e.g., entries 304(1)-304(4)) of cluster table 302. This arrangement allows each cluster to be obtained from cluster table 302 by reference to any virtual address mapped by that cluster; thus, the correct cluster for a particular translation can be obtained with one table access operation without advance knowledge of range sizes or boundaries.

Range sizes are established as clusters are created and added to the cluster table. In one embodiment for a graphics processing system, virtual address management and cluster creation are handled by a resource manager program (or graphics driver program) that manages a pool of physical memory. During system initialization, the resource manager requests an initial memory allocation (e.g., 8 to 64 MB) from system memory and places it into the pool. The resource manager then receives memory allocation requests from its clients (e.g., graphics driver programs) and allocates the requested memory from its pool, returning corresponding virtual addresses to the requesting client. If the amount of free memory in the pool is insufficient, the resource manager may request an additional increment of physical memory for the pool. Creation of clusters, which define mappings of virtual addresses to physical addresses, can occur when memory is added to the pool or as allocation requests are received.

Figure 6:
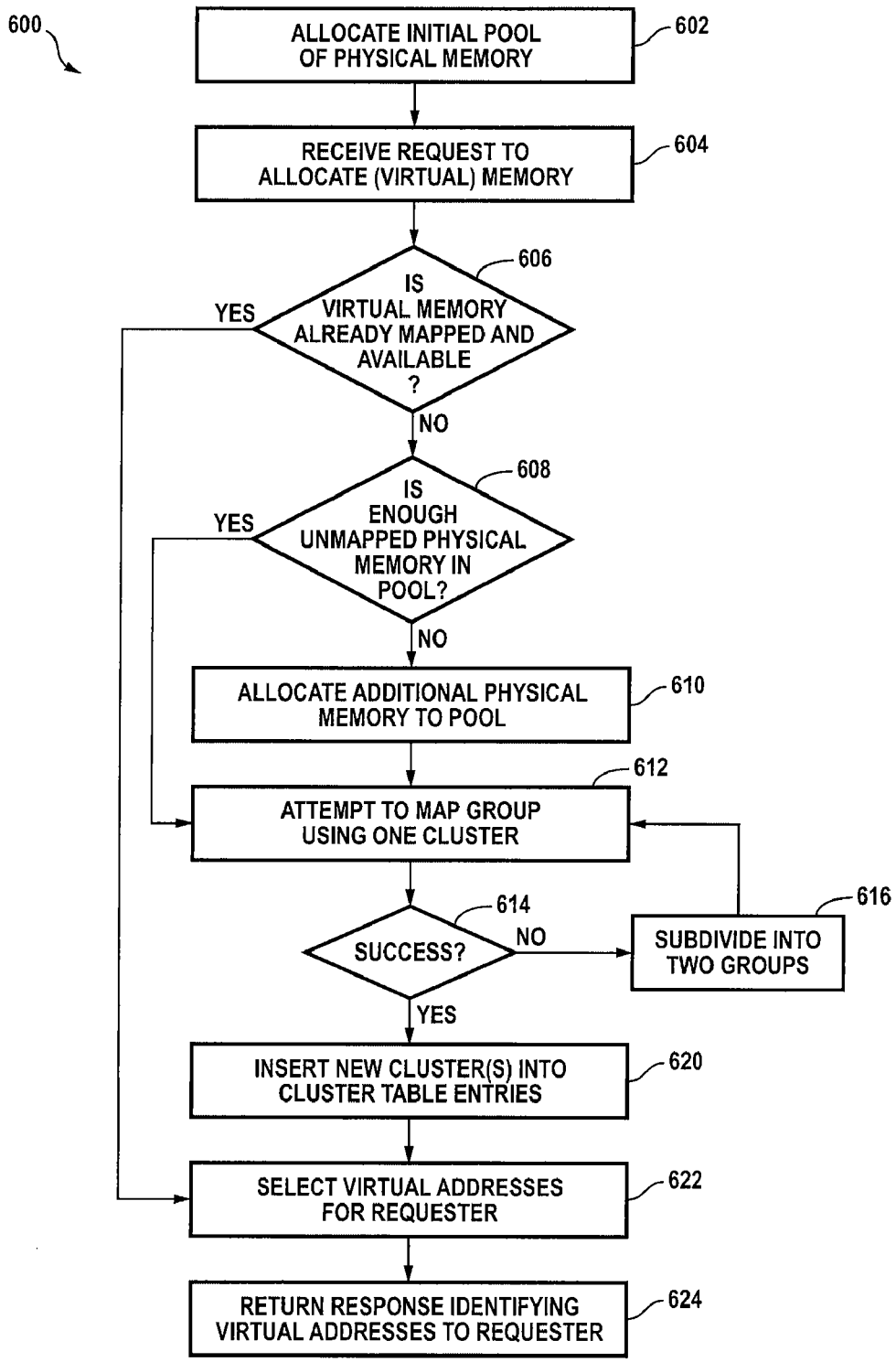
FIG. 6 is a flow diagram of a process for managing a virtual address space according to an embodiment of the present invention.

More specifically, FIG. 6 is a flow diagram of a process 600 that the resource manager may use to manage a virtual frame buffer, where the virtual frame buffer includes a physical memory pool and a corresponding virtual address space. At step 602, a pool of physical memory is created by requesting an initial memory allocation from an operating system, e.g., during system startup. This initial allocation may be large, e.g., 8-64 MB; a specific value may be selected based on anticipated demand for memory resources by clients of the resource manager. This physical memory may become unavailable to the rest of the system, although it is not yet usable by clients of the resource manager. In some embodiments, clusters that define mappings between some or all of this memory and the virtual address space may be created in anticipation of allocation requests; any such cluster creation may be done in accordance with steps 612, 614, 616 described below.

At step 604, the resource manager receives a memory allocation request from a requester, e.g., a driver or application process. The requester may be unaware that the frame buffer is implemented as a virtual frame buffer, so that from the requester's perspective, the request and response may be indistinguishable from the case of a non-virtual frame buffer.

At step 606, the resource manager determines whether a sufficiently large block of virtual memory is already mapped and available (i.e., not already allocated to a previous requester). If not, then at step 608, the resource manager determines whether a sufficient amount of unmapped physical memory is available in its pool. If, at step 608, sufficient physical memory is not available, the resource manager allocates an additional increment of physical memory at step 610. In one embodiment, this increment is at least large enough to fulfill the current request and may be larger (e.g., a 2 MB minimum).

At step 612, once a sufficiently large amount of unmapped physical memory has been allocated, the resource manager attempts to represent all of the unmapped physical addresses using a single four-block or eight-block cluster. That is, it attempts to divide the physical addresses into four or eight blocks of the same size, where each block consists of a contiguous range of physical addresses. Different blocks in the cluster might or might not occupy contiguous physical addresses (see, e.g., CLUS 1 of FIG. 3, where blocks 314(5) and 314(6) are contiguous but blocks 314(15) and 314(20) are not). At step 614, if the attempt is unsuccessful, the resource manager subdivides the unmapped physical addresses into two groups at step 616 and returns to step 612 to attempt to represent each of these smaller groups using a single cluster. Division into groups is advantageously based on physical addresses, and the two groups need not contain equal amounts of memory. Iteration of steps 612, 614, and 616 may continue until all of the unmapped physical addresses have been placed into clusters, or until a collection of new clusters large enough to fulfill the current request has been generated.

At step 620, the new clusters are inserted into entries of the cluster table. For example, in an embodiment where each cluster maps at least 16 KB of virtual address space, each cluster is inserted at a 16 KB virtual address boundary. Each cluster is inserted at one or more entries corresponding to the virtual addresses that it maps, as shown in FIG. 3. It will be appreciated that the number of entries containing a particular cluster is determined by the range size of the cluster; for instance, a cluster of FIG. 4A (or FIG. 4B) that has size index k would be inserted at $2^k$ entries. For example, in cluster table 302, a cluster with a range size of more than 16 KB (e.g., CLUS 0) is inserted at the entry corresponding to the first address it maps and every following entry within its range. Note that the position of the cluster in the table determines which virtual addresses are mapped to the physical addresses referenced by the cluster; accordingly, newly created clusters can be placed in the cluster table at any convenient position. For example, in some embodiments, clusters may be aligned at natural virtual address boundaries corresponding to the range size of the cluster (e.g., the first address mapped by a 16 KB cluster is aligned at a 16 KB boundary, the first address mapped by a 32 KB cluster is aligned at a 32 KB boundary, and so on). When a group of clusters is created, the clusters may be re-ordered to comply with such a rule, or with any other alignment rules that may be implemented.

At step 622, once clusters have been defined for a sufficient amount of the virtual address space, a range of virtual addresses to be allocated to the requester is selected. The resource manager may simply select the next unused virtual addresses, or it may select virtual addresses based on the client and/or intended use of the allocated space (e.g., the first 2 MB of virtual address space could be reserved for a pixel buffer). It should be noted that the range of virtual addresses selected at step 622 need not align with cluster boundaries or with block boundaries within a cluster. Various techniques for selecting addresses to satisfy a memory allocation request are known in the art and may be employed at step 622.

At step 624, a response is returned to the requester. The response may include an identifier of the starting virtual address for the allocated range. This identifier is advantageously provided in a form that can be used in a conventional fashion; the requester may be unaware of clusters or other details of the virtual frame buffer implementation.

To facilitate management of the virtual address space, the resource manager may also maintain an allocation table that tracks whether a given virtual address has a cluster, whether it is allocated or available, and the like. Memory allocation tables of generally conventional design may be adapted for use in this context. Where the resource manager is able to define mappings for the virtual address space (i.e., create clusters) at a different time and with a different granularity than its allocations of virtual memory to clients, the likelihood of creating large clusters increases.

It will be appreciated that the memory allocation and clustering process described herein is illustrative and that variations and modifications are possible. Steps described as sequential may be executed in parallel, order of steps may be varied, and steps may be modified or combined. For a given embodiment, the algorithm used to define clusters for a given allocation of physical memory is generally dependent on cluster format. Alignment rules for starting addresses of physical memory blocks and/or starting virtual addresses of clusters may be established as desired.

III. Translation Lookaside Buffer (TLB) System

As described above, a single access to a cluster table (e.g., cluster table 300 of FIG. 3) returns translation information (e.g., cluster 400 or 450 of FIGS. 4A-B) for all virtual addresses within a range, where the size of the range may be different for different clusters; a single cluster may map a large or small range within the virtual address space. Caching recently used clusters can avoid the need to access cluster table 300 (in main memory) to translate other addresses covered by the same cluster. Depending on actual range sizes of the clusters in a given embodiment, cluster-based caching can enhance system response for a given cache size by increasing the amount of virtual address space that is covered by the cache-resident clusters. An embodiment of a translation lookaside buffer (TLB) system with cluster caching is described in overview in Section III.A below; Sections III.B-IIII.F provide further description of some of the components.

The TLB system described herein can be implemented in a wide variety of computer systems in different contexts, including, e.g., as GTLB 142 of computer system 100 (FIG. 1) or GTLB 242 of computer system 200 (FIG. 2) described above. It is to be understood that a variety of TLB implementations using clusters are possible in graphics or non-graphics contexts and that the following description is illustrative and not restrictive of the scope of the invention.

A. Overview

Figure 7:
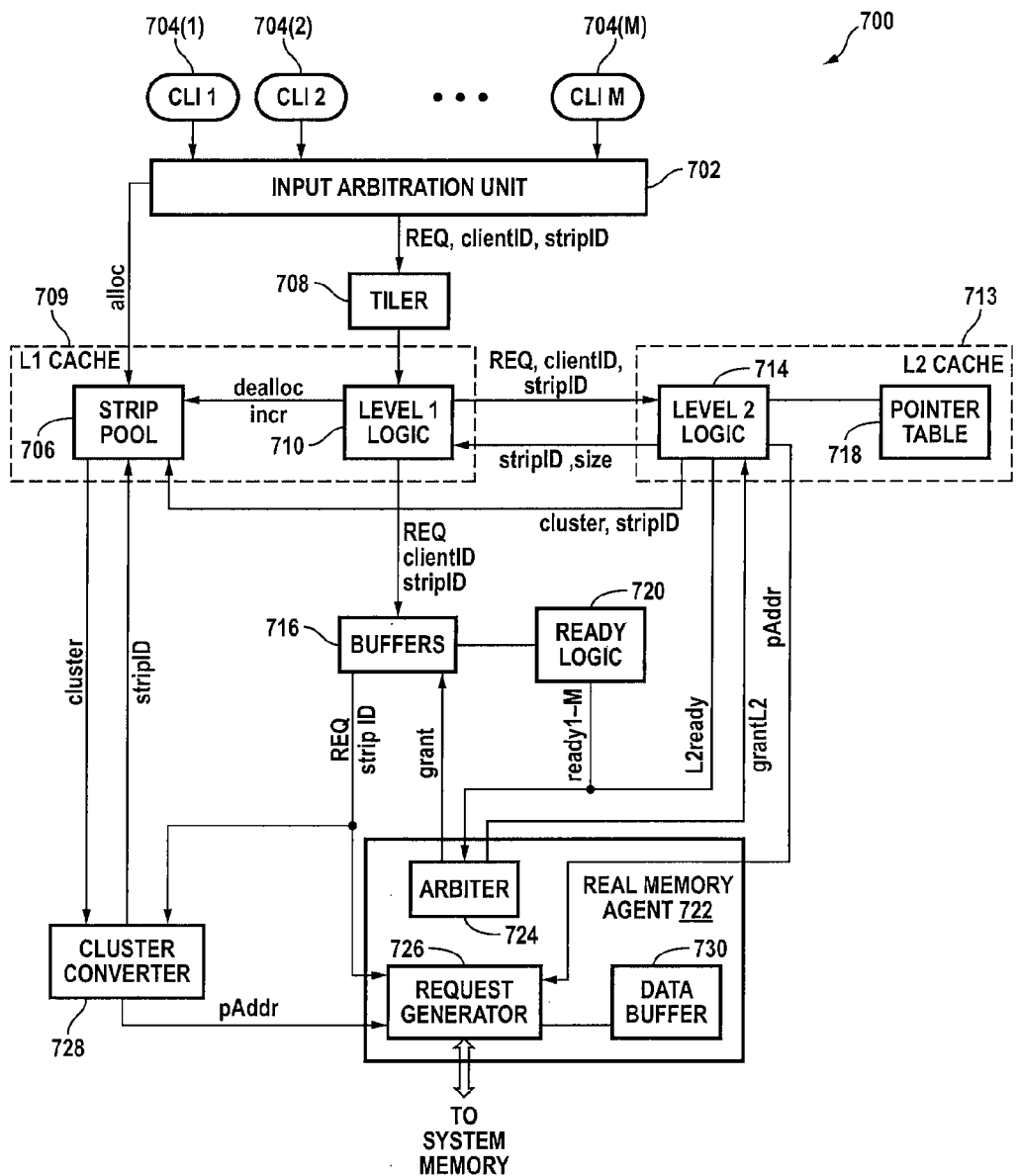
FIG. 7 is a high-level block diagram of a translation lookaside buffer (TLB) system with a two level cache according to an embodiment of the present invention.

FIG. 7 is a high-level block diagram of a TLB system 700 with a two level cache according to an embodiment of the present invention. TLB system 700 is a pipelined system for handling memory access (or address translation) requests from multiple clients. Throughput of the pipeline is advantageously designed to at least match the rate of memory responses, and buffering may be provided to protect against temporary upward fluctuations in the rate of requests. Requests from each client are processed in order with respect to other requests from the same client but may be processed out of order with respect to requests from other clients. In other embodiments, requests from a client may be processed out of order.

The first stage of the pipeline includes an input arbitration unit 702 that receives memory access (or translation) requests from some number M of clients 704. Each request (REQ) specifies a virtual address (vAddr) and in the case of a memory access request a memory operation to be performed, e.g., read or write. On each clock cycle, input arbitration unit 702 selects a request REQ from one of the clients to be forwarded to the next stage. In order to avoid pipeline stalls, before forwarding a particular request REQ, input arbitration unit 702 guarantees that the downstream resources that might be needed for processing that request are available.

The second pipeline stage includes a tiler 708. Tiler 708 supports tile-based addressing of the virtual memory. Tile-based addressing is a common feature of conventional graphics processing systems that access physical memory directly. For example, within a pixel buffer, rather than assigning memory addresses across each complete row of the display, the display can be divided into tiles, with each tile including a given number of rows and a given number of columns for each row. As is known in the art, tiled memory addressing can reduce the number of page accesses needed during various rendering operations (e.g., rasterization of primitives), and tile size can be optimized in a variety of ways. Where tiled addressing is in use, tiler 708 translates a virtual address supplied by the client to a tile-based virtual address; numerous algorithms for tiling that may be implemented in tiler 708 are known in the art. Tiler 708 may be configured to perform tiling or not on a per-client or per-request basis (e.g., in some embodiments, only virtual addresses corresponding to the pixel buffer are tiled). It will be appreciated that tiler 708 is optional and that other types of address conversions could also be supported in addition to or instead of tiling. Tiler 708 provides the request REQ—which may now include a modified virtual address—to the next pipeline stage.

The third pipeline stage provides a non-blocking two-level cluster cache. The Level 1 cache 709 includes a Level 1 cluster store (also referred to herein as a "strip pool") 706, and the Level 2 cache 713 includes a Level 2 cluster store (also referred to herein as a "pointer table") 718. Strip pool 706 holds a fixed number of clusters using data structures referred to herein as "strips." Based on the requested virtual address vAddr, a Level 1 (L1) logic block 710 associates each request REQ with one of the strips in strip pool 706; this may be a newly allocated strip or a strip that has previously been allocated for storing the cluster corresponding to the requested address. L1 logic block 710 then determines whether the cluster is present in the strip and, if not, whether a request for the cluster has already been sent to a Level 2 (L2) logic block 714. If the cluster has not been requested, L1 logic block 710 forwards the request REQ to L2 logic block 714, along with an identifier (stripID) of the associated strip in strip pool 706.

Without waiting for the cluster to appear in strip pool 706, L1 logic block 710 forwards the request REQ to the fourth pipeline stage, together with the strip identifier stripID associated with the request. Thus, L1 logic block 710 can continue to process subsequent requests without waiting for a cache miss to be resolved.

In response to a request REQ from L1 logic block 710, L2 logic block 714 obtains or fetches the cluster needed to translate the virtual address for that request. More specifically, L2 logic block 714 determines whether a cluster corresponding to the virtual address is present in pointer table 718. If not, L2 logic block 714 requests the appropriate cluster from the cluster table stored in system memory (the "in-memory table," not shown). L2 logic block 714 handles such requests in a non-blocking manner so that it can continue to process subsequent requests from L1 logic block 710 while waiting for a cache miss to be resolved. Once L2 logic block 714 obtains the cluster—whether from pointer table 718 or from system memory—it writes the cluster data to the location in strip pool 706 specified in the strip identifier stripID. To the remaining elements of system 700, the only difference between a hit in pointer table 718 and a miss is the length of time before the cluster data appears in strip pool 706.

The fourth pipeline stage includes buffers 716 and ready logic 720. Buffers 716 maintain a queue of pending requests REQ from each client, where each request REQ also includes its associated strip identifier stripID. Ready logic 720 monitors the pending requests in buffers 716 and determines, for each request, whether a valid cluster is present in the associated strip in strip pool 706. Ready logic 720 provides a set of ready signals (ready1-M) to a real memory agent 722, which selects a request to be translated and forwarded to system memory.

Real memory agent 722 includes an arbiter 724 and a request generator 726. During the fourth pipeline stage, arbiter 724 receives the ready signals ready1-M from ready logic 720 and selects one of the ready requests for fulfillment. Arbiter 724 returns a "grant" signal for the selected request to ready logic 720.

During the fifth pipeline stage, the selected request REQ is forwarded from buffers 716 to request generator 726 and to a cluster converter 728. Using the strip identifier for the request, cluster converter 728 retrieves the appropriate cluster from strip pool 706 and computes the physical address (pAddr) corresponding to the virtual address vAddr. The physical address pAddr is provided to request generator 726, which sends one or more sub-requests to system memory and directs the response back to the requesting client.

In this embodiment, memory access requests from L2 logic block 714 (which occur in the event of an L2 cache miss) are also handled by real memory agent 722. When L2 logic block 714 needs to access the in-memory cluster table, it sends a ready signal (L2ready) to arbiter 724. When arbiter 724 grants this request, it sends a grant signal (grantL2) back to L2 logic block 714, which then provides the address to be accessed. This address is provided as a physical address (pAddr), which may be determined, e.g., by adding an index computed from the requested virtual address (vAddr) as an offset to a base address of the in-memory cluster table. The virtual address is advantageously rounded to align with cluster boundaries in the cluster table prior to adding it to the base address. Thus, L2 requests may be processed without using cluster converter 728.

TLB system 700 is designed to manage requests from multiple clients. In this embodiment, a client identifier (clientID) for each request is passed through system 700 and used to manage various shared resources, such as strip pool 706 and pointer table 718. For instance, each client can be allocated specific sections of strip pool 706 and/or pointer table 718 that may not be overwritten by other clients. Each client may also be associated with a group, and resources may be allocated at the group level as well as (or instead of) the client level. In some embodiments, one client may divide its memory requests among two or more "streams," with each request including a stream identifier. Streams may be useful, e.g., where a client accesses two different types of data that are stored in different regions of virtual address space. For example, a graphics front end client may access both vertex data and texture data, and may use a separate stream for each. Resources may be allocated per group, per client, or per stream as desired.

The client identifier is also used by buffers 716 to determine where to store a request while it awaits access to real memory agent 722, and requests from each client may be kept in order, while requests from different clients can proceed out of order based on availability of clusters in strip pool 706. The client identifier may also be used to prioritize requests from different clients (e.g., in a graphics processing application, a display driver, or scanout, client may receive top priority) in order to provide optimal memory response.

The L1 and L2 caches 706, 718 and logic blocks 710, 714 are advantageously implemented in a non-blocking manner, so that requests flow from input arbitration unit 702 through L1 logic block 710 to buffers 716 in a constant number of clock cycles. In the event of an L1 or L2 cache miss, ready logic 720 allows other requests, for which clusters are available in strip pool 706, to proceed ahead of a request that is waiting for its cluster to be returned from L2 logic block 714 (which may be waiting on system memory). Non-blocking cache implementations, while not required, can help to increase throughput of the TLB pipeline.

TLB system 700 can also be implemented to support both "transparent" and "visible" translation modes on a per-client (or per-request) basis. In transparent mode, real memory agent 722 forwards requests to the system memory as described above so that, from the client's perspective, the presence or absence of TLB system 700 (or any other virtual address translation mechanism) is irrelevant. To support transparent mode for write requests, where the client provides write data along with the virtual address, real memory agent 722 may include a data buffer 730 for storing the write data while the virtual address is being translated. In such embodiments, as part of guaranteeing resource availability, input arbitration logic 702 allows a write request to proceed through the translation pipeline only if space is available in data buffer 730. Before a write request leaves the input arbitration stage (or, in some instances, before it enters), the write data is transferred to data buffer 730, from which it is later retrieved by request generator 726. In an alternative embodiment, the write data may be carried through the translation pipeline along with the virtual address; those of ordinary skill in the art will recognize that such embodiments may require significant amounts of additional buffer space for buffering the write data at various pipeline stages.

In the visible translation mode, TLB system 700 processes the request through the pipeline until the address translation is obtained from cluster converter 728. At that point, instead of using request generator 726 to send a memory request, real memory agent 722 returns the translated physical address to the requesting client, which can store this address for later use. For example, a client using the visible translation mode can request a translation in advance of the need to access the corresponding memory; when memory access is needed, the client can avoid accounting for the variable latency associated with TLB system 700 in its data path by providing the stored physical address to a memory interface. In some embodiments, real memory agent 722 is provided with an additional port (not shown) for receiving requests where the client already has the physical address; alternatively, a separate memory agent may be provided to handle such requests.

Use of visible and transparent translation modes may be controlled on a per-client basis. For example, a real-time client with a high data transfer rate (e.g., a scanout or display client in the context of a graphics processing subsystem) may advantageously use the visible translation mode. Other clients may use transparent translation mode, which allows design of the client to be less affected by the presence or absence of address translation.

Specific components of TLB system 700 will now be described in further detail.

B. Input Arbitration

Figure 8:
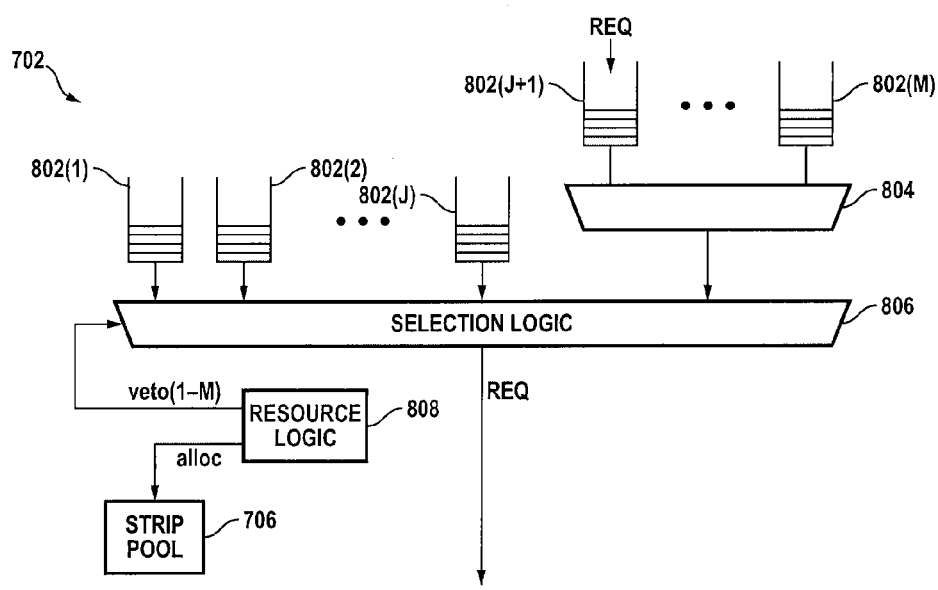
FIG. 8 is a block diagram of an input arbitration unit for a multi-client TLB system according to an embodiment of the present invention.

FIG. 8 is a block diagram of an input arbitration unit 702 according to an embodiment of the present invention. Input arbitration unit 702 includes a number M of FIFOs 802, each of which is associated with a different one of clients 1-M (not shown). Of these clients, some number J (J<M) are considered "low priority" clients while the rest are "high priority" clients. In one embodiment, up to twelve clients are supported, with up to five of these being considered high priority; other numbers of clients and high-priority clients may be supported, and the number of priority levels may be varied. In some embodiments, the number of FIFOs 802 may be less than the actual number of clients, and multiple clients may be associated with the same FIFO 802.

Requests (REQ) from each client are queued in the FIFO 802 that is associated with that client. In one embodiment, each request REQ includes a virtual address (vAddr), an indicator (e.g., opcode) for the desired memory operation (read, write, etc.), and, in the event of a write operation, data to be written. The request may also include a client identifier (clientID); if it does not, input arbiter 702 attaches a client identifier that becomes part of the request REQ. Where a client separates its requests into multiple streams, a stream identifier may be provided with each request.

Each client advantageously slices its request so as to avoid requiring access to multiple pages in the physical address space. For instance, if physical address space is allocated by the operating system in 4 KB pages, the client may slice requests so that no request crosses a 4 KB address boundary. In other embodiments, the client may slice the request so that no request crosses a cluster address boundary for a cluster with minimum range size (e.g., 16 KB), or a block address boundary (e.g., 4 KB). The client may compute a separate virtual address for each slice of the request or may provide a base virtual address for the entire request and a slice number for each slice, from which a virtual address for the slice can be computed. In other embodiments, this slicing may be performed by input arbiter 702 as requests arrive at the inputs of FIFOs 802.

Two stages of arbitration logic are provided by multiplexer 804 and selection logic 806. Multiplexer 804 arbitrates among the high priority FIFOs 802(K+1)-802(M) according to some scheduling algorithm (e.g., round robin, least recently serviced, or a more complex algorithm that takes into account other conditions such as the number of requests in each FIFO and/or relative priorities that may be assigned to different ones of the high-priority clients), and forwards the selected request as a high priority candidate to selection logic 806. Selection logic 806 arbitrates between the high priority candidate and any requests in low priority FIFOs 802(1)-802(K). In one embodiment, selection logic 806 includes a "high priority wins" algorithm that always selects the high priority candidate if one is waiting; in the event that no high priority request is waiting, selection logic 806 may select among the low-priority FIFOs 802(1)-802(K) using some scheduling algorithm (e.g., any of the algorithms mentioned above in connection with multiplexer 804).

As noted above, input arbiter 702 guarantees availability of resources at later pipeline stages. Accordingly, selection logic 806 receives resource availability data from a resource logic unit 808, which determines, on a per-client basis, whether the needed downstream resources are available to process the request and provides corresponding "veto" signals for each client to selection logic 806. The scheduling algorithms of selection logic 806 advantageously take these veto signals into account, so that a client is not selected on a given clock cycle if its veto signal is asserted by resource logic unit 808.

Resource logic unit 808 advantageously monitors the status of all downstream resources, including strips in strip pool 706, various buffers in L2 logic unit 714 (described below), and space in buffers 716. Some or all of these resources may be allocated on a per client basis or may be shared among all clients or subsets of clients. It will become apparent that these resources may not actually be needed for a particular request.

For example, at this stage it is not known whether a new cluster will need to be stored in a new entry (strip) strip pool 706 or whether a previously allocated strip can be reused. Resource logic unit 808 assumes that a new cluster will be needed and pre-allocates a strip in strip pool 706 for holding such a cluster. (As will be seen later, this pre-allocated strip might or might not be used for a given request). In some embodiments, each client is entitled to use only specified strips within strip pool 706, and resource logic unit 808 selects from the allowed strips for each client. If no strip is available for a given client, resource logic unit 808 vetoes that client by asserting the corresponding veto signal.

Availability of other resources may be handled similarly, with resource logic unit 808 vetoing the request if any needed resource cannot be guaranteed. As another example, resource logic 808 may also determine the availability of space in buffers 716 (FIG. 7) to store a request from the selected client; if space is not available for that client, resource logic 808 vetoes the request. As yet another example, if the request selected by selection logic 806 is a write request, the associated write data will be stored in data buffer 730 of real memory agent 722 (FIG. 7) while the virtual address is being translated. If a write request is selected, resource logic 808 determines the availability of space in data buffer 730; if sufficient space is not available, the write request is vetoed.

In some embodiments, selection logic 806 is configured to select one request per clock cycle, and vetoes by resource logic 808 cause dispatching of a new request into the pipeline to be postponed to the next clock cycle. In other embodiments, re-selection by selection logic 806 in the event of a veto can occur in the same clock cycle as the veto, so that a request can be dispatched into the pipeline on nearly every clock cycle. Any vetoed requests may be considered again by selection logic 806 after some number of clock cycles and may be processed if the needed resources have become available.

C. Level 1 Cache

Figure 9:
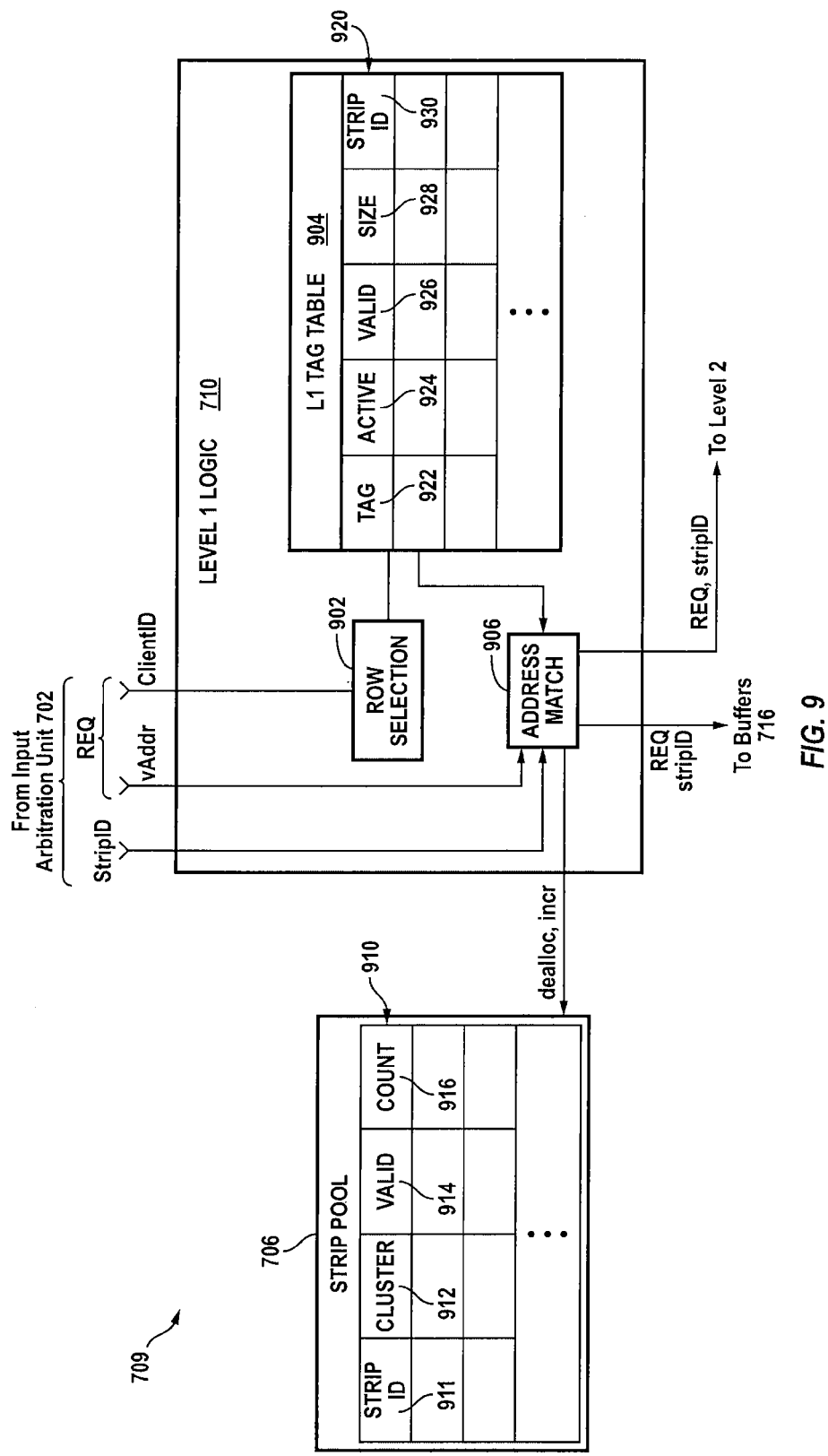
FIG. 9 is a block diagram of a Level 1 lookup logic block and cluster cache according to an embodiment of the present invention.

As shown in FIG. 7, the request selected by input arbiter 702 is passed to L1 cache 709 (optionally after tiled-address conversion by tiler 708). FIG. 9 is a block diagram showing additional details of L1 cache 709 according to an embodiment of the present invention. In this embodiment, L1 logic block 710 receives the request and determines whether the cluster needed to translate the requested address is present in strip pool 706; a cluster is treated as being present if it has already been requested from L2 cache 713, even if it has not yet been returned. L1 logic block 710 forwards all requests to buffers 716 in the same number of clock cycles, regardless of whether a cluster for the requested virtual address is present in strip pool 706.

Strip pool 706 implements the L1 cluster store. Strip pool 706 provides storage for a fixed number of clusters in a corresponding number of entries (referred to herein as strips) 910. The number of strips 910 in strip pool 706 may be optimized for a particular system configuration, e.g., to accommodate potentially long latencies associated with retrieving clusters from system memory. Each strip 910 is uniquely identified by a strip identifier 911. Each strip 910 also includes a cluster storage area 912 large enough to hold a cluster, as well as additional information such as a valid bit 914 and a counter 916. A strip 910 is generally allocated for storing a cluster before the cluster is available; valid bit 914 is used to determine whether the correct cluster is actually present in strip 910 or not. Counter 916 is used to determine whether strip 910 is needed for any pending requests or is free for re-allocation.

When resource logic 808 of input arbiter 702 pre-allocates a strip, it selects a strip 910 whose counter 916 is zero. Counter 916 of the selected strip is incremented (to one) to indicate that the strip is in use, and valid bit 914 is set to zero to indicate that the cluster is not yet present in cluster storage area 912.

L1 logic block 710 includes a row selection unit 902, an L1 tag table 904, and an address match module 906. L1 tag table 904 includes a fixed number of rows 920, each of which maps a range of virtual addresses to a strip 910 in strip pool 706. The number of rows 920 in L1 tag table 904 may be optimized for a particular system configuration, e.g., based on the number of clients and/or streams. Each row 920 includes a tag 922, an active bit 924, a valid bit 926, a size index 928, and a strip ID field 930. Strip ID field 930 stores a value corresponding to a strip identifier 911 of a strip 910 in strip pool 706, thereby associating the tag 922 to the cluster that is (or will be) stored in cluster area 912 of that strip 910. Active bit 924 indicates whether an L2 request has been made for this cluster, and valid bit 926 indicates whether the requested cluster has been stored in strip 910.

Tag 922 and size index 928 are used to specify the range of virtual addresses that can be translated using the associated cluster in strip pool 706. More specifically, tag 922 represents a starting address for a range of virtual addresses that can be translated using the associated cluster. Size index 928, which is advantageously initialized to a minimum value and updated when the requested cluster is received, stores a value indicating the range size of the cluster (e.g., using a 3-bit size index field as described above with respect to FIG. 4). In one embodiment, the minimum value corresponds to the smallest allowed cluster size, which may be a configurable parameter. In another embodiment, L1 logic block 710 may receive a dynamically updated parameter that indicates the smallest cluster size currently existing in the cluster table. From tag 922 and size index 928, the ending address for the range (in this embodiment, the largest virtual address that can be translated using the associated cluster) can be determined.

Each row 920 in L1 tag table 906 may be allocated to a particular client, or a group of clients may share one or more rows. Where a client uses multiple streams, rows may be allocated per stream (e.g., one or two rows for each stream). Allocation of rows to clients, streams, or groups may be configurable based on one or more parameters. Specific row allocations are advantageously determined at system startup, although some embodiments may support dynamic allocations. In still other embodiments, row allocations may be hardwired to particular client and/or stream identifiers.

In operation, all rows 920 are initially set to the inactive and invalid state (i.e., active bit 924 and valid bit 926 are both set to "false"). Rows 920 are filled with information as requests to L2 logic block 714 are generated. More specifically, row selection unit 902 receives a request (or just the client identifier for the request) and selects one or more rows 920 of L1 tag table 904 that have been allocated to that client (or stream or group as appropriate). Each selected row 920 is provided to address match unit 906, which determines whether the requested virtual address is "covered" by the tag 922, i.e., whether the associated cluster in strip pool 706 is expected to provide a cluster for use in translating the virtual address. If a tag 922 that covers the virtual address is not found in L1 tag table 904, address match unit 906 overwrites one of the rows 920 in L1 tag table 904 with a new tag 922 that does cover the virtual address and requests the corresponding cluster from L2 logic block 714.

Figure 10:
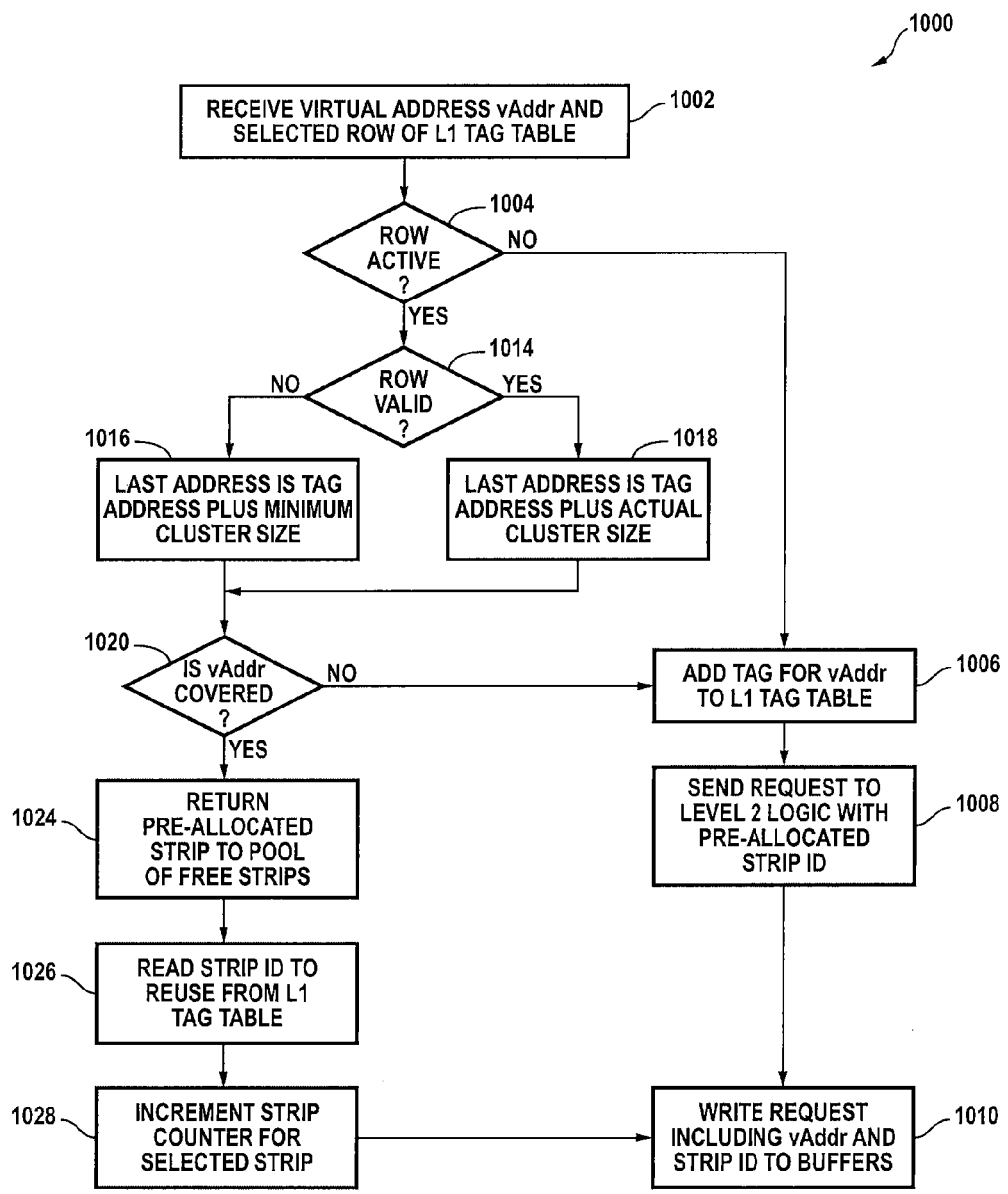
FIG. 10 is a flow diagram of a Level 1 lookup process for determining whether a requested virtual address is mapped by a cached cluster according to an embodiment of the present invention.

FIG. 10 is a flow diagram of a lookup process 1000 that can be performed by address match unit 906 to determine whether the requested virtual address is covered by a tag 922. The process is illustrated with reference to a single row 920, but it will be appreciated that similar logic can be implemented to examine multiple rows 920, with a request for L2 logic block 714 being generated in the event that no row 920 contains a covering tag 922.

At step 1002, address match logic 906 receives the requested virtual address (vAddr) and the row 920. At step 1004, address match logic 906 checks the active bit 924 to determine whether row 920 is active. If row 920 is not active (as is initially the case), at step 1006, new data is written to row 920 to indicate that a cluster is being requested.

More specifically, at step 1006, a tag corresponding to the requested virtual address is stored as tag 922. This tag is advantageously constructed by aligning the requested virtual address to an entry boundary in the cluster table (e.g., a multiple of 16 KB for the cluster table of FIG. 3). In fact, tag 922 may include just those bits of the aligned address that are not aligned to zero (e.g., dropping the 14 LSBs if entry boundaries are aligned to 16 KB). Also at step 1006, the strip identifier 930 of row 920 is set to the identifier 911 of the strip 910 that was pre-allocated by resource logic 808 of input arbiter 702; this is where the associated cluster will be stored in strip pool 706 once it is obtained. Active bit 924 is set to "true" to indicate that an L2 request for the associated cluster for the tag 922 has been made, and valid bit 926 is set to "false" to indicate that the cluster has not yet been received. Size index 928 may be set to the smallest size (e.g., 0). At step 1008, the request REQ (including the virtual address vAddr and associated stripID) are forwarded to L2 logic block 714. At step 1010, the request REQ is also forwarded to buffers 716. It should be noted that step 1010 is advantageously performed without waiting for a response from L2 logic block 714.

Returning to step 1004, if row 920 is active, then at step 1014 it is determined whether row 920 is valid, i.e., whether a cluster has already been stored at the location in strip pool 706 specified by strip ID 930. If the cluster has not been received, then the range of virtual address space that is translated by that cluster is unknown and is presumed to have the minimum size (16 KB in the embodiment described in Section II above). Accordingly, at step 1016, the "last address" (i.e., largest virtual address that can be translated by the cluster) is set to the tag address plus the minimum range size. If row 920 is valid at step 1014, then the range size is known, and at step 1018 the actual range size (as stored in size index 928 of row 920) is used to determine the last address. For instance, the last address can be set equal to the tag address plus the range size as determined from size index 928 (e.g., in accordance with Table 1 or 2 described above).

At step 1020, it is determined whether the requested virtual address is covered by the tag 922. The address is covered if the requested virtual address is any address in the range from the tag 922 (read as a starting virtual address) to the last address (as determined at step 1016 or 1018). If the requested virtual address is not covered, then address match logic 906 proceeds to step 1006 to overwrite the row and make a new L2 request as described above. Where a client is allocated multiple rows in L1 tag table 904, all rows allocated to that client are checked prior to making a new L2 request; a row to be overwritten at step 1006 may be selected in any manner desired, e.g., based on least recently used (LRU) logic which may be of generally conventional design.

If, at step 1020, the requested virtual address is covered by a row 920, then the associated cluster for that row 920 can be used to fulfill the current request; a new L2 request is not necessary. Accordingly, at step 1024, the pre-allocated strip 910 is returned to the pool of free strips by decrementing its strip counter 916 (from one to zero). At step 1026, the stripID associated with the current request is set equal to strip identifier 930 obtained from row 920. At step 1028, counter 916 for the strip 910 in strip pool 706 that matches the stripID is incremented to indicate that another translation request will be using that strip. At step 1010, the request and associated stripID are forwarded to buffers 716.

It should be noted that it is possible for the same cluster to be stored in more than one strip 910. For instance, where rows 920 of L1 tag table 904 are allocated to particular clients (or streams or groups) and requests from different clients include the same virtual address, L1 logic block 710 would not detect the duplication, and the same cluster would be stored in two different strips. Such duplication is within the scope of the invention and may be taken into account in optimizing strip pool size for a particular system configuration.

In one embodiment, the number of rows 920 in L1 tag table 904 is considerably less than the number of strips 910 in strip pool 706. For example, a client or stream may be allocated one or two rows 920 and may be allowed to use up to twenty strips 910. In such embodiments, the L1 cache need not be fully associative. As described above, when a row 920 is overwritten, a new strip ID 930 may be stored in the row 920 so that the strip 910 that was previously associated with the row 920 can still be used to service any outstanding translation requests that have already been associated with that strip 910. The previously associated strip 910 is not associated with any new requests after that point. Counter 916 of a strip 910 may be incremented once when the strip 910 is pre-allocated and once for each request REQ that becomes associated with the strip 910; counter 916 may be decremented once for each associated request REQ that is completed and once when the L1 tag table row 920 is overwritten. This prevents a strip 910 from being re-allocated until all associated requests have been completed and the strip 910 has become dissociated from L1 tag table 904.

D. Level 2 Cache and Lookup Logic

As described above with reference to FIG. 7, in the event of an L1 cache miss, L1 cache 709 sends a requests for a cluster to L2 cache 713. L2 cache 713 fetches the requested clusters into strip pool 706. L2 cache 713 advantageously maintains its own store of recently used clusters in L2 cluster store (pointer table) 718; if a needed cluster cannot be found in pointer table 718, L2 cache 713 accesses the full in-memory cluster table to obtain the cluster.

Figures 11, 12:
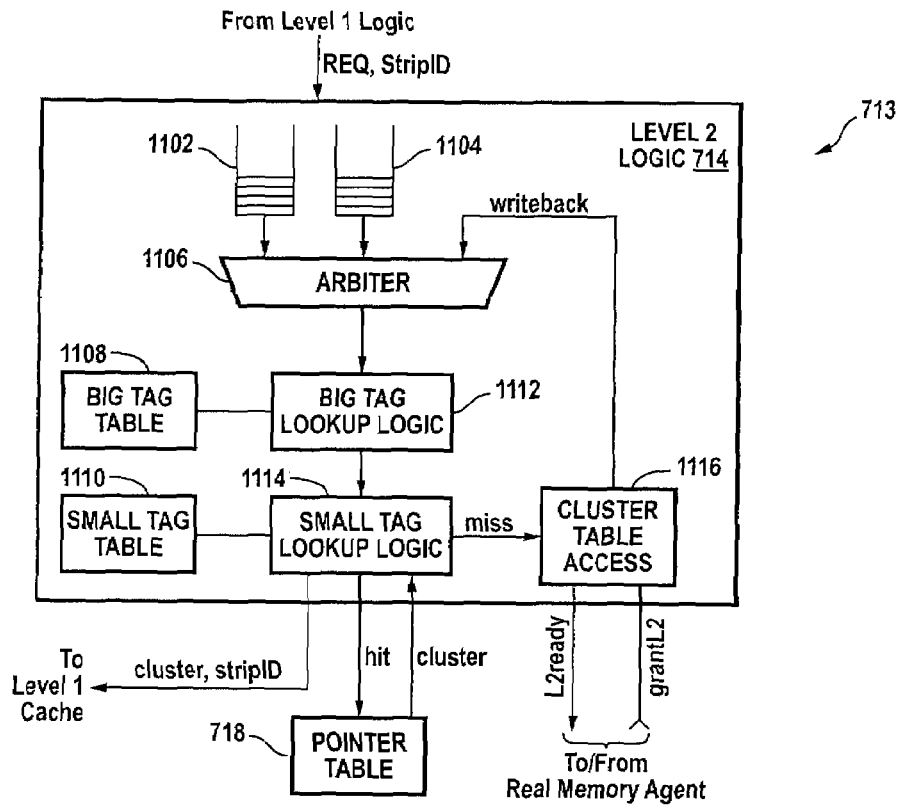
FIG. 11 is a block diagram of a Level 2 lookup logic block and cluster cache according to an embodiment of the present invention.
FIG. 12 illustrates a structure of a Level 2 tag table according to an embodiment of the present invention.

FIG. 11 is a block diagram showing additional details of L2 cache 713 according to an embodiment of the present invention. L2 logic block 714 receives cluster requests from L1 logic block 710. At its input, L2 logic block 714 includes a high-priority request queue 1102 and a low priority request queue 1104 (which may include, e.g., conventional FIFOs) for receiving requests REQ from L1 logic block 710. Each request REQ generally includes a virtual address, a client identifier, and a stripID for the location in strip pool 706 where the cluster is to be placed upon retrieval. Where a client provides multiple streams, the request REQ also includes the stream identifier. Requests may be classified as high or low priority based on the requesting client; clients given high priority at input arbitration unit 702 are advantageously also given high priority at L2. An arbiter 1106 selects a next request from one of the request queues 1102, 1104, e.g., using a "high priority wins" algorithm. On each cycle, arbiter 1106 may also select a "writeback" request instead of a lookup request; as described below, a writeback request occurs following an L2 cache miss and subsequent retrieval of a cluster from the in-memory cluster table. Writeback requests may be given priority over lookup requests from queues 1102, 1104.

L2 logic block 714 includes two tag tables (big tag table 1108 and small tag table 1110) that are used to keep track of which virtual addresses have corresponding clusters stored in pointer table 718. These tag tables 1108, 1110 are advantageously implemented using location-addressable storage circuitry (e.g., conventional RAM arrays). Big tag logic 1112 performs lookup and writeback operations on big tag table 1108, and small tag logic 1114 performs lookup and writeback operations on small tag table 1110. L2 logic block 714 also includes a cluster table access unit 1116 that retrieves clusters that are not found in pointer table 718 from the in-memory cluster table (not shown).

FIG. 12 illustrates the contents of an embodiment of small tag table 1110. In this embodiment, small tag table 1110 includes a number (e.g., 76) of rows 1200. Each row 1200 has eight columns (entries) 1210(0)-1210(7) for storing tags and a least-recently-used (LRU) field 1220 that is used to indicate relative times of the most recent use of each column for that row. LRU field 1220 may be of conventional design. For example, LRU field 1220 may comprise eight 3-bit subfields, where each subfield stores one of the column numbers, in order of recency of use. The tag stored in an entry 1210 includes a starting virtual address (or selected bits thereof) for a cluster that is stored in pointer table 718; the position (e.g., the row number r and column number c) of the tag entry 1210 in small tag table 1110 determines the location in pointer table 718 where the corresponding cluster can be found. For example, where there are eight entries per row, the value 8r+c for a given position in small tag table 1110 can be used as an index into pointer table 718.

Tags are advantageously placed into rows 1200 based on "row selecting" bits of the virtual address. The row selecting bits, which may be the same bits for all virtual addresses, may be chosen from anywhere in the virtual address, and the number of row selecting bits advantageously corresponds to the number of rows available for use in small tag table 1110. The row selecting bits are not required to include the MSB of the virtual address; if the MSB is not used, then selected row may wrap in a modulo fashion if upper regions of the virtual memory space are being accessed.

The row selecting bits are also not required to include the page-level bit of the virtual address. The position of the least significant row selecting bit within the virtual address determines a "spacing" of the rows in virtual address space. For example, if the least significant row selecting bit is in the $2^{17}$ position, then the row spacing is 128 KB, meaning that virtual addresses that are 128 KB apart will select different rows. The row spacing may be a configurable parameter. In some embodiments, the row spacing may be adjustable to a value smaller than the number of columns multiplied by the minimum cluster size; this can allow multiple clients to share the rows with reduced conflicts.

The tag in each entry 1210 advantageously encodes the range size for the cluster as well as the starting virtual address. Where row selection bits are used, the row selection bits may be dropped from the tag. Additional encoding may also be used. For example, in some embodiments each cluster is aligned to a virtual address space boundary that is a multiple of the range size for that cluster, and a pattern of trailing bits in the tag may be used to represent the range size. A lookup operation in small tag table 1110 uses the encoded starting address and range size to determine whether a requested virtual address is covered by a tag.

It will be appreciated that, in principle, all tags could be stored in small tag table 1110. However, if the range size for some cluster exceeds the row spacing, that cluster would correspond to virtual addresses in more than one row. Tags for those clusters could be stored in more than one row, resulting in the same cluster being stored more than once in pointer table 718. Some embodiments freely allow such duplication. Other embodiments may increase the row spacing so as to avoid duplication; this potentially increases the number of clusters competing for the entries in a given row.

In still other embodiments, big tag table 1108 is provided to store tags for clusters whose range size exceeds the row spacing of small tag table 1110, allowing small tag table 1110 to use a smaller row spacing while avoiding duplication of clusters in pointer table 718. For example, given the range sizes listed in Tables 1 and 2 and a row spacing of 128 KB in small tag table 1110, big tag table 1108 may store clusters of range sizes 256 KB and larger. The structure of big tag table 1108 can be generally similar to the structure of small tag table 1110 shown in FIG. 12, with each entry storing a tag that includes a starting virtual address (or selected bits thereof) for a cluster and also encoding the range size. The encoding for big tag table 1108 may be the same as or different from the encoding in small tag table 1110. Big tag table 1108 may also be organized using row selecting bits; in general, the row selecting bits for big tag table 1108 are different from those used for small tag table 1110, in order to provide a larger row spacing. (For example, the row spacing in big tag table 1108 may be made equal to the maximum range size of the clusters.)

In some embodiments, big tag table 1108 may maintain its own cluster store (e.g., a "big pointer table," not shown in FIG. 11), with the position of a tag in big tag table 1108 determining the location of the corresponding cluster in the big pointer table. In the embodiment shown in FIG. 11, only one pointer table 718 is provided, and clusters are located based on positions of entries in small tag table 1110. A tag in big tag table 1108 is used to generate a backpointer whose value is uniquely determined by the position of the entry in big tag table 1108. One of the entries in small tag table 1110 stores this backpointer value instead of a tag. Accordingly, a lookup operation for a given virtual address may include finding a matching tag for the virtual address in big tag table 1108, determining the backpointer, and finding an entry in small tag table 1110 that matches the backpointer. The matching entry in small tag table 1110 may be found, e.g., by hashing the row and column of the matching tag in big tag table 1108 to select a row of small tag table 1110, then comparing the entries in that row to the backpointer. The row and column of the entry in small tag table 1110 that matches the backpointer can then be used to access pointer table 718.

Figure 13:
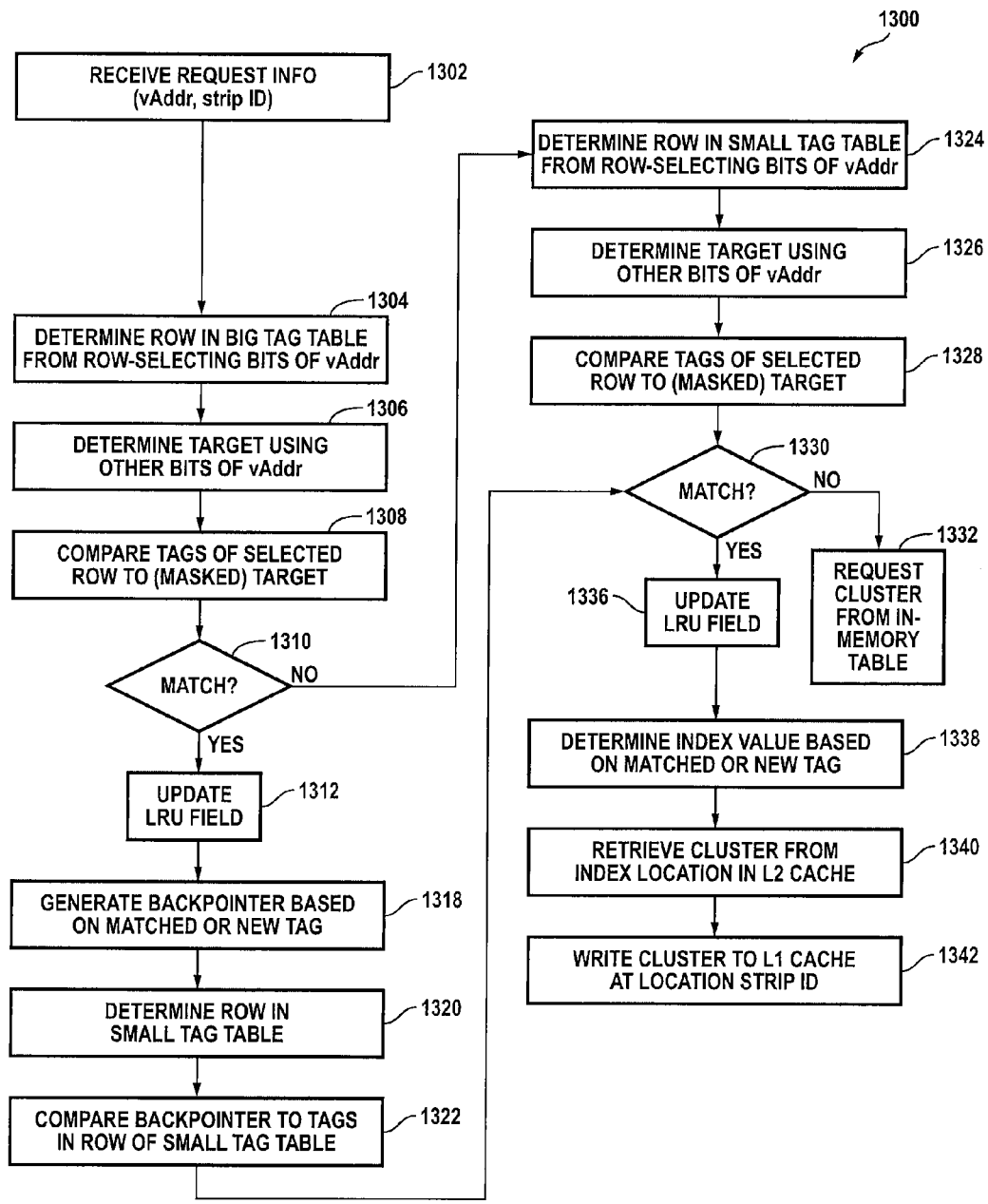
FIG. 13 is a flow diagram of a Level 2 lookup process for determining whether a requested virtual address is mapped by a cached cluster according to an embodiment of the present invention.

FIG. 13 is a flow diagram of a lookup process 1300 that may be implemented in big tag lookup logic 1112 and small tag lookup logic 1114 according to an embodiment of the present invention. For each request, big tag table 1108 is checked first for a tag that matches the virtual address. If a match is found in big tag table 1108, small tag table 1110 is checked for an entry that contains a backpointer to the matched tag in big tag table 1108. If no match is found in big tag table 1108, small tag table 1110 is checked for a tag that matches the virtual address. In either case, if a match is found in small tag table 1110, the corresponding cluster is retrieved from pointer table 718 and stored in strip pool 706. If no match is found, then the cluster is retrieved from the in-memory cluster table and added to pointer table 718 as well as to strip pool 706 via a writeback process that is described separately below.

At step 1302, big tag lookup logic 1112 receives a request including a virtual address, a client identifier, and a stripID from arbiter 1106. At step 1304, big tag lookup logic 1112 selects a row in big tag table 1108 using big-tag row selecting bits of the requested virtual address. At step 1306, a target bit pattern is created from the virtual address, e.g., by dropping the big-tag row selecting bits and the LSBs that correspond to a byte offset within a page of memory (e.g., fourteen LSBs in the case of a 16 KB cluster) or within the minimum size of a cluster in the big tag table.

At step 1308, the target bit pattern is compared to each tag in the selected row of big tag table 1108. As noted above, each tag encodes the starting virtual address and range size for a particular cluster, and (similarly to the L1 lookup logic described above) the comparison step determines whether the requested virtual address is covered by that tag. Implementation of step 1308 depends on how the tags are encoded. For example, in some embodiments, each cluster is aligned to a virtual address space boundary that is a multiple of its range size (in which case the range size may be encoded by a trailing bit pattern in the tag field), and the comparison with a particular tag advantageously includes dropping (or ignoring) corresponding LSBs of the target bit pattern.

At step 1310, it is determined whether any of the tags in the selected row of big tag table 1108 matched the target bit pattern. If no match is found, then the virtual address is provided to small tag lookup logic 1114. At step 1324, small tag lookup logic 1114 selects a row in small tag table 1110 using small-tag row selecting bits of the requested virtual address; as mentioned above, the small-tag row selecting bits need not be the same bits as the big-tag row selecting bits used at step 1304. At step 1326, a target bit pattern is created, e.g., by removing the small-tag row selecting bits and byte offset bits from the virtual address (similarly to step 1306).

At step 1328, the target bit pattern is compared to each tag in the selected row of small tag table 1110. As at step 1308, the comparison depends on how the tag is encoded, and the tag encoding in small tag table 1110 may be different from that used in big tag table 1108. At step 1330, it is determined whether any of the tags in the selected row of small tag table 1110 matched the target bit pattern. If not, then at step 1332, a request is made to system memory to retrieve the cluster from the in-memory cluster table. It should be noted that, in this embodiment, a tag (or an entry in pointer table 718) is not pre-allocated for storing the cluster. Instead, allocation occurs when the cluster is retrieved and written back, as described below, so that the effective capacity of the cache is not diminished in the event that the memory access operation has a long latency. In other embodiments, preallocation may be performed if desired.

If a matching tag is found at step 1330, then at step 1336, the LRU bits of the row 1200 in small tag table 1110 are updated to reflect that the matched tag is now the most recently used. Procedures for updating LRU bits are known in the art. At step 1338, an index value is determined from the position (e.g., row and column) of the matched tag in small tag table 1110. The index value may be computed in various ways (e.g., index=S*r+c where there are S columns c in each row r), as long as each position in the small tag table has a unique index. At step 1340, this index is used to retrieve the corresponding cluster from pointer table 718. At step 1342, the retrieved cluster is written to the appropriate strip 910 in strip pool 706, and the valid bit 914 for the strip 910 is set to "true".

In some embodiments, step 1342 may also include updating the corresponding row 920 in L1 tag table 904 by setting the size index 928 to reflect the actual range size of the retrieved cluster and setting valid bit 926 to "true". This can be implemented, e.g., by using the client identifier or stream identifier to identify the appropriate row in the L1 tag table, by providing a row index for the L1 tag table row 920 to L2 cache 713 along with the request, or by providing an associative lookup in the L1 tag table 904 based on strip identifier field 930. (The updated information in L1 tag table 904 can affect processing of subsequent requests as described above.) In embodiments where clusters are naturally aligned, the tag 922 in row 920 does not need to be updated; the first address covered by the cluster can be determined by using size index 928 to mask tag 922 during L1 lookup process 1000 (FIG. 10). In other embodiments, the first address covered by the cluster is determined and used to update tag 922.

Returning to step 1310, if a match is found in big tag table 1108, the LRU field of big tag table 1108 is updated at step 1312. Small tag lookup logic 1114 then performs a different lookup operation. Specifically, at step 1318, big tag lookup logic 1112 generates a backpointer for the matched tag. As described above, the backpointer is advantageously based on the position (e.g., row and column) of the matched big tag and is determined such that each possible big tag table position will generate a different backpointer (e.g., the formula B*r+c may be used if each row r contains B columns c). At step 1320, a row in the small tag table 1110 is selected; this may be done using a hash of the row and column of the matched tag in big tag table 1108, a hash of the virtual address, or some other suitable function. A comparison is then made at step 1322 between the backpointer and the tags in the selected row of small tag table 1110, and the process proceeds to step 1330 to detect a match. Subsequent processing follows the steps described above; at step 1320, the LRU bits of the row in the big tag table 1108 would also be updated.

Figure 14:
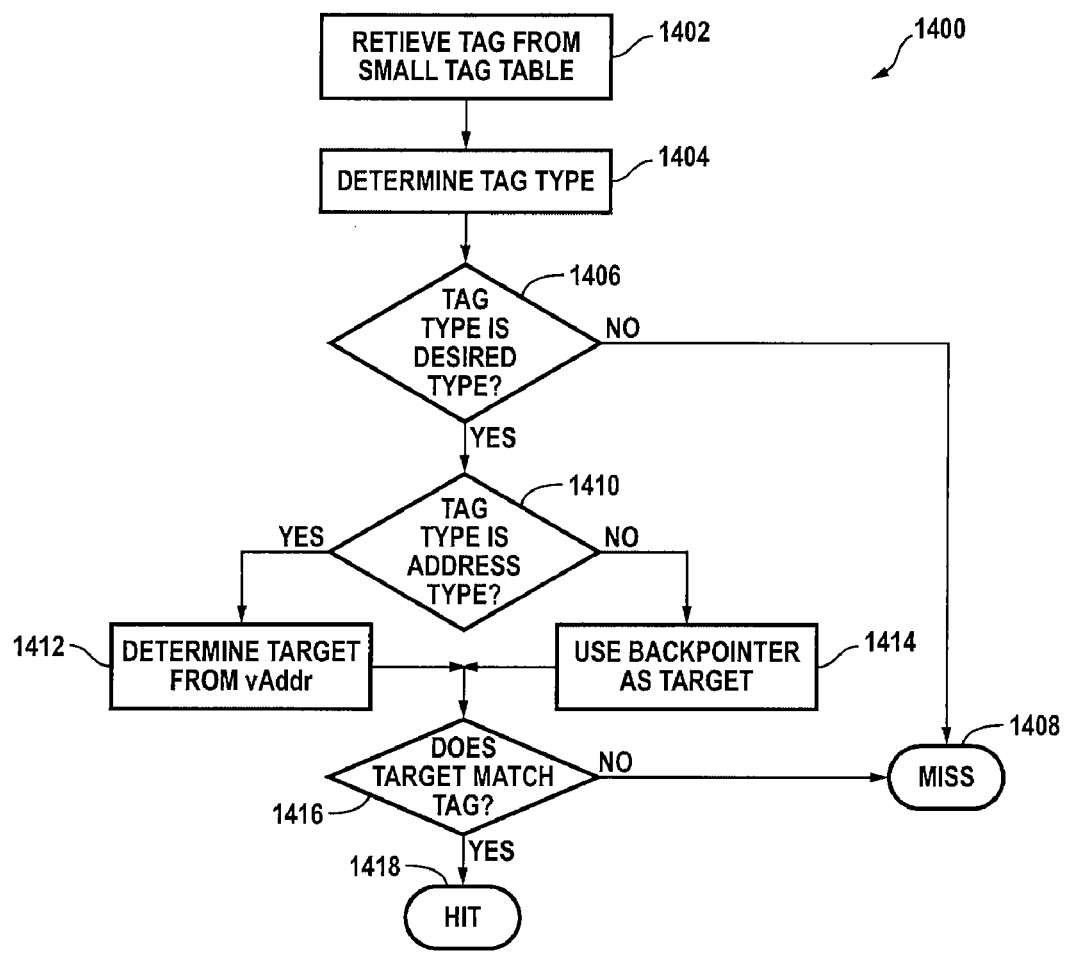
FIG. 14 is a flow diagram of a comparison step for the lookup process of FIG. 13 according to an embodiment of the present invention.

It should be noted that the same logic circuits may be used to implement both small-tag comparison steps 1328 and 1322. FIG. 14 is a flow chart of a comparison process 1400 that implements steps 1328 and 1322 according to an embodiment of the present invention. In this embodiment, each small tag includes a type bit that indicates whether the tag corresponds to a virtual address or a backpointer, and the small tag lookup logic 1114 receives a "hit" signal from big tag lookup logic 1112 indicating whether a match was found in big tag table 1108. At step 1402, a tag is retrieved from small tag table 1110. At step 1404, the type bit of the tag is checked to determine whether this tag corresponds to a backpointer or an address. At step 1406, based on the hit signal from big tag lookup logic 1112, it is determined whether this tag type is the desired type. Specifically, if the hit signal indicates a match (hit) in big tag table 1108, then the desired type is backpointer, and if the hit signal indicates no match (miss) in big tag table 1108, then the desired type is address. If the tag is not of the desired type, the result from small tag lookup logic 1110 is a miss (step 1408).

If the tag is of the desired type, then at step 1410, the tag type (or the desired type) is used to control generation of a comparison target. For an address tag type, at step 1412 the target is determined from the virtual address, e.g., by masking LSBs based on the size index associated with the tag as described above with reference to step 1326 of process 1300. For a backpointer tag type, at step 1414 the backpointer is used at the target. At step 1416, the tag value and the target are compared. A match results in a hit (step 1418); no match results in a miss (step 1408).

The logic illustrated in FIG. 14 may be implemented in parallel for each of the tags in a row. In the embodiment described herein, duplication of tags is advantageously avoided, so at most only one tag will generate a hit. In an alternative embodiment, duplicate tags may occur, and the lookup logic may include rules for selecting one tag in the event of multiple hits (e.g., choose the matched tag that is most recently used).

Figure 15:
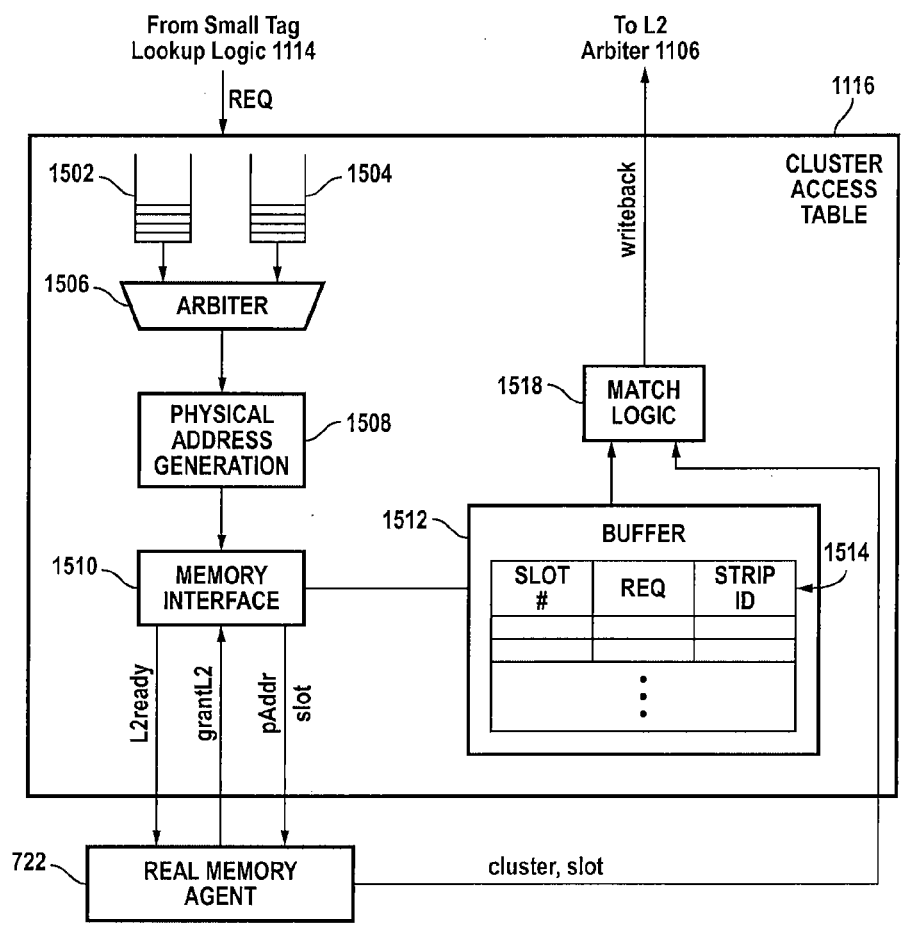
FIG. 15 is a block diagram of a circuit for requesting cluster data from an in-memory cluster table according to an embodiment of the present invention.

In the event of a miss in small tag table 1110, a request for the cluster is transmitted to cluster table access module 1116 (FIG. 11), which obtains clusters from the in-memory cluster table. FIG. 15 is a block diagram of cluster table access module 1116 according to an embodiment of the present invention. A high-priority queue 1502 and a low-priority queue 1504 (which may be implemented, e.g., using conventional FIFOs) are provided for queuing requests to be sent to system memory; each request includes the virtual address, client identifier, and strip ID. The high priority and low priority status of a request may be determined based on the client identifier, e.g., using the same rules as at input arbiter 702 of TLB system 700 and/or input arbiter 1106 of L2 logic block 714. An arbitration unit 1506 arbitrates between the queues 1502, 1504 (e.g., using a high-priority wins scheduling rule).

The request selected by arbitration unit 1506 is forwarded to a physical address generation circuit 1508, which computes a physical address for the needed cluster. In one embodiment, physical address generation circuit 1508 includes a register that stores the base physical address of the in-memory cluster table (which may be provided, e.g., during system startup) and an adder that adds an index derived from the virtual address as an offset to the base physical address. The virtual address index is advantageously aligned to the nearest entry boundary (e.g., 16 KB of virtual address space) of the in-memory cluster table prior to adding. This physical address is provided to a memory interface module 1510.

Memory interface module 1510 adds the request to a pending request buffer 1512. Pending request buffer 1512 advantageously includes a number of slots 1514, each identifiable by a slot number. Buffer 1512 stores the request (including the virtual address, client identifier, and strip ID) until the cluster is received from system memory. Memory interface module 1510 also generates an L2ready signal for real memory agent 722 (FIG. 7), which returns a grantL2 signal when it is ready to process the L2 memory request. In response to the grantL2 signal, memory interface module 1510 provides the physical address and the slot number from buffer 1512 to the real memory agent 722. It should be noted that memory interface module 1510 can continue to send requests to real memory agent 722 while awaiting a response to an earlier request.

In due course, real memory agent 722 returns the cluster and the slot number to cluster table access module 1116. Match logic 1518 receives the cluster and slot number and performs an associative lookup in buffer 1512 using the slot number to retrieve the associated request. A writeback request, including the virtual address, strip ID, and cluster data, is then provided to input arbiter 1106 of L2 logic block 714 (FIG. 11) for processing. It should be noted that buffer 1512 allows multiple requests to be pending, and any clusters returned out of order may be processed as they are received. Thus, L2 may complete requests out-of-order.

The writeback request is provided by input arbiter 1106 to big tag lookup logic 1112 and small tag lookup logic 1114. In this embodiment, tag table locations (or L2 cache entries) for storing newly retrieved clusters are not pre-allocated; instead, the location is selected during the writeback process. Due to latency in accessing main memory, it is possible that another request for the same cluster has already been returned to the table before the writeback occurs. Accordingly, the writeback process includes logic steps to check the tag table for a match before writing any new entries.

Figure 16:
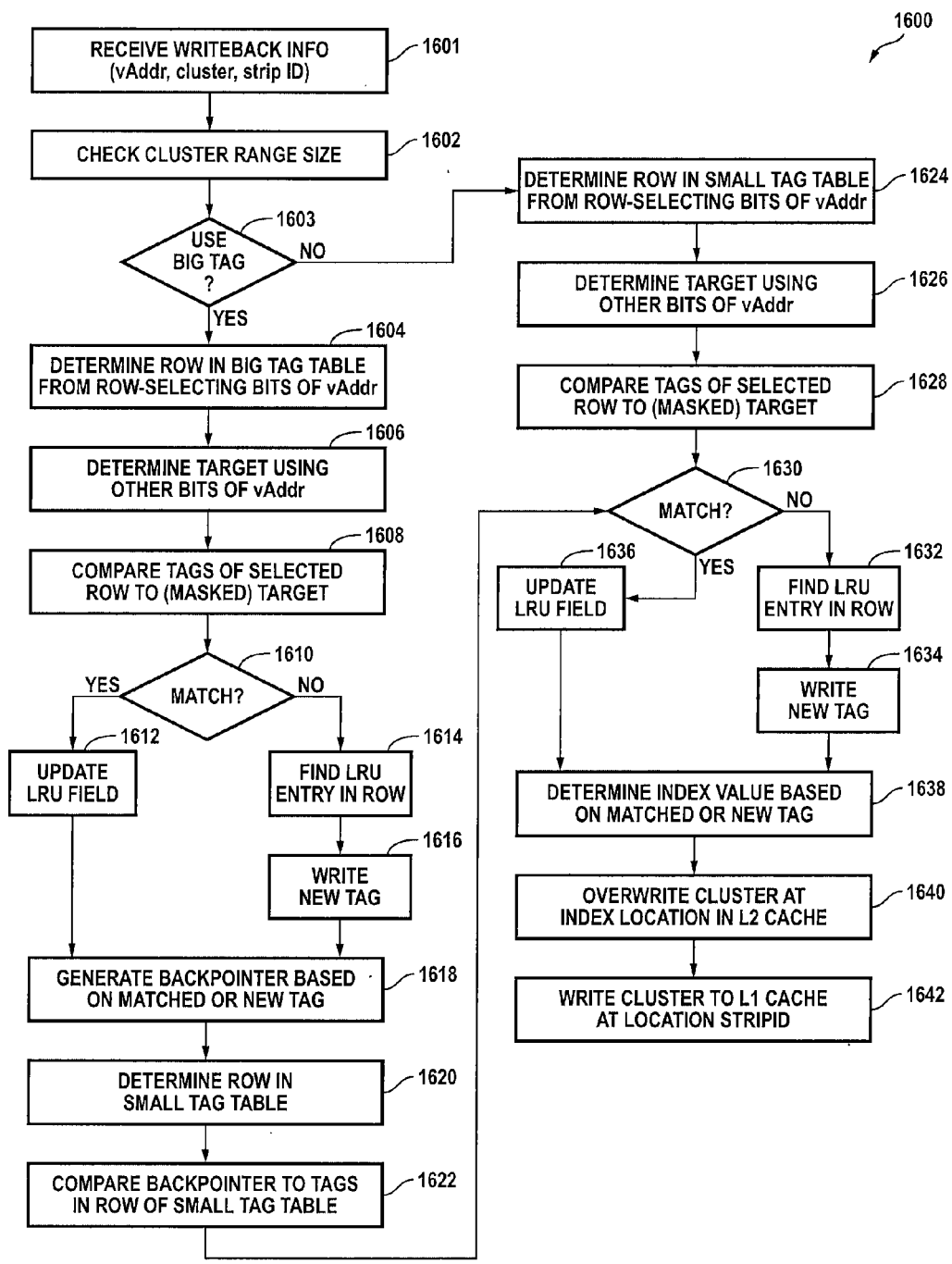
FIG. 16 is a flow diagram of a cluster writeback process according to an embodiment of the present invention.

FIG. 16 is a flow diagram showing a writeback process 1600 according to an embodiment of the present invention that includes such checking logic. It will be appreciated that process 1600 is generally similar to lookup process 1300 of FIG. 13 and that common logic circuitry may be used to implement both lookup and writeback, with a writeback signal being provided to control processing steps where the lookup and writeback processes differ. In addition, the common logic circuitry may be implemented in pipelined fashion, with either a read or write being initiated at each clock cycle. All algorithms used for row selection and tag encoding (e.g., masking) in writeback process 1600 advantageously match the algorithms used at corresponding steps of lookup process 1300; accordingly, description of particular algorithms in connection with process 1600 is omitted.

At step 1601, the writeback information (including virtual address, cluster data, strip ID, and client ID) is received from arbiter 1106 (FIG. 11). At step 1602, the range size (e.g., size index 402 or 452 described above) is extracted from the cluster, and at step 1603 it is determined whether a tag for this cluster should be stored in big tag table 1108. For example, in one embodiment described above, big tag table 1108 is used only for clusters with range sizes larger than the row spacing of small tag table 1110. If a big tag table entry is needed, then at step 1604, a row in big tag table 1108 is selected using the appropriate row selecting bits of the virtual address; at step 1606, a target is determined using the remaining bits of the virtual address; and at step 1608, the target is compared to each tag in the selected row. At step 1610, it is determined whether a matching tag was found.

If a matching tag was found in the selected row, then at step 1612, the LRU bits for the selected row of the big tag table are updated to indicate that the matched tag is most recently used. Otherwise, at step 1614, the least recently used entry for the row is identified, and at step 1616, a new tag is written to that entry; the LRU bits are updated to indicate that the newly written entry is most recently used. At step 1618, a backpointer to the entry (either the matched entry or the newly written one) in big tag table 1108 is generated, and at step 1620, a row in small tag table 1110 is selected. At step 1622, the backpointer is compared to each tag in the selected row of small tag table 1110, and at step 1630, a match or lack thereof is detected.

Alternatively, if it is determined at step 1603 that a tag for the current cluster should not appear in big tag table 1108, then writeback process 1600 proceeds to step 1624, where small tag lookup logic 1114 selects a row based on the small-tag row selecting bits of the virtual address. At step 1626, the target is set to the remaining bits of the virtual address, and at step 1628, the target is masked and compared to each tag in the selected row of small tag table 1110. At step 1630, a match or lack thereof is detected.

If a match (to either a tag or a backpointer) is detected at step 1630, then at step 1636, the LRU bits of the selected row are updated to identify the matched entry as most recently used. Otherwise, at step 1632, the least recently used entry for the row is identified, and at step 1634, a new tag (or backpointer as the case may be) is written to that entry; the LRU bits are updated to indicate that the newly written entry is most recently used. In either case, at step 1638, an index value for pointer table 718 is determined from the position of the small tag table entry (either the matched entry or the newly written one). At step 1640, the cluster at the location corresponding to that index in pointer table 718 is overwritten with the new cluster. Overwriting the cluster in pointer table 718 may be done regardless of whether an existing tag was matched; if the cluster data has not changed, overwriting it has no effect.

At step 1642, the cluster is written to strip pool 706 at the location specified by the strip ID for the request; during this step, the corresponding row 920 of L1 tag table 904 is also updated by setting the valid bit 926 to "true" and writing the size index for the cluster to size field 928. In some embodiments, writing to strip pool 706 may occur in parallel with the writeback operation of L2 cache 713 via appropriate bypass logic.

It should be noted that big tag table 1108 and small tag table 1110 may be implemented in location-addressable storage circuitry (e.g., conventional RAM circuits); use of flip-flops or the like is not required. Where the storage circuitry requires multiple clock cycles to perform addressing, read, modification, and writeback operations, bypass logic may be provided to support continuous back-to-back pipelining of read processes (e.g., process 1300) and/or writeback processes (e.g., process 1600). Such bypass logic generally includes detection of address conflicts (i.e., where a later operation requests the same address as an earlier operation that is not yet complete) and routes updated data from the earlier operation to the later operation in parallel with writing the updated data back to the storage circuitry. Examples of specific implementations of such bypass logic are known in the art. In some embodiments, a big tag table and a small tag table may be integrated; separate storage circuitry is not required.

To the rest of TLB system 700 of FIG. 7, there is no difference between a hit in the L2 cache and a miss, aside from the length of time required for L2 logic block 714 to supply a cluster to strip pool 706. It should also be noted that an L2 cache miss does not stall the pipeline of TLB system 700 because other L2 requests can continue to be processed while buffer 1512 holds the request that generated the miss.

E. Buffering and Ready Logic

As described above, L1 logic block 710 forwards requests to buffers 716 regardless of whether a valid cluster for processing the request is present in strip pool 706; ready logic 720 accesses strip pool 706 to determine which requests in buffers 716 are ready to be translated. Embodiments of these components of TLB system 700 will now be described.

Figure 17:
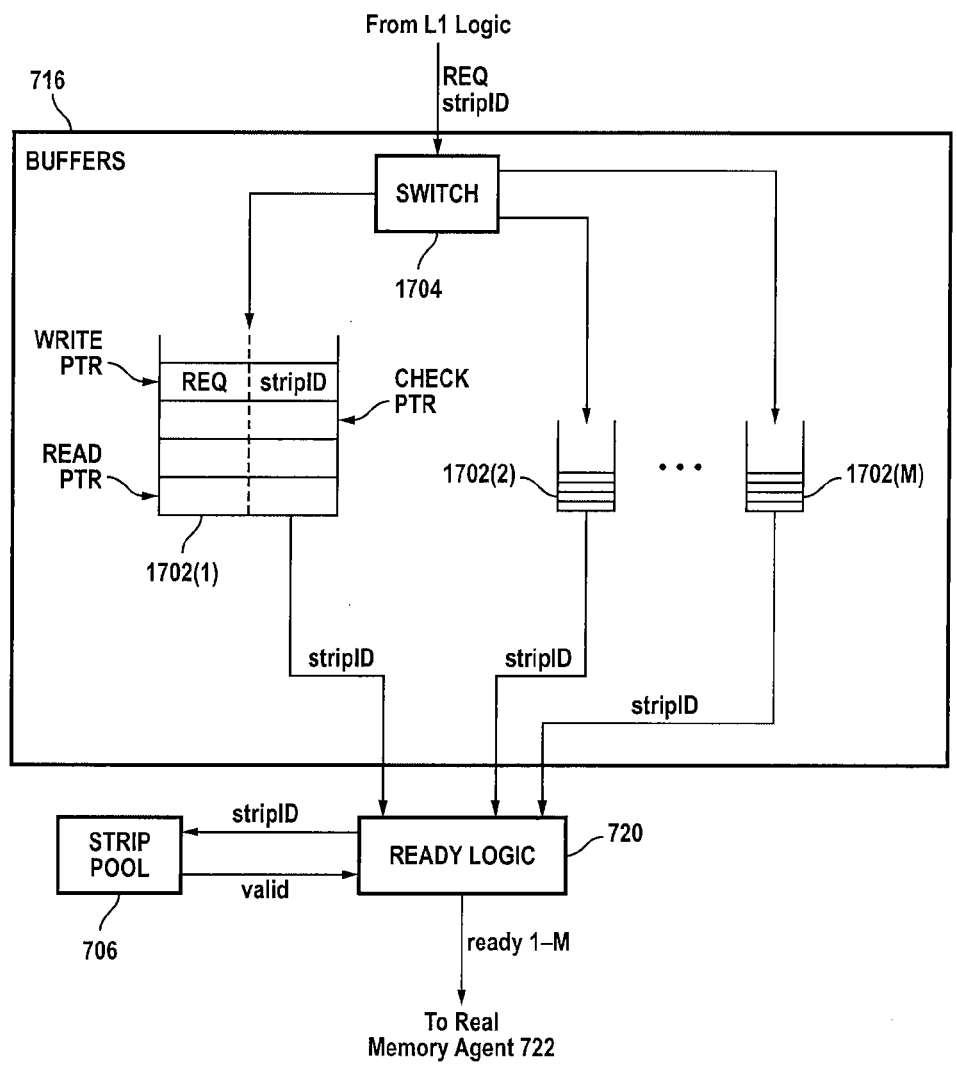
FIG. 17 is a block diagram showing buffering and ready logic for a TLB system according to an embodiment of the present invention.

FIG. 17 is a block diagram showing further details of buffers 716 and ready logic 720 of FIG. 7. Buffers 716 advantageously include a separate FIFO 1702 for each of the M clients; in an alternative embodiment, multiple clients may share a FIFO 1702. A switch 1704 at the input to buffers 716 reads the client identifier of each request received from L1 logic block 710 and directs the request to the appropriate one of FIFOs 1702.

As shown for FIFO 1702(1), three pointers (a write pointer 1710, a read pointer 1706, and a check pointer 1708) are maintained for each FIFO 1702. For each FIFO 1702, write pointer 1710 is incremented each time switch 1704 adds a new entry to that FIFO 1702, and read pointer 1706 is incremented each time a request is read from that FIFO 1702 for processing by real memory agent 722. Check pointer 1708 is managed by ready logic 720. During each clock cycle, ready logic 720 reads the stripID from the entry in each FIFO 1702 at the current position of its check pointer 1708. Ready logic 720 checks the valid bit 914 of the corresponding strip 910 in strip pool 706. If the strip is valid, ready logic 720 increments check pointer 1708 to the next entry; otherwise check pointer 1708 is not incremented, and the same entry is checked again during the next cycle. Ready logic 720 may be implemented to check an entry (or multiple entries) in each FIFO 1702 on each clock cycle.

In some embodiments, a write request may be held in buffers 716 until the corresponding write data appears in data buffer 730. Accordingly, during incrementing of check pointers 1708, ready logic 720 may determine whether the entry in a FIFO 1702 at the check pointer position corresponds to a write request and, if so, whether the write data is present in data buffer 730. The check pointer is incremented to mark a write request ready only when the write data appears in data buffer 730.

Based on check pointers 1708 and read pointers 1706, ready logic 720 generates a set of M ready signals on each clock cycle. In one embodiment, the ready signals indicate which clients have requests in their respective FIFOS 1702 for which valid clusters exist in strip pool 706. In another embodiment, the ready signals also indicate how many such requests each client has. This information is used by real memory agent 722 to select a next request to process.

F. Real Memory Agent

As described above, real memory agent 722 includes an arbiter 724 for selecting the next memory request to process and a request generator 726 for generating the memory request and dispatching it to system memory. Operation of real memory agent 722 will now be described in further detail.

Figure 18:
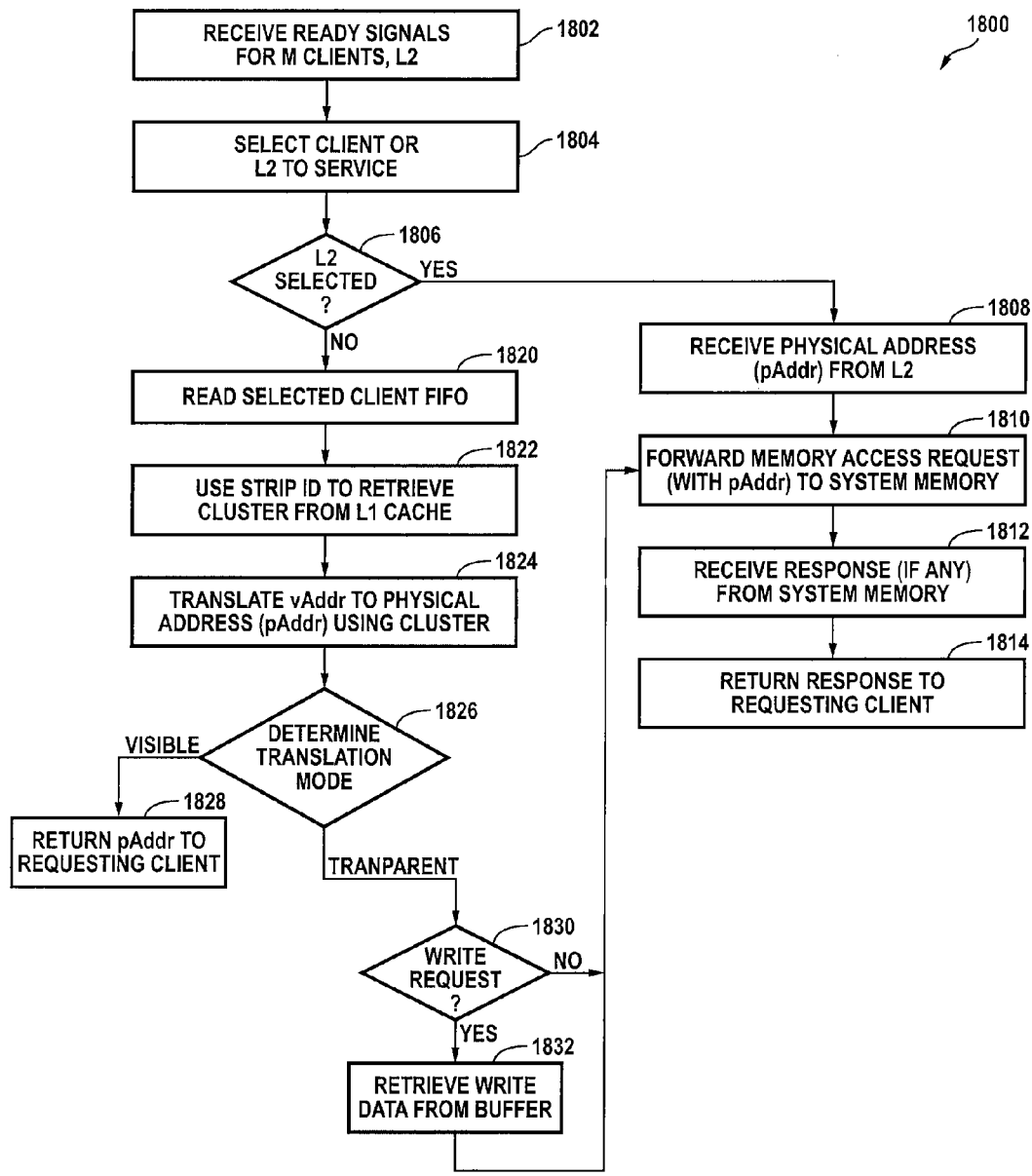
FIG. 18 is a flow diagram of processing operations in a real memory agent according to an embodiment of the present invention.

FIG. 18 is a flow diagram of processing operations in real memory agent 720 according to an embodiment of the present invention. At step 1802, arbiter 724 receives the M ready signals from ready logic 720 and the L2ready signal from L2 logic block 714. At step 1804, arbiter 724 selects one of the M clients or L2 to be serviced next and sends a grant signal to the selected client (or a grantL2 signal to L2). In one embodiment, L2 is always selected in preference to any of the M external clients, and the scheduling algorithm for the external clients is similar to that used by input arbiter 702 described above.

At step 1806, it is determined whether L2 was selected. If L2 was selected, then cluster conversion is not necessary. Accordingly, at step 1808, the physical address of a cluster in the in-memory cluster table is received from L2 logic block 714, and a request is forwarded to system memory at step 1810. In some embodiments, the base address of the in-memory cluster table may be stored in real memory agent 722 rather than in L2 logic block 714; in such embodiments, L2 logic block 714 supplies the virtual address, and real memory agent 722 computes the corresponding physical address. In any case, the cluster data is received at step 1812 and returned to L2 at step 1814.

For other clients, cluster conversion is performed. Accordingly, if L2 was not selected at step 1806, the entry in the granted client's FIFO 1702 at the read pointer position is provided to cluster converter 728 (FIG. 7) at step 1820; the read pointer is then incremented. At step 1822, cluster converter 728 uses the strip ID obtained from the FIFO entry to retrieve the corresponding cluster from strip pool 706. At step 1824, the cluster converter 728 translates the virtual address to a physical address and returns the physical address to request generator 726. The address translation process depends on the cluster format. For example, the cluster formats and translation processes described above with reference to FIGS. 4A-B and 5A-B may be used; other cluster formats and conversion processes may also be used.

In some embodiments, step 1822 also includes decrementing the associated counter 914 for the strip 910 in strip pool 706 (FIG. 9) to indicate that one of the requests associated with that strip 910 has been processed. When all outstanding requests have been satisfied, the counter 914 reaches zero, and the strip 910 becomes available again for pre-allocation by input arbiter 702.

As noted above, address translation may be made transparent or visible on a per-client basis (or, in some embodiments, on a per-request basis). At step 1826, it is determined whether the current client is using a transparent or visible translation mode. For a client in the visible mode, the physical address is returned to the client at step 1828. As described above, the client can subsequently submit memory access requests using this physical address; such requests may bypass TLB system 700.

For a client in transparent mode, a memory request is generated using the physical address. As noted above, for write requests, the write data is stored in data buffer 730 of real memory agent 722 while the address translation is processed through the TLB pipeline and re-attached when the request is sent to system memory. More specifically, at step 1830, request generator 726 determines whether the request is a write operation. If so, then at step 1832, the corresponding write data is retrieved from data buffer 730 and added to the memory request. The appropriate memory access command (e.g., read or write) is forwarded to the system memory at step 1810 using the physical address. Communication between real memory agent 722 and the system memory may be implemented using conventional memory interface technologies. Any response is received by real memory agent 722 at step 1812. In the event of a read request, the response generally includes the read data; in the event of a write request, there may be an acknowledgement or error signal, or no response at all depending on system implementation. The response, if any, is returned to the requesting client at step 1814.

IV. Further Embodiments

A. Cluster Pairs

In some embodiments of the present invention, the size of the cluster data structure might not correspond to the native memory access size of the system. For instance, a cluster may include 16 bytes of data, while the system memory provides data in 32-byte units. In some embodiments of the present invention, this property is exploited so that each memory access returns multiple clusters (e.g., a pair of sequential clusters), each of which may be saved for later use. To the extent that a client tends to request virtual addresses sequentially, a cluster pair (or multi-cluster) configuration allows the next cluster(s) that is (are) likely to be needed by a client to be retrieved and cached before it is (they are) actually needed. This can further reduce the number of accesses to the in-memory cluster table and enhance system performance.

Figure 19:
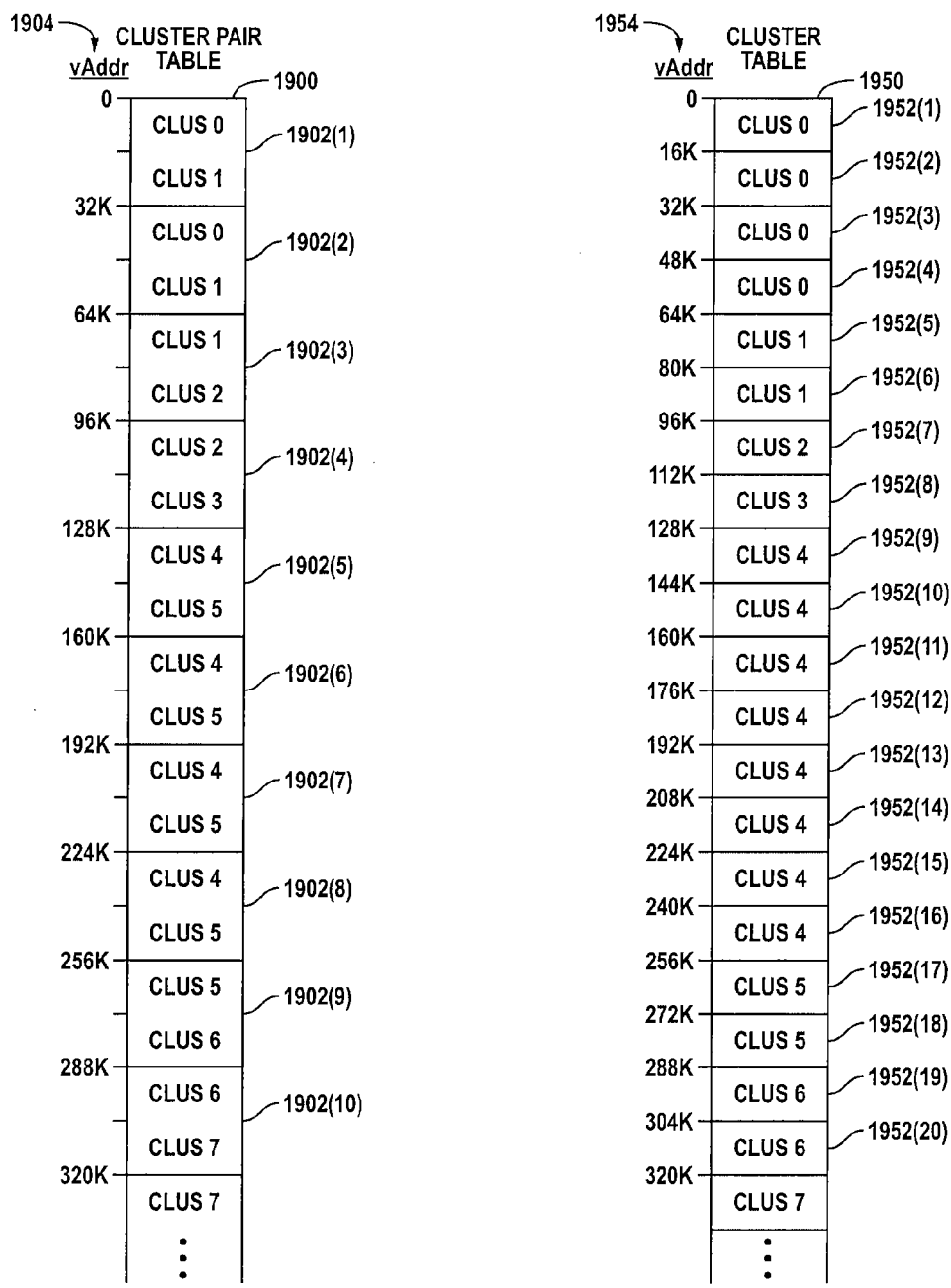
FIG. 19 illustrates cluster data stored in a cluster table according to an embodiment of the invention that stores cluster pairs.

FIG. 19 illustrates cluster data (CLUS n) stored in a cluster table 1900 according to an embodiment of the invention that provides cluster pairs and, for comparison, the same cluster data stored in a cluster table 1950 according to an embodiment of the present invention that does not provide cluster pairs. Cluster table 1950 is generally similar to cluster table 302 of FIG. 3; that is, each entry 1952 stores a cluster CLUS n for the corresponding 16 KB range of virtual address space as shown by the virtual address index 1954 at the right. Each entry 1902 in cluster table 1900 stores a cluster pair (comprising clusters CLUS n and CLUS n+1) corresponding to each 32 KB range of virtual address space as shown by the virtual address index 1904 at the left. It should be noted that some cluster pairs are duplicates (e.g., cluster pairs 1902(5)-1902(8) each contain CLUS 4 and CLUS 5), while some cluster pairs overlap in one cluster but not both (e.g., cluster pairs 1902(8) and 1902(9) both contain CLUS 5).

It is to be understood that cluster tables 1900 and 1950 represent the same address translations. For example, CLUS 0 has a size of 64 KB and translates all addresses in the range from 0 to 64 KB; CLUS 1 has a size of 32 KB and translates all addresses in the range from 64 KB to 96 KB; and so on. Accessing cluster pair table 1900 using any virtual address in the range from 64 KB to 96 KB returns a cluster pair that includes CLUS 1 (which translates the virtual addresses in that range) and CLUS 2, which translates the next portion (in this case 16 KB) of the virtual address space. In contrast, accessing cluster table 1950 using a virtual address in the range from 64 KB to 96 KB returns only CLUS 1.

Cluster pair table 1900 may be constructed using procedures generally similar to those described above. In the embodiment shown in FIG. 19, the clusters are naturally aligned, i.e., the range of addresses mapped by a particular cluster is aligned to a starting virtual address that is a multiple of that cluster's range size, as can be seen in cluster table 1950. In the case of a cluster pair where the first cluster has size index 0 (e.g., entry 1902(4) of table 1900), the first cluster (e.g., CLUS 2 in entry 1902(4)) maps only the first half of the 32 KB entry range; in such a case, the second cluster (e.g., CLUS 3 in entry 1902(4)) also has size index 0 because it is aligned to a 16 KB boundary that is not a 32 KB boundary. This natural alignment simplifies the cluster determination logic as described below, but other arrangements may also be used.

To form cluster pairs for the 32 KB entry size of cluster table 1900, the cluster that covers at least the first 16 KB of virtual address space for the entry is used as the first cluster of the pair. If this cluster has a range size of 32 KB or more (size index of 1 or more), then this cluster also covers the other 16 KB of virtual address space for that entry. In that case, the next cluster (regardless of its starting virtual address) is stored as the second cluster in the pair. For instance, in cluster table 1900, entry 1902(1) corresponds to virtual addresses from 0 to 32 KB. Cluster CLUS 0, which maps all virtual addresses from 0 to 64 KB (corresponding to size index 2), is stored as the first cluster in entry 1902(1). Cluster CLUS 1, which covers addresses starting immediately after 64 KB, is stored as the second cluster in entry 1902(1). Entry 1902(2) corresponds to virtual addresses from 32 KB (+1) to 64 KB, which are also mapped by cluster CLUS 0. Thus, CLUS 0 is stored as the first cluster in entry 1902(2), and the next cluster (CLUS 1) is stored as the second cluster in entry 1902(2).

If the first cluster of the pair has a range size of 16 KB (size index 0), then a different cluster is needed to cover the second 16 KB of virtual address space for the entry, and that cluster is stored as the second cluster of the pair. (In this instance, the second cluster will also have a range size of 16 KB because of the alignment rules.) For example, in cluster table 1900, CLUS 2, which has size index 0, covers the first 16 KB of entry 1902(4); CLUS 3, which also has size index 0, covers the second 16 KB of entry 1902(4).

One particular technique for filling the cluster table in a cluster pair embodiment includes defining a new cluster; replicating the new cluster as the first cluster of a pair at every 32 KB boundary of virtual address space covered by the new cluster; searching backward (i.e., toward lower virtual address values) to find every cluster pair in which the first cluster covers the immediately preceding virtual addresses and replacing the second cluster of each such pair with the new cluster. In some cases, e.g., when the virtual address space extends beyond the range covered by the newly added cluster, the table is also searched going forward (i.e., toward higher virtual address values) to determine whether the new cluster is adjacent to a subsequent cluster. If so, then the subsequent cluster is copied as the second cluster of each pair for which the new cluster is the first cluster.

In an embodiment of TLB system 700 adapted to cluster pair table 1900, real memory agent 722 returns cluster pairs to L2 logic block 714. For example, cluster table 1900 is accessed using an index derived by aligning a virtual address to a 32 KB boundary of virtual address space. The index derived from any virtual address in the range from 64 KB to 96 KB points to entry 1902(3); accessing the table with this index returns the cluster pair CLUS 1, CLUS 2. Prior to writeback, L2 logic block 714 determines which cluster in the pair corresponds to the requested virtual address (this cluster is referred to herein as "current"); during writeback, the current cluster is added to pointer table 718 and provided to strip pool 706. L2 logic block 714 may also be configured to write the other (non-current) cluster of the pair to pointer table 718. It is to be understood that writing both clusters to strip pool 706 is optional.

Figure 20:
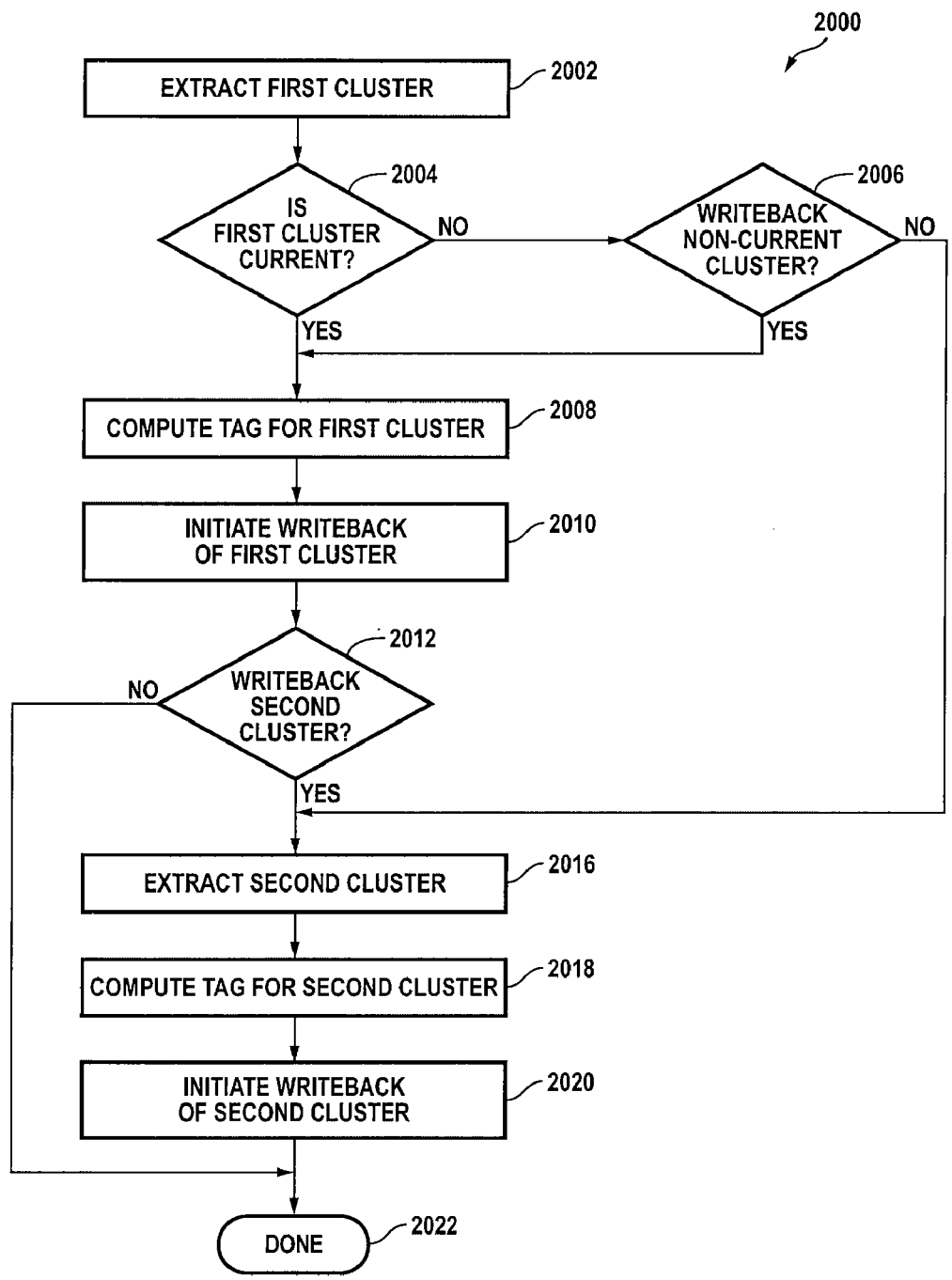
FIG. 20 is a flow diagram of a writeback control process according to a cluster pair embodiment of the present invention.

FIG. 20 is a flow diagram of a process 2000 for managing writeback according to a cluster pair embodiment of the present invention. Process 2000 may be performed, e.g., by additional control logic (not shown) placed at the output of match block 1518 of FIG. 15. This control logic can generate one or two writeback requests as desired. Writing back the non-current cluster may be an option that is controlled, e.g., by a configurable parameter that is set on a global or per-client basis.

At step 2002, the first cluster of the pair is extracted. Step 2002 may also include verifying that the cluster is valid, reading a size index field, etc. At step 2004, it is determined whether the first cluster is current (i.e., whether the range mapped by the first cluster includes the requested virtual address). In some embodiments, step 2004 may include checking a size index k of cluster 400 (FIG. 4A) or cluster 450 (FIG. 4B). If size index k is greater than 0, then the cluster range size is at least 32 KB and the first cluster is current. If, however, the range size for the first cluster is less than 32 KB (e.g., size index k is zero), then the first cluster covers only the first half of the 32 KB address range corresponding to this cluster pair; the second cluster covers the rest. For example, in FIG. 19, CLUS 2 and CLUS 3 each cover 16 KB of a 32 KB virtual address range, as shown in cluster table 1950. In cluster table 1900, any access to that virtual address range returns a cluster pair that includes CLUS 2 and CLUS 3. Accordingly, step 2004 may also include determining whether the requested virtual address is in the lower or upper half of the 32 KB address range. This can be done, e.g., by checking the bit at the corresponding position in the requested virtual address (e.g., $[vAddr_{14}]$). If that bit is zero, the address is in the lower half of the range, and the current cluster is the first cluster in the pair. Otherwise, the address is in the upper half of the range, and the current cluster is the second cluster in the pair.

If the first cluster is not current, then at step 2006, it is determined whether the non-current cluster is to be written back, e.g., by checking a global or per-client writeback control parameter. If not, then process 2000 proceeds to step 2016 (described below) to write back the second cluster. If the first cluster is current or if the non-current cluster is to be written back, then at step 2008, the tag to be used is computed from the requested virtual address and the range size of the first cluster. For example, the requested virtual address may be masked or truncated according to the cluster's range size (since clusters are aligned based on range size). A writeback operation for the first cluster is initiated at step 2010.

At step 2012, it is determined whether the second cluster is to be written back. If the first cluster is current, step 2012 may include checking a global or per-client writeback control parameter. If the first cluster is not current, then step 2012 may include inferring that the second cluster is current and therefore is to be written back.

At step 2016, the second cluster of the pair is extracted (and checked for validity if desired), and at step 2018 a tag for the second cluster is computed from the requested virtual address and the range sizes of the first and second clusters. Where a tag for the first cluster was computed at step 2008, the tag for the second cluster may be computed by incrementing appropriate bit(s) of the first cluster's tag based on the range size of the first cluster. A writeback operation for the second cluster is initiated at step 2020, and process 2000 ends at step 2022.

It will be appreciated that the cluster pair table and associated processes described herein are illustrative and that variations and modifications are possible. For instance, although specific virtual address boundary values (such as 32 KB) and particular cluster structures were mentioned, those skilled in the art will recognize that cluster structures and virtual address boundaries may be varied. In addition, the invention is not limited to cluster pairs; any number of clusters may be returned in a single table access, depending on size of the cluster data structure and the system memory access, and the cluster table may be structured such that any number of different clusters are returned. Clusters in a pair (or larger grouping) may include clusters other than the current cluster and the next sequential cluster, and content of the pair may be selected based on likely patterns of virtual address requests.

B. Shared Resource Allocation

As noted in Section III, TLB system 700 of FIG. 7 includes a number of resources that may be shared among multiple clients, including strip pool 706, entries in L1 tag table 904 (FIG. 9), and entries in L2 big tag table 1108 and small tag table 1110 (as well as corresponding entries in pointer table 718).

TLB system 700 may be configured to provide an efficient allocation of resources to different clients so that time-critical clients (e.g., scanout) receive the resources they need while other clients are not locked out entirely. As noted above, each client may also be associated with a group of clients, e.g., based on their likely memory demands and/or their priority, and some resources may be allocated to a group rather than to individual clients.

In general, optimal resource allocation will depend on various features of a particular implementation. Programmable resource allocation parameters may be provided, allowing resource allocation to be optimized for a particular implementation. Some examples of allocation techniques and parameters will now be described.

As a first example, L1 tag table 904 is shared among all clients. In one embodiment, entries (rows 920) in L1 tag table 904 are advantageously allocated on a per-client basis, with a small number of rows (e.g., one or two) per client. Fewer rows per client may lead to a larger number of L2 requests from some clients, but for a fast L2 implementation, the overall effect on performance can be made negligible. Configurable parameters, such as rows per client or rows per group, may be provided for use in optimizing the allocation of L1 tag table entries in a particular implementation. Separate client-specific or group-specific L1 tag tables could also be provided for some or all clients if desired.

As another example, strip pool 706 is also shared among all clients. Entries (strips 910) in strip pool 706 may be allocated using a combination of per-group and per-client rules. For example, an allocation rule may state that the total number of strips in use by clients in a particular group may not exceed 20 and that each client in that group may not use more than 10 strips. If there are three clients in the group, one client may not use more than 10 strips, even if the other two are only using a total of 5 strips. Such combination rules are known in the art, and various configurable parameters, such as strips per group or strips per client, may be provided for optimizing the allocation rules. Different clients and/or different groups may also be allocated different numbers of strips. For example, high priority clients may be granted larger numbers of strips than low priority clients to make it less likely that a new strip will not be available when a high-priority client needs one.

Figure 21:
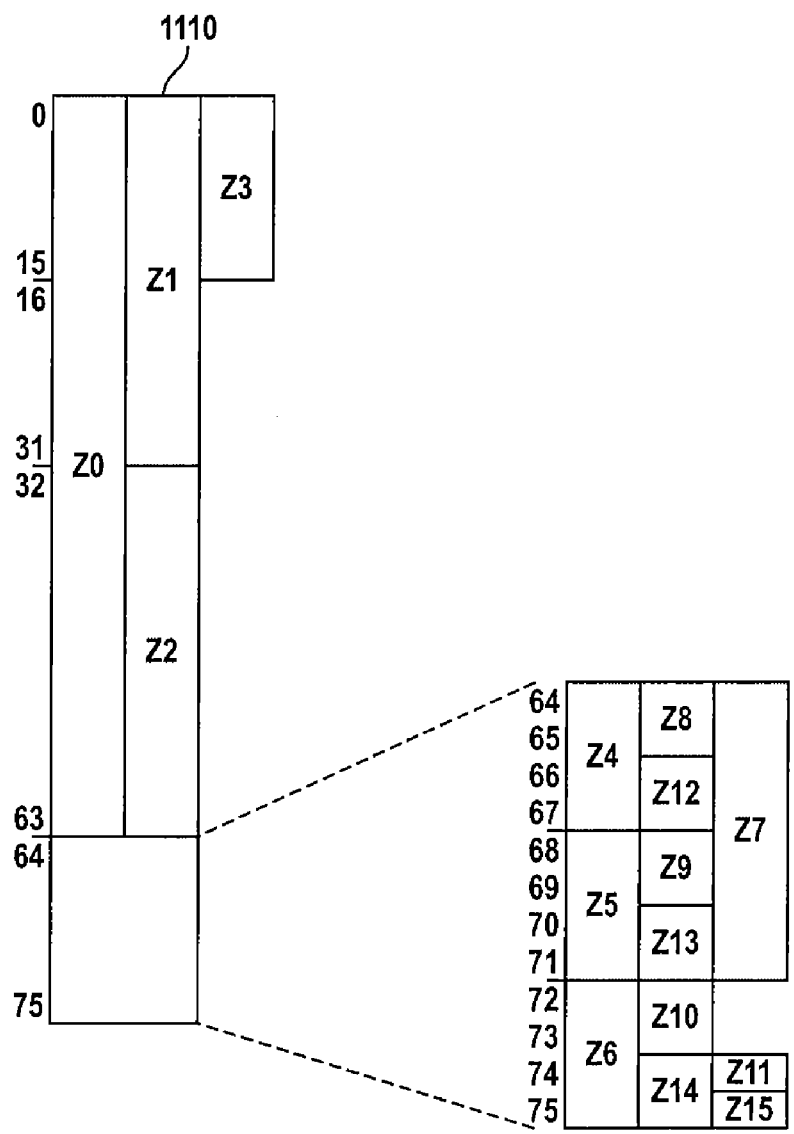
FIG. 21 illustrates an allocation of zones in a tag table among multiple clients according to an embodiment of the present invention.

As yet another example, entries in the L2 tag tables 1108, 1110 may also be allocated per client or per group. For instance, different rows of each tag table may be allocated to different clients (or groups). FIG. 21 shows examples of zone definitions that might be supported in L2 small tag table 1110. In this example, small tag table 1110 has 76 rows (numbered 0-75), and sixteen overlapping zones (identified by zone indexes Z0 to Z15) are defined. For instance, zone Z0 includes rows 0 to 63, zone Z1 includes rows 0 to 31, zone Z2 includes rows 32 to 63, and so on. For rows numbered 64-75, the size of the zones is smaller, and the zones for those rows are shown in the expanded area at right. Each client is assigned a zone index (from 0 to 15) that determines which rows of tag table 1110 it may use. The determination of row selection bits described above (e.g., FIGS. 13 and 16) may be modified so that the row selected is shifted into the client's zone.

In this embodiment, zones that overlap are defined to provide flexibility in system configurations, but overlapping zones are not used concurrently. For example, a configuration in which one client uses zone Z0 while another client uses any of zones Z1, Z2, or Z3 would not be allowed. In some embodiments, rather than specifying a zone index, the configuration parameter for a client may specify the desired size of the zone (e.g., number of rows), and assignment of zone indexes to clients may be controlled by an algorithm that selects zones of the desired size subject to the constraint that overlapping zones not be selected.

It should be noted that because the location of an entry in small tag table 1110 determines the location of the corresponding cluster in pointer table 718, allocating zones in small tag table 1110 also allocates space in pointer table 718. Zone allocations in big tag table 1108 may be the same as or different from zone allocations in small tag table 1110. In other embodiments, columns in tag table 1108 may also be allocated on a per-client basis.

C. Hierarchical Translation Table

Figure 22:
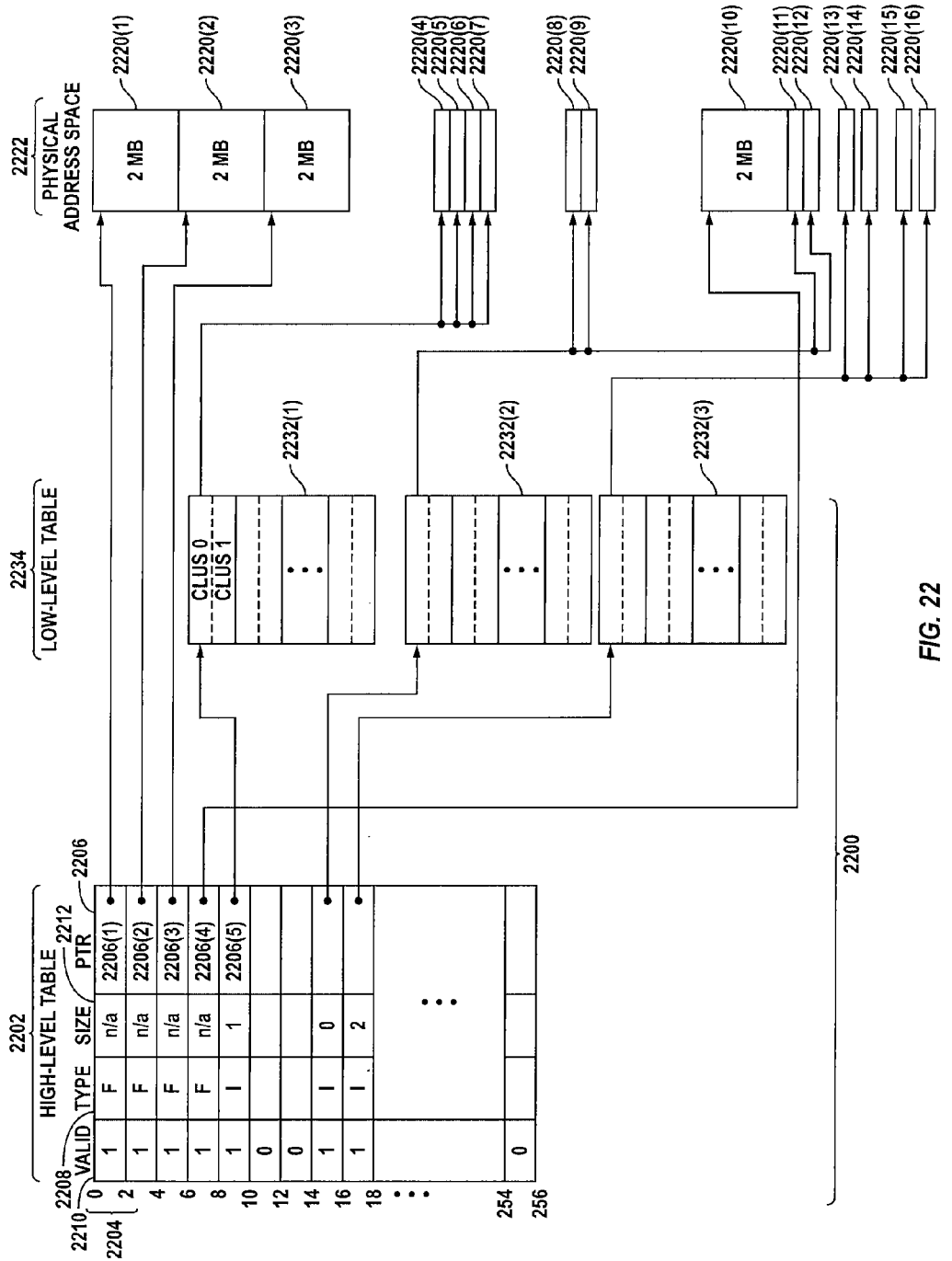
FIG. 22 illustrates translation data stored in a hierarchical translation table according to an embodiment of the present invention.

In another alternative embodiment, translation data is stored in a hierarchical translation table structure rather than in the flat cluster tables shown in FIGS. 3 and 19. FIG. 22 is an illustration of a hierarchical translation table 2200 according to an embodiment of the present invention. Hierarchical translation table 2200 includes a high-level table 2202 and a low-level table 2234. High-level table 2202, which may be stored on the same chip as the TLB system (e.g., using registers or other storage circuits), is indexed in 2 MB blocks of the virtual address space as shown by the index values at left. (In this embodiment, the virtual address space covers 256 MB.) Low-level table 2234 is advantageously stored in system memory (or other off-chip storage). In this embodiment, low-level table 2234 is divided into segments 2232, each of which covers a 2 MB range of the virtual address space.

Each entry 2204 in high-level table 2202 contains a pointer 2206 that points to a physical address. Pointers 2206 may be of two types, final (denoted "F" in FIG. 22) and indirect (denoted "I" in FIG. 22); a type field 2208, which may be, e.g., one bit, is used to distinguish the types. A "final" pointer (also referred to herein as "direct") is used where all virtual addresses for that entry 2204 map to a contiguous block of physical address space. The final pointer advantageously stores the physical address (or page index) of the first page of that contiguous block. For example, pointer 2206(1) is a final pointer that points to a 2-MB block 2220(1). Any virtual address in the range from 0 to 2 MB can be translated by obtaining final pointer 2206(1) from high-level table 2202 and adding an offset to the determine the correct location within block 2220(1). It should be noted that if high-level table 2202 is stored on chip, this translation can be performed without accessing system memory.

An "indirect" pointer is used where the 2 MB range of virtual address space corresponding to a high-level table entry does not map to a contiguous block of physical address space. The indirect pointer stores the physical address (or page index) of the low-level table segment 2232 that stores clusters (e.g., CLUS 0, CLUS 1) for translating that 2 MB range of virtual address space. For example, pointer 2206(5) is an indirect pointer that points to table segment 2232(1). Any virtual address in the range from 8 MB to 10 MB can be translated by obtaining indirect pointer 2206(5) from high-level table 2202, accessing the appropriate cluster (e.g., CLUS 0) from low-level table segment 2232(1) using an offset based on the virtual address, then using the cluster to perform the translation. It should be noted that if high-level table 2202 is stored on-chip, this translation can be performed with, at most, one system memory access to obtain the cluster.

Clusters stored in low-level table segments 2232 may have any of the formats described above (or other formats). For example, in FIG. 22, each low-level table segment 2232 stores cluster pairs (e.g., clusters CLUS 0, CLUS 1), and the clusters are four-block or eight-block clusters as described above. Arrows show the mapping for some of the clusters to blocks 2220 in physical address space 2222.

Indirect pointers, such as pointer 2206(5), may have various formats. In some embodiments, the indirect pointer stores an index that can be combined with a base address of low-level table 2234 to select the appropriate segment 2232 (e.g., by multiplying the index by the size of each segment 2232 and adding to the base address). In other embodiments, the indirect pointer stores the physical address (or page index) of the beginning of segment 2232.

In addition to the pointer 2206 and type field 2208, each entry 2204 in high-level table 2202 also includes a valid field 2210 and a size field 2212. Valid field 2210, which may be, e.g., one bit, indicates whether the region of virtual address space corresponding to a given entry 2202 is valid (e.g., whether it has been allocated and mapped to physical addresses). For invalid entries 2204, the pointer advantageously stores a reference to a system bit bucket. Size field 2212 is used for indirect pointers and advantageously stores the cluster size of the smallest cluster in the corresponding low-level table segment 2234. The size may be encoded, e.g., as described above with reference to Tables 1 and 2. For final pointers, size field 2212 may be ignored or set to a value representing the size of a high-level table entry (e.g., 2 MB).

Figure 23:
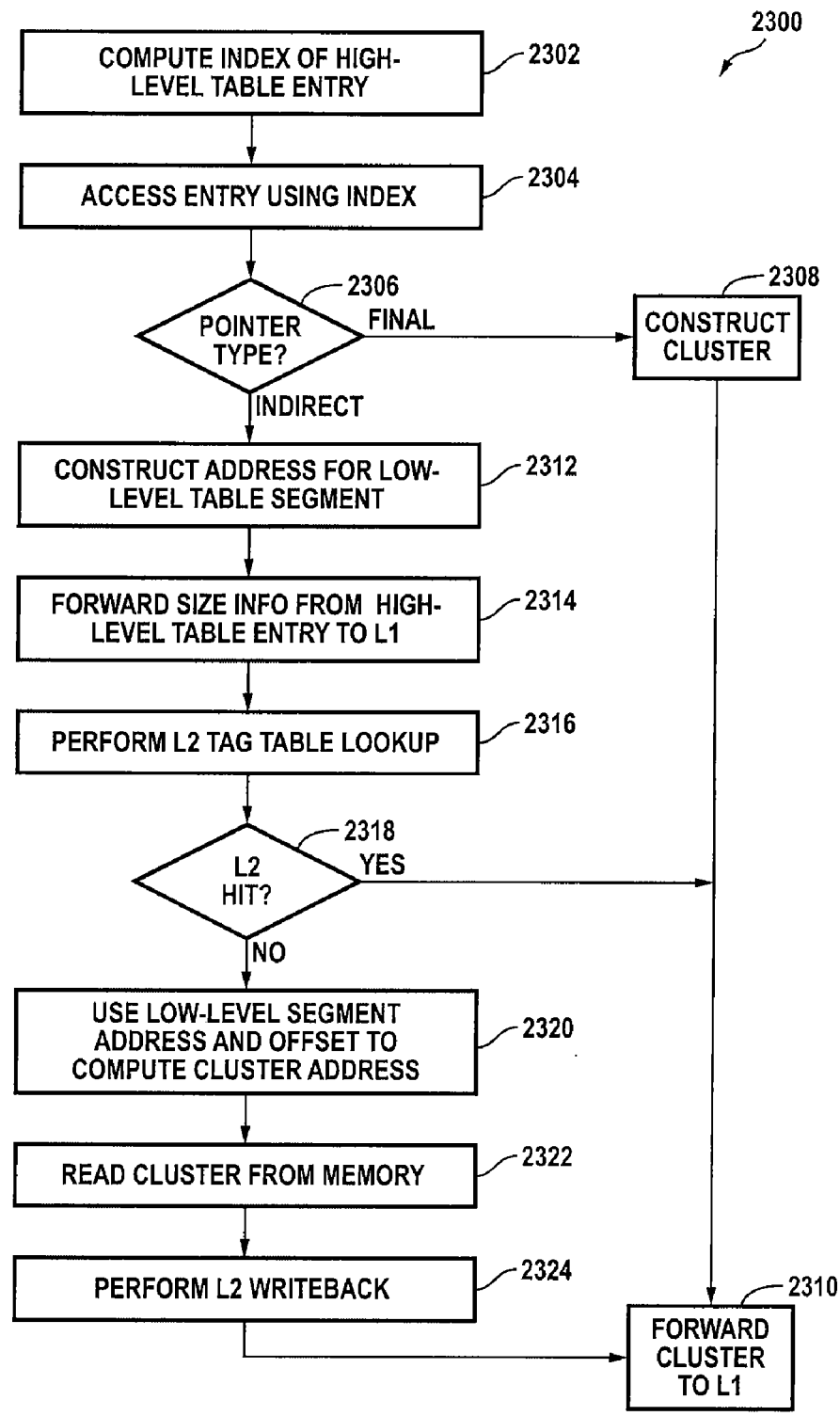
FIG. 23 is a flow diagram of a Level 2 lookup process that uses the hierarchical translation table of FIG. 22.

The L2 lookup and writeback processes described above may be modified to exploit hierarchical table 2200, thereby reducing the need to access system memory to obtain address translation data. For example, FIG. 23 is a flow diagram of a process 2300 for looking up address translation data in hierarchical translation table 2200 that can be implemented, e.g., in a modified embodiment of the L2 lookup logic described above. At step 2302, an index into high-level table 2202 is generated, and at step 2304, the corresponding high-level table entry 2204 is accessed using the index. In some embodiments, step 2304 also includes checking the valid field 2210 of entry 2204. If the entry is invalid, process 2300 may proceed normally, with a translation error flag or interrupt being set as described above (see, e.g., FIG. 5A).

At step 2306, it is determined whether the pointer type is final or indirect, e.g., by checking type field 2208. If the pointer type is final, there is no need to retrieve a cluster for this address. Instead, at step 2308, a cluster that contains the pointer value (e.g., a page index for the first page of the 2 MB block of physical address space) is created. Various cluster formats may be used, including the four-block or eight-block cluster format described above (see FIGS. 4A-B); in other embodiments, available cluster formats may include a one-block or special format that may be used at step 2308. At step 2310, the newly created cluster is forwarded to L1. It should be noted that where high-level table 2202 is stored on chip, this cluster is advantageously not cached in L2, as it can be recreated at any time based on the pointer value stored in the high-level table 2202 without accessing system memory.

If, at step 2306, the pointer type is indirect, then at step 2312, the address of the low-level table segment is constructed using the pointer 2206. At step 2314, the size index for the segment (e.g., the value stored in size field 2212) is forwarded to L1. While optional, this step allows L1 to receive updated information about cluster size in advance of system memory access; L1 can use this information to avoid generating additional L2 requests that return the same cluster. At step 2316, a lookup in the L2 tag tables is performed; this step may be implemented in accordance with lookup operations of process 1300 (FIG. 13) described above. At step 2318, in the event of an L2 hit, the corresponding cluster is obtained and forwarded to L1 at step 2310. Otherwise, at step 2320, the low level table address constructed at step 2312 is used to compute a physical address for the needed cluster (or cluster pair). The corresponding cluster (or cluster pair) is read from memory (step 2322), written back to L2 (step 2324), and returned to L1 (step 2310).

The writeback to L2 may be implemented in accordance with process 1600 (FIG. 16) described above. It should be noted that in cluster pair embodiments, the L2 writeback process may include caching the non-current cluster of the pair as described above. In some embodiments with a hierarchical translation table, it is possible that the non-current cluster would correspond to an address range that can be translated using a direct pointer from high-level translation table 2202. To avoid writing such clusters, clusters in segments 2232 may include a "writeback inhibit" bit (or field) that is set when the cluster covers the full range of one (or more) high-level table entries. During the L2 writeback process, this bit is checked prior to writing the non-current cluster; if the bit is set, the non-current cluster is not written. In other embodiments, table 2200 may be managed in a manner that ensures that writebacks for blocks with direct pointers do not occur.

Figure 24:
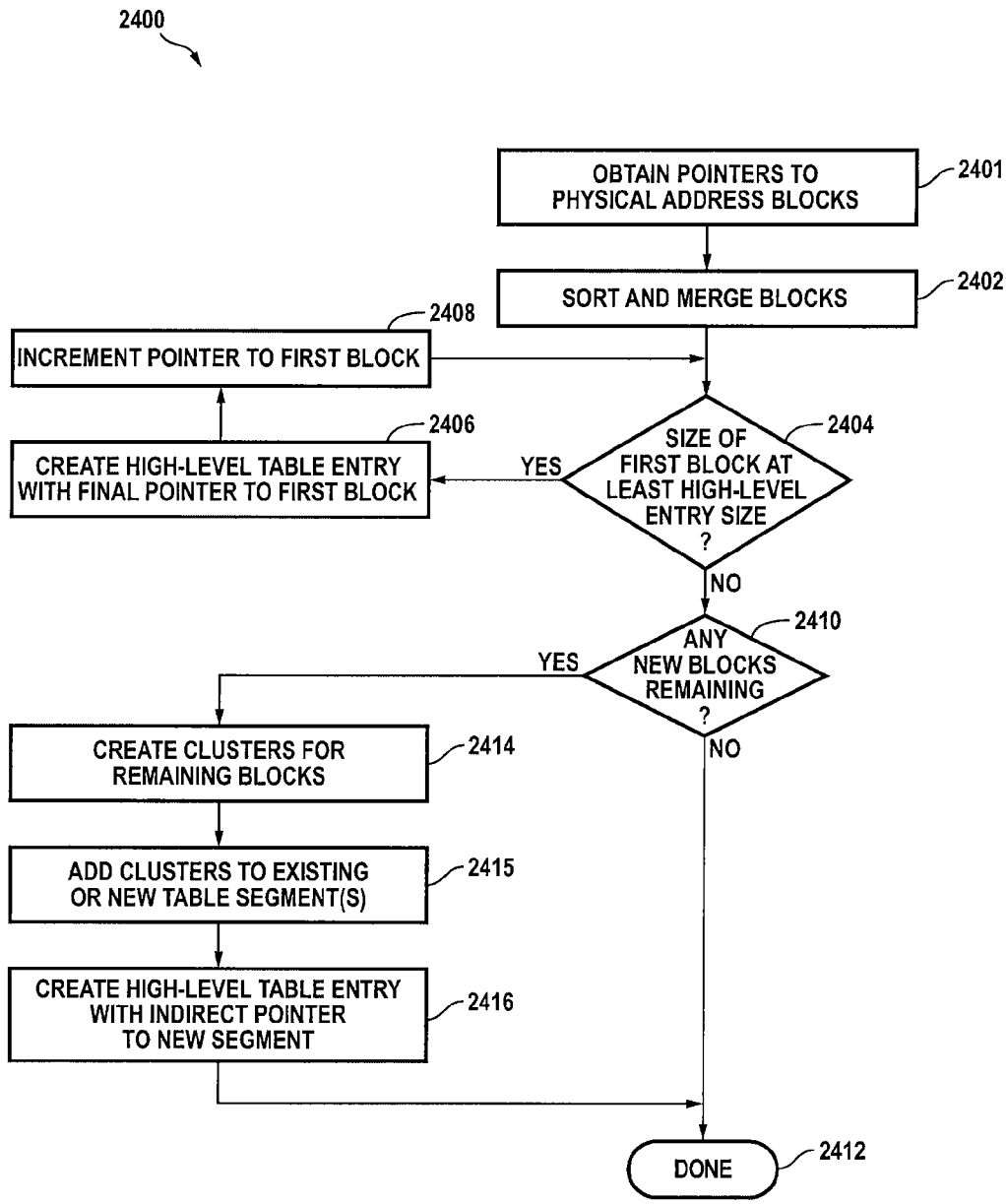
FIG. 24 is a flow diagram of a process for creating entries in the hierarchical translation table of FIG. 22.

High-level translation table 2202 may be updated by the resource manager as memory is allocated. FIG. 24 is a flow diagram of an allocation process 2400 that includes updating high-level translation table 2202 according to an embodiment of the present invention. At step 2401, a new group of pointers to physical address blocks is obtained. At step 2402, the blocks are sorted and merged into larger blocks to the extent possible, and arranged in order of decreasing block size. At step 2404, it is determined whether the first block is at least as large as the size of a high-level table entry (e.g., 2 MB in the case of high-level table 2202). If so, then at step 2406, a new high-level table entry with a final pointer to the beginning of the first block is created. Optionally, a corresponding cluster may be created and stored in low-level table 2234. At step 2408, the pointer for the first block is incremented by 2 MB, and blocks may be reordered by size if appropriate. The process then returns to step 2404 to determine whether another final pointer can be defined.

After some number of iterations of steps 2404, 2406, 2408, any remaining new blocks are all smaller than the entry size of the high-level table. At that point, the process proceeds to step 2410, where it is determined whether any new blocks remain. If not, then the process exits at step 2412. If there are blocks remaining, then clusters for mapping to these blocks are created at step 2414. Cluster creation may implement relevant portions of process 600 of FIG. 6 described above. At step 2415, the clusters are added to new or existing segments 2232 of low-level table 2234; segments may be created as needed. At step 2416, an entry 2204 for high-level table 2202 corresponding to each new segment 2232 is created. Each such entry has an indirect pointer that points to the segment 2232, and the size field is set to the size of the smallest cluster in the segment. Step 2416 may also include updating size fields for existing segments 2232 in the event that one of the clusters added at step 2415 is smaller than the current value in the size field. Process 2400 ends at step 2412.

It will be appreciated that the hierarchical translation table described herein is illustrative and that variations and modifications are possible. For example, the size of an entry in the high-level table (i.e., amount of virtual address space covered by that entry) may be varied. The high-level table may store any combination of direct and/or indirect pointers. Pointers may be encoded in any manner desired. Each entry in the low-level table may store any number of clusters, e.g., single clusters, cluster pairs, or cluster groups with any number of clusters. In some embodiments, instead of storing a cluster (or cluster pair or cluster group) for each minimum-size range of the virtual address space in the low-level table, the size field in the high-level table can be exploited to reduce the number of entries in a segment of the low-level table. For instance, in a cluster pair embodiment, if it is known that each cluster in a segment maps at least 32 KB, then each cluster pair maps at least 64 KB, and the number of cluster pairs can be reduced accordingly (i.e., one pair for each 64 KB range). The size field of the high-level table entry can be used to compute an entry index within the low-level table segment. In some embodiments, the low-level table may be stored at consecutive physical addresses and may include entries for all virtual addresses, so that any virtual address can be translated by reference to the low-level table; in other embodiments, each segment can be stored independently of the others, with a reference to the appropriate segment being provided by the high-level table. The high-level table may be stored on chip (e.g., in registers) and/or in system memory as desired. In some embodiments, one or more segments of the low-level table may also be stored on chip to facilitate repeated accesses to a segment. In some embodiments, some or all of the pointer fields in the on-chip table may store multiple pointers, e.g., using a data structure similar to the clusters described above.

D. Other Embodiments

While the invention has been described with respect to specific embodiments, one skilled in the art will recognize that numerous modifications are possible. For instance, cluster formats and sizes other than those described herein may be used. Clusters may map any number or arrangement of physical addresses, including any number of blocks of contiguous physical addresses. Any number and combination of cluster range sizes may be supported, and address translation may be implemented in a manner appropriate to the cluster format(s) in use. The arrangement of cluster storage in an in-memory cluster table may also be varied; in some embodiments, hierarchical in-memory table structures may be implemented. Some embodiments may also support cluster data structures of different sizes.

In embodiments of the present invention, a single cluster table access using any valid virtual address returns the cluster that provides the correct physical address. Further, once a cluster is obtained by reference to any virtual address in its range and cached, the full range of virtual address space covered by the cluster can be determined without accessing the cluster table again. For instance, in some embodiments described above, cluster alignment rules in combination with range size data included in the cluster can be used to determine the range. In other embodiments, range-defining data may be provided in other ways, e.g., by encoding starting and/or ending virtual addresses in the cluster data structure.

Further, embodiments of the invention may be employed in computer systems that use multiple physical page sizes concurrently. As an example, some systems provide for allocation of some memory in 4 KB increments and other memory in 1 MB increments. For purposes of defining clusters, the smaller size (e.g., 4 KB) can be used consistently as the page size of the physical address space, and the larger-size increments can be treated as cases where the system happened to provide a group of contiguous pages, e.g., a 1 MB page may be regarded as 256 consecutive 4 KB pages and may be divided into as many as 256 blocks.

A wide variety of address translation systems for exploiting a given translation table structure may be implemented, and a particular translation system need not have all of the features described herein. For example, alternative embodiments of address translation systems might include more or fewer than two levels of cluster caching. Some embodiments might be adapted to service only one client or might include multiple cache structures and/or lookup logic elements, each optimized for a different client or group of clients. The lookup logic may also be varied. For example, alternative embodiments of the L1 and/or L2 lookup logic described herein may include a different number of tag tables; each tag table might support its own cluster cache, or multiple tag tables might interact to support a single cluster cache. In such implementations, different clients might use different combinations of the tag tables and/or cluster caches.

In some alternative embodiments, the L2 lookup logic may return a subset of the cluster data, e.g., a single block pointer or a singe virtual address (or virtual page) translation, to the L1 cache.

In some embodiments, clusters in a cluster table may be modified from time to time. Control logic may be provided to invalidate TLB cache entries that correspond to a modified cluster.

Other alternative embodiments may combine various features of a conventional page table with the cluster-based cache systems and methods described herein. For instance, clusters may be created during caching of translation data read back from a page table. Still other embodiments may include an address translation table with variable-size translation data structures (clusters); a cache capable of storing variable-size clusters may be implemented, or the variable-size clusters may be converted to fixed-size clusters as they are added to the cache.

Some embodiments may also include further features. For example, address prediction logic may be provided to detect patterns in the requested virtual addresses for a particular client and extrapolate these patterns to predict future requests; clusters for predicted requests could then be requested from the in-memory cluster table and cached (e.g., in an L2 cache) pending an actual request.

The logic described herein, including any alternative logic configurations, may be implemented using special-purpose circuitry designed and built according to any suitable technology, software (e.g., program code) executing on one or more programmable processors, and/or any combination thereof. The various storage elements described herein, including the cluster caches (e.g., the strip pool and pointer table) as well as tag tables, may be implemented in RAM devices, flip-flops, or any other suitable storage circuitry. Logic circuitry and storage elements may be integrated on the same chip or provided on separate chips as desired.

While the invention has been described in the context of graphics processing embodiments in a general purpose computer system, those of ordinary skill in the art will recognize that the systems and methods described herein are not restricted to this context. For example, similar systems and methods could be implemented in various special purpose computer systems (e.g., video game consoles). Further, similar systems and methods could be adapted for management of virtual address spaces used outside the graphics context, including virtual address spaces managed by CPUs or any other type of processor.

Thus, although the invention has been described with respect to specific embodiments, it will be appreciated that the invention is intended to cover all modifications and equivalents within the scope of the following claims.

What is claimed is:

1. A system for mapping virtual addresses to physical addresses, the system comprising:
    a cluster creator configured to create a plurality of clusters, wherein each cluster maps a range of a virtual address space to a plurality of physical addresses, wherein the ranges mapped by different ones of the plurality of clusters have different sizes,
    wherein each cluster includes a plurality of references to blocks of physical addresses such that the virtual addresses in the range mapped by the cluster are mapped to the blocks of physical addresses; and
    a table builder configured to store the clusters in a plurality of entries in a cluster table, wherein each entry in the cluster table corresponds to a virtual block in a virtual address space,
    wherein each cluster is stored in a number of entries corresponding to the size of the range mapped by the cluster.

2. The system of claim 1, wherein the range of the virtual address space mapped by each cluster corresponds to an integer number of virtual blocks.

3. The system of claim 1, wherein the plurality of physical blocks includes one physical block that is not contiguous with any other one of the plurality of physical blocks.

4. The system of claim 1, wherein each of the plurality of physical blocks includes the same number of physical addresses.

5. The system of claim 1, wherein at least one of the clusters contains a base pointer and a plurality of block pointers, wherein the reference to one of the plurality of physical blocks is obtainable by combining the base pointer and a corresponding one of the block pointers.

6. The system of claim 1, wherein each cluster includes a size field configured to store a value indicating the size of the range mapped by that cluster.

7. The system of claim 1, wherein the table builder is further configured to store each cluster in a number of consecutive entries.

8. The system of claim 1, wherein the size of the cluster is independent of the size of the range mapped by the cluster.

9. The system of claim 1, wherein each of the virtual blocks includes an equal number of virtual addresses.

10. The system of claim 1, wherein the table builder is further configured to store a plurality of clusters in each entry.

11. The system of claim 10, wherein the table builder is further configured such that, in the event that the range size of a first cluster stored in one of the entries is at least as large as a size of the virtual block associated with the entry, the table builder also stores in the entry a second cluster that maps a range of virtual addresses immediately following the range mapped by the first cluster.

12. The system of claim 1, further comprising an address translation module configured to access a target entry of the cluster table corresponding to a target virtual address to be translated and to provide a target cluster usable for translating the target virtual address.

13. A method for mapping virtual addresses to physical addresses, the method comprising:
    creating a plurality of clusters, wherein each cluster maps a range of a virtual address space to a plurality of physical addresses, wherein the ranges mapped by different ones of the plurality of clusters have different sizes,
    wherein each cluster includes a plurality of references to blocks of physical addresses such that the virtual addresses in the range mapped by the cluster are mapped to the blocks of physical addresses; and
    storing the clusters in a plurality of entries in a cluster table, wherein each entry in the cluster table corresponds to a virtual block in the virtual address space, wherein each cluster is stored in a number of entries corresponding to the size of the range mapped by that cluster.

14. The method of claim 13, further comprising the acts of:
    identifying a target virtual address to be translated;
    retrieving one of the clusters from the cluster table by reference to the virtual block that includes the target virtual address; and
    translating the target virtual address to a physical address based on the mapping provided by the retrieved cluster.

15. The method of claim 14, wherein the act of retrieving one of the clusters is performed without accessing range size data for the clusters.

16. The method of claim 14, wherein the act of translating the target virtual addresses includes the acts of:
    selecting one of the plurality of physical blocks based on block selection bits of the virtual address;
    obtaining a starting physical address from one of the physical block references provided by the retrieved cluster; and
    computing a target physical address based on the starting physical address and the target virtual address.

17. The method of claim 16, wherein the act of computing the target physical address includes:
    obtaining a first number of most significant bits of the physical address from the starting physical address; and
    obtaining a second number of least significant bits of the physical address from the target virtual address.

18. The method of claim 17, wherein the first number and the second number are determined based at least in part on the range size of the retrieved cluster.

19. The method of claim 14, wherein the retrieved cluster contains a base pointer and a plurality of block pointers and wherein the act of translating the target virtual addresses includes the acts of:
    selecting one of the plurality of block pointers based on block selection bits of the virtual address;
    computing a starting physical address by combining a first number of most significant bits of the base pointer and a second number of bits of the selected block pointer; and
    computing a target physical address based on the starting physical address and the target virtual address.

20. The method of claim 19, wherein the first number and the second number are determined based at least in part on the range size of the retrieved cluster.

21. The method of claim 14, further comprising the act of caching the retrieved cluster in association with a tag, wherein the tag encodes the range of virtual address space mapped by the cluster.

22. A system for mapping virtual addresses to physical addresses, the system comprising:
- a cluster creator configured to create a plurality of clusters, wherein each cluster maps a range of a virtual address space to a plurality of physical addresses, wherein the ranges mapped by different ones of the plurality of clusters have different sizes, wherein each cluster includes a plurality of references to blocks of physical addresses such that the virtual addresses in the range mapped by the cluster are mapped to the blocks of physical addresses;
- a cluster table builder configured to store the clusters in a plurality of entries in a cluster table, wherein each entry in the cluster table corresponds to a virtual block in the virtual address space, wherein each cluster is stored in a number of entries corresponding to the size of the range mapped by that cluster, and wherein the cluster table includes a plurality of segments, each segment corresponding to a group of the virtual blocks; and
- a high-level table builder configured to store a reference to a segment of the cluster table in a first entry of a high-level table having a plurality of entries, each entry corresponding to a group of the virtual blocks, wherein the high-level table builder is further configured to define a mapping between one of the groups of virtual blocks and a physical block of contiguous physical addresses and to store a reference to the physical block in a second entry of the high-level table.

23. The system of claim 22, further comprising an address translation module configured to access a target entry of the high-level table corresponding to a target virtual address to be translated and to provide a target cluster usable for translating the target virtual address.

24. The system of claim 23, wherein the address translation module is further configured such that:
- in the event that the target entry of the high-level table stores a reference to a segment of the cluster table, the address translation module obtains the target cluster by using the reference to the segment; and
- in the event that the target entry of the high-level table stores a reference to a physical block, the address translation module constructs a cluster based on the reference to the physical block.

25. The system of claim 23, wherein the address translation module includes a first circuit disposed on a chip and wherein the high-level table includes a second circuit disposed on the same chip.

* * * * *